(12) United States Patent
Laktas et al.

(10) Patent No.: US 10,766,832 B1
(45) Date of Patent: Sep. 8, 2020

(54) NANO-ENHANCED EXPLOSIVE MATERIAL

(71) Applicant: Saint Louis University, St. Louis, MO (US)

(72) Inventors: Jacob M Laktas, St. Louis, MO (US); Ian D Stochl, Fenton, MO (US); Gregory J Place, Webster Groves, MO (US); Paul Jelliss, St. Louis, MO (US); Stephen Chung, Florissant, MO (US); Steven W Buckner, St. Louis, MO (US)

(73) Assignee: Saint Louis University, St. Louis, MO (US)

( * ) Notice: Subject to any disclaimer, the term of this patent is extended or adjusted under 35 U.S.C. 154(b) by 280 days.

(21) Appl. No.: 16/004,098

(22) Filed: Jun. 8, 2018

Related U.S. Application Data

(60) Continuation-in-part of application No. 15/932,062, filed on Dec. 27, 2017, now Pat. No. 10,519,076, which is a division of application No. 15/659,557, filed on Jul. 25, 2017, now Pat. No. 10,173,945, which is a continuation-in-part of application No. PCT/US2016/046760, filed on Aug. 12, 2016, and a continuation-in-part of application No. 14/259,859, filed on Apr. 23, 2014, now abandoned, application No. 16/004,098, filed on May 11, 2020, which is a
(Continued)

(51) Int. Cl.
*C06B 45/32* (2006.01)
*C01B 3/00* (2006.01)
*C06B 45/00* (2006.01)
*C06B 45/18* (2006.01)
*C06B 45/30* (2006.01)

(52) U.S. Cl.
CPC ............ *C06B 45/32* (2013.01); *C01B 3/0078* (2013.01)

(58) Field of Classification Search
USPC ............................................. 149/2, 3, 5, 6, 7
See application file for complete search history.

(56) References Cited

U.S. PATENT DOCUMENTS 3,216,842 A * 11/1965 Skeist ................. C08L 2666/36
106/236
3,506,752 A * 4/1970 Varnell .................... F16L 9/121
264/135
(Continued)

*Primary Examiner* — James E McDonough

(57) ABSTRACT

The present invention generally concerns a nano-enhanced explosive that is integrated at many points across an explosive train. More specifically, a nano-enhanced explosive is formed when a nanocomposite we call nMx is combined with a secondary high explosive. nMx is made of $Li_3AlH_6$ nanoparticles, elemental Al nanoparticles, an amount of Ti metal, and a nanoscale organic layer having unique burning profiles that lend energy to the explosive process including increased shockwave propagation through a chemical explosive and increased temperatures and gaseous pressure build up and release in and about the same. Our nano-enhanced explosive can be integrated at various points across an explosive train, e.g. use within a detonation cord (fuse), or as a detonation charge (initiator), or as the main charge, where the use of the nano-enhanced explosive can be characterized by the energy lent to projectiles from munitions, bubbles formed by underwater explosive trains, or blast profiles.

15 Claims, 33 Drawing Sheets

Related U.S. Application Data continuation-in-part of application No. 15/681,349, filed on Aug. 19, 2017, now Pat. No. 10,501,385, which is a continuation-in-part of application No. 15/675,815, filed on Aug. 14, 2017, now Pat. No. 10,494,315, application No. 16/004,098, which is a continuation-in-part of application No. 15/675,815.

(60) Provisional application No. 62/517,194, filed on Jun. 9, 2017, provisional application No. 62/380,367, filed on Aug. 27, 2016, provisional application No. 62/377,562, filed on Aug. 20, 2016, provisional application No. 62/205,448, filed on Aug. 14, 2015.

(56) References Cited

U.S. PATENT DOCUMENTS

| | | | |
|---|---|---|---|
| 5,927,621 A * | 7/1999 | Ziolo | B82Y 25/00 |
| | | | 241/170 |
| 6,984,274 B2 | 1/2006 | Hofmann et al. | |
| 7,338,711 B1 | 3/2008 | Brousseau | |
| 8,250,986 B1 | 8/2012 | Sheridan et al. | |
| 8,857,342 B2 | 10/2014 | Wilson et al. | |
| 10,173,945 B1 * | 1/2019 | Buckner | C06B 45/32 |
| 2010/0135937 A1 * | 6/2010 | O'Brien | C01G 49/0018 |
| | | | 424/59 |
| 2015/0307962 A1 * | 10/2015 | Jelliss | B22F 9/16 |
| | | | 429/421 |
| 2016/0362594 A1 * | 12/2016 | Rojas | C04B 24/287 |

* cited by examiner

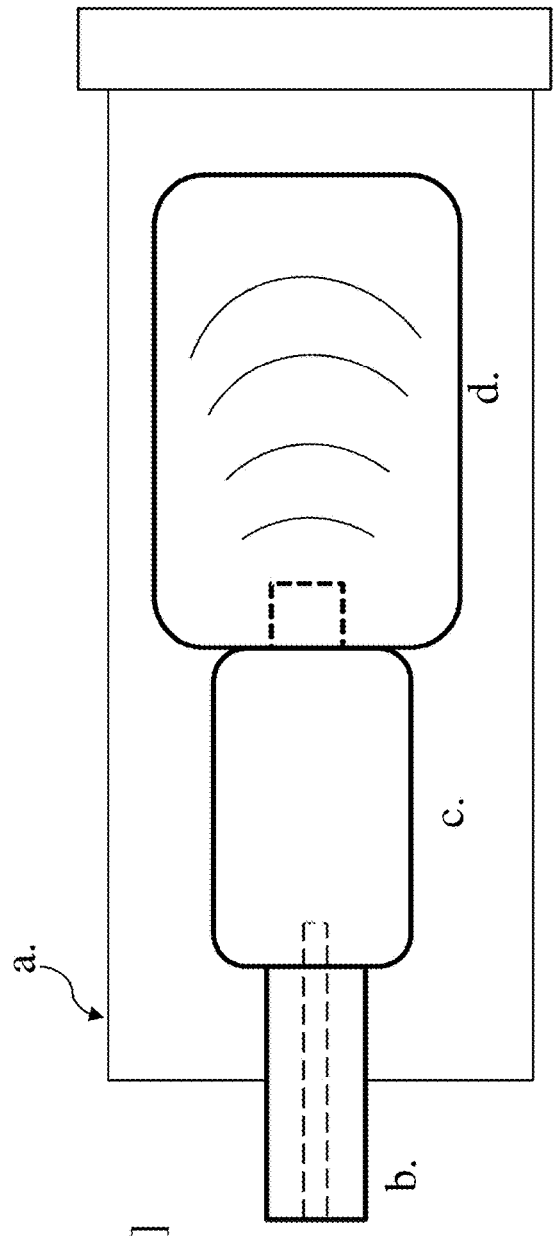
FIG. 1 [Prior Art]
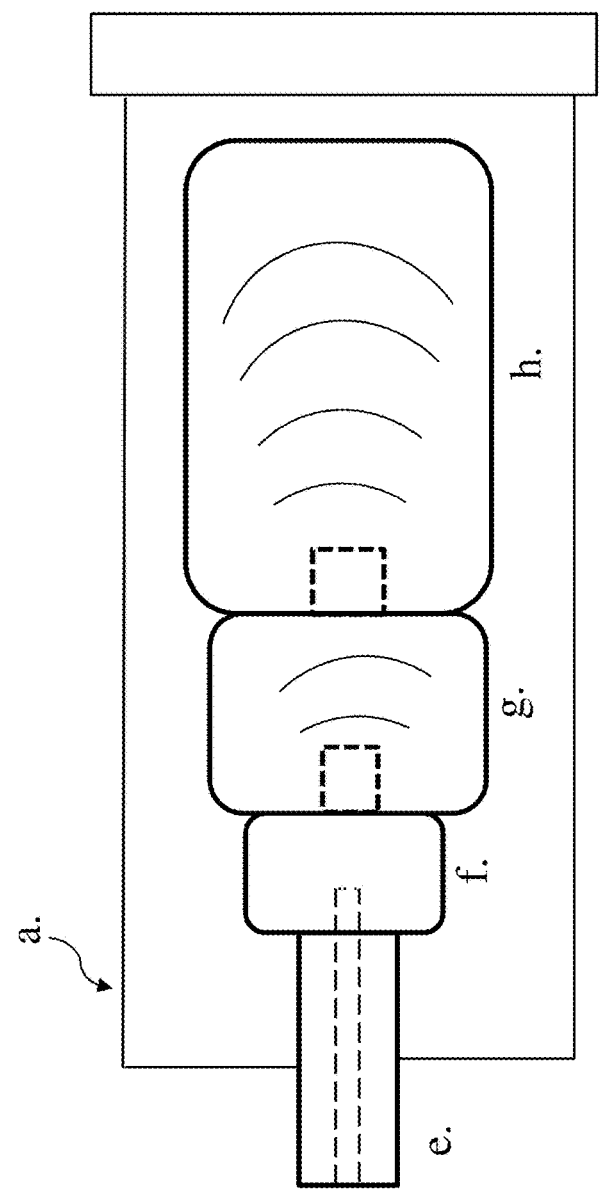
FIG. 2 [Prior Art]

PXRD of nMx₁₁

PXRD of nMx₁₂

PXRD of nMx₁₃

PXRD for nMx₁₆

PXRD for nMx$_{19}$

PXRD for nMx₂₀

FTIR Spec for nMx$_{20}$

Raman Spec for nMx₁₂

Raman Spec for nMx₁₃

Raman Spec for nMx₁₆

Raman Spec for nMx$_{19}$

DCS/TGA for nMx₁₀

DCS/TGA for nMx$_{11}$

DCS/TGA for nMx$_{12}$

DCS/TGA for nMx₁₃

DCS/TGA for nMx₁₆

DCS/TGA for nMx$_{19}$

TEM of nMx$_{10}$

TEM of nMx₁₂

TEM of nMx₁₃

TEM of nMx₁₆

TEM of nMx$_{19}$

TEM of nMx$_{20}$

NANO-ENHANCED EXPLOSIVE MATERIAL

RELATED APPLICATIONS

This patent application claims priority to U.S. Prov. Pat. App. No. 62/517,194 filed on Jun. 9, 2017. This patent application also claims priority to and is a continuation-in-part of U.S. patent application Ser. No. 15/932,062 filed on Dec. 27, 2017. U.S. patent application Ser. No. 15/932,062 is a divisional patent application of U.S. patent application Ser. No. 15/659,557 filed on Jul. 25, 2017, which is pending. U.S. patent application Ser. No. 15/659,557 claims priority to and is a continuation-in-part of U.S. patent application Ser. No. 14/259,859 filed on Apr. 23, 2014, which is now abandoned. U.S. patent application Ser. No. 15/659,557 claims priority to U.S. Prov. Pat. App. No. 62/377,562 filed on Aug. 20, 2016. U.S. patent application Ser. No. 15/659,557 claims priority to U.S. Prov. Pat. App. No. 62/380,367 filed on Aug. 27, 2016. U.S. patent application Ser. No. 15/659,557 claims priority to U.S. Prov. Pat. App. No. 62/517,194 filed on Jun. 9, 2017. U.S. patent application Ser. No. 15/659,557 also claims priority to PCT/US2016/046760 filed on Aug. 12, 2016, where PCT/US2016/046760 claims priority to U.S. Prov. Pat. App. No. 62/205,448, filed Aug. 14, 2015.

FIELD OF THE INVENTION

The present invention generally concerns a nano-enhanced explosive that is integrated at many points across an explosive train. More specifically, a nano-enhanced explosive is formed when a nanocomposite we call nMx is combined with a secondary high explosive. nMx is made of $Li_3AlH_6$ nanoparticles, elemental Al nanoparticles, an amount of Ti metal, and a nanoscale organic layer having unique burning profiles that lend energy to the explosive process including increased shockwave propagation through a chemical explosive and increased temperatures and gaseous pressure build up and release in and about the same. Our nano-enhanced explosive can be integrated at various points across an explosive train, e.g. use within a detonation cord (fuse), or as a detonation charge (initiator), or as the main charge, where the use of the nano-enhanced explosive can be characterized by the energy lent to projectiles from munitions, bubble formation by underwater munitions, or blast profiles.

BACKGROUND OF THE INVENTION

Explosive Trains

Combustion represents the earliest chemical reactions used to perform work, where the process includes the burning of a fuel in the presence of an oxidizer to produce heat, potential flames, smoke, and reaction byproducts (gases). If combustion happens fast and violent in a confined area, then the rapid formation of pressure and heat results in an explosion. However, to efficiently use the energy from a secondary high explosive, one must have a controlled, safe, and predictable detonation process.

Explosive trains are used to control the detonation process of an explosive. FIG. 1 and FIG. 2 depict a three and a four-step explosive train respectively. These trains are known within the arts of commercial and military explosives. A confined shell a.) houses in-line elements being a fuse b.); an initiator c.); and a main charge d.) and h.), where FIG. 2 includes an additional booster material g.) that sends and amplifies shockwaves through the main charge h.).

In each example of prior art, the fuse b.) can be a detonation cord made of a hollow flexible tube packed with a small amount of gun powder or a secondary high explosive that is ignited by a spark that sets off shockwaves within the initiator c.), where the initiator is a primary or secondary high explosive, which then kickstarts a shockwave within the booster g.) or directly affecting the main charge d.) or h.), also being a secondary high explosive. This series of events cause combustion within the confined shell a.) rendering an explosion due to the rapid buildup of heat and gaseous pressure in a confined area.

Explosive trains are configured for pyrotechnics, commercial demolition, the mining industry, and for military applications, e.g. incendiary devices, artillery munitions, general purpose bombs, different types of hand grenades, water reactive mines, and the like. It's inserting that each in-line-element within an explosive train can be substituted with various primary or secondary high explosives or some other ignitable material, leaving open the possibility of using a nano-enhanced explosive as all combustible elements within an explosive train. The present invention is the first use of nMx as an explosive enhancer. Because the nano-enhancer acts as both fuel and oxidizer or can react with an external oxidizer, nMx combusts to release self-sustained heat energy that increases the propagation speed of a shockwave through a chemical explosive and raises the temperature and pressure of newly formed hot gases within the same, thereby affecting the efficiency of in-line elements of an explosive train.

nMx as an Enhancer for Secondary High Explosives

The military and commercial industries are constantly seeking new materials, or advanced fuels, that produce a great amount of heat at a reasonable cost to enhance explosives. The present invention meets this need by providing a nano-enhanced secondary explosive that takes advantage of the interchangeability of explosive materials all along an explosive train. The enhancer is nMx, a novel nanocomposite being $Li_3AlH_6$ nanoparticles, elemental Al metal nanoparticles, an amount of Ti metal, and a nanoscale organic layer. We created a range of nanocomposites, $nMx_{10}$-$nMx_{20}$, based on the capping agents used to passivate the core metal surfaces.

The passivated surfaces of the core metal nanoparticles make nMx air stable and protects and preserves the high energy densities of the core nanoparticles while displaying unique burning characteristics to affect the physical properties of a chemical explosive. Due to its air-stability and tune-able combustion properties, nMx falls within many classifications for an energetic material. We tune the chemical composition of our nanocomposite to ensure an energy density (both volumetric and gravimetric) that is suited for use as an enhancer for secondary high explosives, liquid propellants, a solid propellant, high energy materials, pyrotechnics, for use as a source material for welding reactions, and as a source material for advanced materials production.

nMx gives a higher heat of combustion, $\Delta H°$, over historical $\Delta H°$ values for burning materials typically used as advanced fuels. Higher energy densities indicate that a material can do more work while having a lighter mass or smaller volume, which is of particularly importance as it impacts the ability to launch payloads into space, lightens the weight of aircrafts to fly faster, and gives greater flexibility when making munitions.

Because nMx may act as both fuel and oxidizer or readily reacts with an external oxidizer, it adds its energy density in the form of additional heat to alter the propagation speed of a shockwave through a chemical explosive and raises the temperature and pressure of newly formed hot gases by the same, thereby creating an altered explosion. The unique combustion characteristics of nMx can enhance energetic output for fuses, initiators, boosters, or base charges when admixed with a designated amount of a secondary high explosive.

Because of the energetic flexibility of our core metal nano-particles as an explosive enhancer, we now discuss the importance of Al powders as explosive additives and the historical aspects of $Li_3AlH_6$.

Recounting Al Metal Particles

The combustion characteristics of aluminum (Al) metal particles make them viable additives to explosives. Small aluminum particles are commonly used as an additive to propellants to increase energy output of a material or base fuel, a non-limiting example being nanoscale aluminum increasing the ignition probability of diesel fuels [1]. Al micro-particles are used in kiloton amounts for solid rocket boosters and other solid rocket propellants. While there are many applications for nanoscale aluminum materials, there are challenges with producing air stable aluminum nanoparticles having diameters smaller than 100 nm for industrial or commercial use.

When not in its neutral elemental (0) oxidation state, natural aluminum exists in a $^{+3}$-oxidation state. Any process to reduce $Al^{3+}$ to $Al^0$, by gaining the three electrons, requires a large amount of energy. Because of its high reactivity, pure aluminum readily reacts with oxygen or water to form a layer of aluminum oxide or hydroxide on its outer surfaces, which explains why pure aluminum is mostly found and used in one of its many oxidized forms, non-limiting examples being $Al_2O_3$ or the mineral bauxite.

The oxide layer that forms on aluminum's surfaces greatly reduce the metal's combustion properties. The oxide blocks the core metal. This blocking slows the combustion process, and it prevents systems needing a high-energy output and a high burn rate from taking full advantage of the metal's ability to combust.

Aluminum is a good example of a highly reactive metal having a large combustion enthalpy but is balanced by a weakened energy output. The pure metal reacts at the diffusion limit with $H_2O$. While there are forces that work against pure Al and $H_2O$ reactions, the process occurs at a relatively high efficiency, where fast reactivity with an oxidizer is an important characteristic for a metal fuel as an explosive enhancer. Although metal particles are used with high explosives, where heat energy from reacting metal powders can be imparted to shockwaves via an energy release, these effects are limited and complete energy release into the propagating shockwave is typically not observed.

In smaller nanoparticles, aluminum's oxide layer can account for more than 70% of the nanoparticle's mass. The combustion inefficiency of aluminum metal increases for nanoparticles with diameters less than 20 nm. The oxide coating significantly lowers the nanoparticle's energy density, slows the nanoparticle combustion rate, may prevent complete aluminum nanoparticle consumption, and can reduce hydrogen absorption for storage applications.

Commercially available aluminum is very inefficient as a fuel or fuel additive. A non-limiting example being solid fuels using ammonium perchlorate, $NH_4ClO_4$, as an oxidizer for reducing aluminum metal beads bound to solid rubber. Once the rubber is ignited and starts to burn, the oxidizer reacts exothermically with the fuel, thereby forming $O^{2-}$ and $Al^{3+}$ and producing an energy release. Oxygen diffuses into the outer layer of the metal to form aluminum oxide, $Al_2O_3$. The oxygen from the oxidizer can only diffuse by about 20 microns into the surface of a pre-coated aluminum bead. Every single aluminum bead has a coating of $Al_2O_3$ that is approximately 100 nm thick. A fair amount of the aluminum metal does not participate in combustion due to the protective oxidized layer on each bead.

This phenomenon is evidenced by the expulsion of byproducts during rocket launches. Molten aluminum chunks are ejected from the nozzle as a non-contributory element to gas expansion and thrust. When aluminum beads burn, the $Al_2O_3$ coating thickens. The additional oxide further slows combustion by reducing the amount of pure aluminum metal that participates in reduction to create an effective energy release for a combustion engine. The passivated surfaces of the present invention give a greater amount of surface reactivity for both $Li_3AlH_6$ nanoparticles and elemental Al nanoparticles for combustion events.

Iron or aluminum can be milled, or synthesized, and turned into solid fuel grains for lifting payloads into space or creating thermite hot enough to cut through steel. Some metal powders burn like hydrocarbon fuels. The energy and power of a metal-burning engine are comparable to traditional combustion engines. Metal powders often have shorter ignition delays, they burn faster, and have a higher volumetric energy density (energy per unit volume of fuel) than do fossil fuels and other organic materials. An increased volumetric energy density reduces the size of the launch vehicle and improves efficiency through better aerodynamics.

Creating metal particles with high-energy output is challenging. There are serious safety concerns in handling the starting materials and reactant products, unfeasible reaction times, high production costs, and competing reactions at the metal's surfaces. The present invention discloses nMx as a nanocomposite that overcomes such hurdles and produces novel burning profiles by harnessing the combustion properties of a homogeneous mixture of $Li_3AlH_6$ nanoparticles, elemental Al nanoparticles, an amount of Ti metal, and a nanoscale organic layer. The energetic nanoparticles are safe to handle in air for use as an enhancer for secondary high explosives and other energetic applications.

However, there are critical issues with aluminum nanoparticles for explosive applications. Due to their large energy densities and favorable oxidation kinetics, Al nanoparticles are pyrophoric and must be passivated to hinder the high reactivity with ambient oxygen that significantly covers the core metal. This oxide layer acts as a kinetic barrier to further oxidation of the underlying metal. This oxide layer robs energy density from the material and provides a significant kinetic barrier to further oxidation that is needed for increasing the energy output of a chemical explosive. Because of the large mass increase of aluminum oxide on nanoparticle surfaces, an oxidation layer about the surfaces of Al nanoparticles prevents increased performance relative to micron particles. This is a disadvantage when creating a fast energy release to enhance secondary high explosives.

Al Metal Powder as an Explosive Enhancer

It is known within the art that mixing nano-sized to micron-sized metal powders with secondary high explosives enhances an explosive's shockwave velocity and resulting energy output. Since WWI, aluminum (Al) powder has been used as an enhancer for high explosive formulations to increase blast. Table 1 lists variations of secondary high explosives enhanced by Al combinations.

TABLE 1

Secondary High Explosive enhanced by Al, giving formulations, densities and detonation velocities [2].

| Name | Formulation % | Density (g/cm³) | Detonation Velocity (m/s) |
|---|---|---|---|
| Tritonal | TNT/Al (80/20) | 1.72 | 6700 |
| Minol I | AN/TNT/Al (48/42/10) | 1.75 | 5080 |
| Minol II | AN/TNT/Al (40/40/20) | 1.82 | 5900 |
| Tor Pex 1 | RDX/TNT/Al (45/37/18) | 1.78 | 7440 |
| Tor Pex 2 | RDX/TNT/Al (42/40/18) | 1.85 | 7360 |
| Tor Pex 2B | RDX/TNT/Al (42/40/18) | 1.77 | 7360 |
| Tor Pex 5 | RDX/TNT/Al (30/50/20) | 1.78 | 6990 |
| RDX/Wax/Al | RDX/Wax/Al (70/20/10) | 1.78 | 7750 |
| Dentex | RDX/TNT/Al/Wax (48.5/33.5/18/0.5) | 1.75 | 7780 |
| HTA-3 | HMX/TNT/Al (49/29/22) | 1.81 | 7600 |
| Max Blast | RDX/TNT/Al/Wax (40/30/25/1) | 1.80 | 7700 |
| EDC-I | HMX/RDX/TNT/Wax (70/4/25/1) | 1.84 | 8330 |

A large amount of thermal energy is observed when metals are oxidized from their elemental states. Multi-electron oxidation of reactive metals produces large combustion enthalpies comparable to, or larger than, common explosive materials. These high enthalpies make reactive metals very useful enhancers for solid propellants, $H_2$ (g) production, high explosives, MHD generators, and many other applications and devices.

U.S. Pat. No. 4,747,892 to Spencer discloses a melt-castable explosive having RDX [cyclotrimethylenetrinitramine], Al powder, potassium powder, nitroguanidine, oxidizers, and various fillers.

U.S. Pat. No. 4,705,582 to Aubert discloses the preparation of a desensitized TNT based explosive composition having Al powder as an additive.

U.S. Pat. No. 5,411,615 to Sumrail et al. discloses an insensitive high explosive [RDX], various eutectic melt binders in combination with oxidizers [perchlorates], and Al powder as an additive.

U.S. Pat. No. 5,468,313 to Wallace et al. discloses a plastisol explosive being a high explosive with a plastisol nitrocellulose (PNC) binder; an energetic plasticizer; a high explosive, and a reactive metal powder (Al powder).

U.S. Pat. App. No. 2009/0301337 as filed by Wilson et al. combines loose powders of nano-sized Al powder, nano-sized Zirconia, a metal oxide thermite pair, and additional filler materials within a cavity of a ballistic a projectile being small arms ammunition. When the ballistic bullet strikes a target, the powders react with the thermetic materials to provide an additional explosive type of event upon impact. However, Wilson et al.'s disclosure is not used in combination with a secondary high explosive.

U.S. Pat. No. 9,903,695 to Goodman et al. discloses a device that can switch an explosive train from an out-of-line to an in-line configuration to avoid unwanted ignitions of a primary explosive and the resulting detonation of the base explosive within the train.

U.S. Pat. No. 8,168,016 to Nicolich et al. discloses a high-blast explosive using aluminum particles as an additive. Nicolich et al. reports that the aluminum metal fully reacts during the reaction time of the explosive to fully lend its energy to enhance the metal pushing properties of the base charge. Their explosive composition includes an explosive, a binder, an energetic plasticizer, a lacquer, and micron sized metal being aluminum, boron, or magnesium.

Recounting $Li_3AlH_6$

The production of complex metal hydrides has a somewhat convoluted purpose, where some seek reducing agents, others seek a hydrogen storage material, and still others seek ways of exploiting the material as an advanced fuel or additive. The purpose often dictates the method of making these materials, e.g. ball milling, using varied starting materials for solvent based synthesis, and the like, thereby producing dispersions and a range of sizes within a bulk metal.

Although lithium aluminum hexahydride, $Li_3AlH_6$, sparks the imagination as an energy source, it is a difficult material to work with. There are many drawbacks to $Li_3AlH_6$ being a viable energy source. $Li_3AlH_6$ is wildly expensive, where the pricing for 1 kg of $Li_3AlH_6$ can run as high as $20,000 USD. $Li_3AlH_6$ is unstable and reacts with water and ambient gases to produce spontaneous burning. In their "natural" form most metal hydrides are not safe to handle in air. Because our nanocomposite is a first reporting of a cost-effective method for creating stabilized $Li_3AlH_6$ nanoparticles, making $Li_3AlH_6$ nanoparticles air safe and sensible for applications, we present a brief retelling of important moments for $Li_3AlH_6$.

Synthesis of $Li_3AlH_6$ was first reported by Ehrlich et al. in the late 1960's, and the thermal decomposition of $LiAlH_4$ into $Li_3AlH_6$ was later reported by Dilts and Ashby in the early 1970's. Since then, $LiAlH_4$ has become commonly used in industrial processes as a reducing agent to convert esters, carboxylic acids, acyl chlorides, aldehydes, and ketones into their corresponding alcohols, as drying agents, and as materials for hydrogen gas storage [3-5].

$LiAlH_4$ and $Li_3AlH_6$, as with most of the metal hydrides, are highly reactive with water and ambient gases. These chemicals are pyrophoric and must be carefully handled and stored. When $LiAlH_4$ is heated, Dilts and Ashby found that the thermal decomposition of $LiAlH_4$ occurs in three steps as follows:

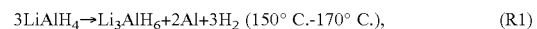

$$3LiAlH_4 \rightarrow Li_3AlH_6 + 2Al + 3H_2 \ (150°\ C.\text{-}170°\ C.), \quad (R1)$$

$$2Li_3AlH_6 \rightarrow 6LiH + 2Al + 3H_2 \ (185°\ C.\text{-}200°\ C.), \quad (R2)$$

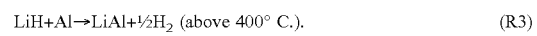

$$LiH + Al \rightarrow LiAl + \tfrac{1}{2}H_2 \ (\text{above } 400°\ C.). \quad (R3)$$

$LiAlH_4$ is metastable at room temperature and partially decomposes into $Li_3AlH_6$ over very long periods of time. However, reaction steps R2 and R3 will occur at temperatures above 150° C. Meaning, to make nMx, it is vital to hold the reaction vessel below 150° C. to keep the decomposition of $LiAlH_4$ to R1, where we further alter the surfaces of $Li_3AlH_6$ nanoparticles and elemental Al nanoparticles as needed [6].

In 1963, the heat of formation for $Li_3AlH_6$ was measured as $\Delta H_{298}° = -79.40$ kcal/mol. The reaction was driven in 4 N HCl in a closed bomb, where the final $\Delta H_{298}°$ value was estimated from $\Delta H_{298}°$ values obtained for aluminum, lithium, and $Li_3AlH_6$ [6]. Zaluska et al. reports a DSC scan for ball milled bulk $Li_3AlH_6$ having a burn event at about 240° C.-260° C. [22].

Chen et al. uses a vibrating mill technique to make nanocrystallites of $LiAlH_4$ and $Li_3AlH_6$, where two different experiments are performed to measure $H_2$ gas desorption and resorption [7]. Firstly, Chen et al. vibrate mills $LiAlH_4$ along with titanium chloride anhydrous aluminum reduced ($TiCl_3 \cdot \frac{1}{3} AlCl_3$) for up to one hour. They report that alkoxide catalysts, such as titanium-n-butoxide ($Ti(OBu)_4$), are highly problematic for their reversible hydrogen experiments. Chen et al. mills $LiAlH_4$ into a micro scaled (μm) powder that contains a range of particle sizes, including dispersed $LiAlH_4$ nanocrystals below 20 nm. However, Chen et al. could not convert $LiAlH_4$ into both $Li_3AlH_6$ nanoparticles and elemental Al nanoparticles [7].

Secondly, in a separate experiment, Chen et al. vibrate mills $2LiH+LiAlH_4$ along with titanium chloride anhydrous aluminum reduced ($TiCl_3 \cdot \frac{1}{3} AlCl_3$) for up to one hour to create $Li_3AlH_6$. The result is $TiCl_3$ doped $Li_3AlH_6$ nanocrystals that are granular shaped at about 20 nm. Chen et al. believe the $Li_3AlH_6$ nanocrystals are due to many factors including the presence of a separate Ti phase and a nanocrystalline Al and $Ti_xAl_y$ phase associated with the milled powder [7]. However, Chen et al. does not give PXRD data substantiating the presence of Al nanocrystals in their powder, which should give strong PXRD peaks in terms of 2Θ at ~37°, ~45°, ~65°, and ~78° as compared to other methods that report PXRD peaks for elemental Al nanoparticles [7].

In both instances, Chen et al. does not create a true nanoparticle system by stopping the decomposition of $LiAlH_4$ at the first reaction step. Chen et al. examines the catalytic effect of a $Ti^0/Ti^{2+}/Ti^{3+}$ defect on $H_2$ formation and resorption of $Li_3AlH_6$. Chen et al. continues the reaction through $Li_3AlH_6$ decomposition, $2Li_3AlH_6 \rightarrow 6LiH+2Al+3H_2$. They create large bundles of multiple nanocrystals that have been fused together by cold welding, where the creation and extraction of single crystal nanoparticles is impossible. Also note that Chen et al.'s nanocrystalline domains are randomly dispersed within a system that is primarily bulk material that range from about 1 μm to about 10 μm in size [7].

U.S. Pat. Pub. No. 2003/0026757 as filed by Percharsky et al. discloses the release of hydrogen gas from mechanical processing of a metal hydride at room temperature. In one instance, the starting material may be $LiAlH_4$. The reaction takes place in the absence of any solvents to forcefully collect hydrogen gas from the storage material. The process does not use any nanostructures [9].

Choi et al. disclose the use of a $Li_3AlH_6/LiBH_4$ mixture as a reversible storage medium for making hydrogen gas via ball milling Choi et al.'s ball milling conditions are adjusted to account for unexpected reactions or changes in the original phases [10]. The process of ball milling results in aggregated nanocrystallites that morph into larger mesoscale structures that are not nanoparticles. All materials were unstable in air and were handled in a glove box under an inert atmosphere.

Varin et al. disclose the effects of ball milling on nm sized (300 nm to 90 nm±30 nm) $LiAlH_4$. Through DSC data, they report a thermal decomposition of $LiAlH_4$ to micron sized $Li_3AlH_6$ between 190° C.-300° C. [26]. Varin et al. does not create a true nanoparticle system by stopping the decomposition of $LiAlH_4$ at the first reaction step. Varin et al. continues the reaction past $Li_3AlH_6$ decomposition to form LiH and Al molecules, $2Li_3AlH_6 \rightarrow 6LiH+2Al+3H_2$ [26].

U.S. Pat. Pub. No. 2011/0165061 as filed by Yang et al. discloses a method of increasing thermal conductivity in hydrogen storage systems [11]. Yang creates a reversible reaction for making hydrogen gas by forcing $Li_3AlH_6$ and $Mg(NH_2)_2$ to liberate hydrogen under certain thermal conditions. Because metal hydrides are inherently poor thermal conductors, Yang et al. cool their ball milled particles with an aluminum film that acts as a heat sink. All of Yang et al.'s materials are air unstable.

The present invention is the first to harness the energetic properties of nano-scaled products created from the thermal decomposition of $LiAlH_4$ for combustion processes. None of the references disclose a homogenous material composed of nanoparticles of both $Li_3AlH_6$ and elemental Al metal that are carefully sized and passivated by a nanoscale organic layer at the first reaction step of $LiAlH_4$ decomposition for use as a nano-enhancer for a secondary high explosive to place within in-line elements of an explosive train. Therefore, there is a need for the present formulation and its uses.

SUMMARY OF THE INVENTION

It is an aspect of the present invention to provide a nano-enhanced explosive being a formulation of about 0.5% to about 75% by weight of a nanocomposite, wherein the nanocomposite is air stable and includes $Li_3AlH_6$ nanoparticles, elemental Al nanoparticles, amount of Ti metal, and a nanoscale organic layer in combination with about 25% to about 99.5% by weight of a secondary high explosive.

It is an aspect of the present invention wherein the nanoscale organic layer acts as a binder for the nano-enhanced explosive.

It is an aspect of the present invention wherein the nanoscale organic layer may act as a binder for the nano-enhanced explosive and includes, without limitation: a fatty acid, a fatty alcohol, an alkadiene, or 1,7-octadiene, 1,9-decadiene, myrcene, or 1,13-tetradecadiene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, fatty alcohols being tert-butyl alcohol, tert-amyl alcohol, 3-methyl-3-pentanol, ethchlorvynol, 1-octanol (capryl alcohol), pelargonic alcohol (1-nonanol), 1-decanol (decyl alcohol, capric alcohol), undecyl alcohol (1-undecanol, undecanol, hendecanol), lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol, cluytyl alcohol, or 1-octacosanol, 1-nonacosanol, myricyl alcohol, melissyl alcohol, or 1-triacontanol, 1-dotriacontanol (lacceryl alcohol), geddyl alcohol (1-tetratriacontanol), cetearyl alcohol, carboxylic (fatty) acids being butyric acid [CH3(CH2)2COOH], valeric acid [CH$_3$(CH$_2$)$_3$COOH], caproic acid [CH$_3$(CH$_2$)$_4$COOH], enanthic acid [CH$_3$(CH$_2$)$_5$COOH], caprylic acid [CH$_3$(CH$_2$)$_6$COOH], pelargonic acid [CH$_3$(CH$_2$)$_7$COOH], capric acid [CH$_3$(CH$_2$)$_8$COOH], undecylic acid [CH$_3$(CH$_2$)$_9$COOH], lauric acid [CH$_3$(CH$_2$)$_{10}$COOH], tridecylic acid [CH$_3$(CH$_2$)$_{11}$COOH], myristic acid [CH$_3$(CH$_2$)$_{12}$COOH], pentadecylic acid [CH$_3$(CH$_2$)$_{13}$COOH], palmitic acid [CH$_3$(CH$_2$)$_{14}$COOH], margaric acid [CH$_3$(CH$_2$)$_{15}$COOH], stearic acid [CH$_3$(CH$_2$)$_{16}$COOH], nonadecylic acid [CH$_3$(CH$_2$)$_{17}$COOH], arachidic acid [CH$_3$(CH$_2$)$_{18}$COOH], or any combination thereof.

It is an aspect of the present invention wherein the nanoscale organic layer may act as a binder for the nano-enhanced explosive and includes, without limitations: glycols, of various molecular weights, being PEG, PEO, tetraethylene glycol, triethylene glycol, or any combination thereof in mixture with a fatty acid, a fatty alcohol, or an alkadiene.

It is an aspect of the present invention wherein the formulation for the nano-enhanced explosive may be mixed with additives including, without limitation: processing aids, binders, surfactants, thickeners, de-foaming agents, energetic polymers, inert polymers, fluoropolymers, thermal stabilizers, plasticizers, or any combination thereof.

It is an embodiment of the present invention for the formulation of the nano-enhanced explosive to include a binder from about 0.5% to about 20% by total weight and includes, without limitation: waxes; PVP; polyethylene glycol [PEG]; hydroxypropylmethyl cellulose; ESTANE; HYTEMP; methylcellulose; cellulose acetate; cellulose ethers; CAB (cellulose acetate butyrate); ethylene vinyl acetate; ethylene vinyl alcohol; polystyrene plastic; silicone rubber; polyether; epoxides; nitrocellulose; polyurethane rubber; carboxy or hydroxyl-terminated polybutadiene [HTPB—rubber]; polyfluorocarbons; Viton fluoropolymer elastomeror; bis 2,2-dinitropropyl acetate [BDNPA]; bis 2,2-dinitropropyl formal [BDNPA/f]; polyesters; polyfluorocarbons; polyvinyl alcohol; polyvinyl alcohol/polyvinyl ester copolymers; polyacrylates; casein; polyvinyl alcohol/polyvinyl pyrrolidone copolymers; polyvinyl; pyrrolidone; substituted polyvinyl pyrrolidone; styrene-maleic anhydride copolymers; styrene-acrylic copolymers; epichlorohydrin-based polymers; or oxetane-based polymers; PBAN (butadiene-acrylonitrile-acrylic acid terpolymer); PPG (polypropylene glycol); polymethacrylates; or any combination thereof.

It is an embodiment of the present invention for the formulation of the nano-enhanced explosive to include a plasticizer from about 0.5% to about 5.0% by total weight and includes, without limitation: DOA (dioctyladipate or (2-ethylhexyl)adipate); IDP (isodecylperlargonate); DOP (dioctylphthalate); DOM (dioctylmaleate); DBP (dibutylphthalate); oleyl nitrile; bis-dinitropropyl acetyl and bis-dinitropropyl formal (BDNPA/F); dioctyl sebecate (DOS); glycidyl azide polymer (GAP); or any combination thereof.

It is an embodiment of the present invention wherein an oxidizer is added to the formulation of the nano-enhanced explosive from about 1.0% to about 50% by total weight and includes, without limitation: ammonium perchlorate; ammonium nitrate; lithium nitrate; barium chlorate; barium nitrate; cesium nitrate; calcium nitrate; copper nitrate; hexanitroethane; potassium chlorate; potassium nitrate; sodium nitrate; rubidium nitrate; sulfur; chromium trichloride; molybdenum disulfide; iron trifluoride; potassium perchlorate; ammonium dinitramide (ADN); sodium nitrate (SN); potassium nitrate; ammonium nitrate; 2,4,6-trinitro-1,3,5-benzenetriamine (TATB); dinitrotoluene (DNT); DNAN; or any combination thereof.

It is an aspect of the present invention wherein the nanocomposite lends energy to an explosive process with measured energy densities from about −24 kJ/g to about −38 kJ/g.

It is an aspect of the present invention wherein the secondary high explosive may include, without limitation: 5-nitro triazol-3-one (NTO); 2,4,6-trinitrotoluene (TNT); tetranitro-dibenzo-1,3a,4,4a-tetraazapentalene (TACOT); cyclotetramethylene-tetranitramine; tetrahexamine tetranitramine; 1,3,5,7-tetranitro-1,3,5,7-tetrazocane (HMX); 2,2',4,4',6,6'-hexanitrostilbene (HNS); 1,3-diamino-2,4,6-trinitrobenzene (DATB); 1,3,5-triamino-2,4,6-trinitrobenzene (TATB); 1,3,5-trinitrobenzene (TNB); 3,5-dinitro-2,6-bis-picrylamino pyridine (PYX); 2,4-dinitrotoluene; 2,6-dinitrotoluene; nitroglycerine (NG); picrate (NQ); 2,4,6-trinitrophenol; ethylene glycol dinitrate (EGDN); ethylenedinitramine (EDNA); diethylene glycol dinitrate (DEGDN); Semtex; Pentolite; trimethylol ethyl trinitrate (TMETN); 1,3,5,-trinitrobenzene (TNB); tetryl, hexahydro-1,3,5-trinitro-1,3,5-triazine (RDX); T4 1,3,5-trinitro-1,3,5-triazacyclohexane; cyclotrimethylenetrinitramine; pentaerythritol tetranitrate (PETN); triethylene glycol dinitrate (TEGDN); 2,2,2-trinitroethyl-4,4,4-trinitrobutyrate (TNETB); methylamine nitrate; nitrocellulose; N3,N3,N'3,N'3,N7,N7,N'7,N'7-octafluoro-1,5-dinitro-1,5 diazocane-3,3,7,7-tetraamine (HNFX); CL-20 (HNIW); Hexanitro-hexaazaisowurtzitane, nitroguanidine; hexanitrostilbene, 2,2-dinitroethene-1,1-diamin (FOX-7); dinitrourea, and picric acid; AFX 757; CHEMCORE (26% TNT/37% AP/37% AL); PBXN-111 (20% RDX/43% AP/25% AL 12% wax binder); PWX MOD 19 (25% RDX/30% AP/33% AL/12% wax binder); PBXN-110 (88% HMX/12% HTPB binder); nitramine explosive; ammonium nitrate; potassium nitrate; barium nitrate; lead nitrate; potassium perchlorate; ammonium perchlorate; NQ (nitroguanidine); Cyclonite; octahydro-1,3,5,7-tetranitro-1,3,5,7-tetrazocane; Composition B (RDX-cyclotrimethylenetrinitramine and TNT-2,4,6-trinitrotoluene); Tritonal (TNT and aluminum powder); cyclotols (RDX and TNT in ratios of 75:25 to 60:40); Amatol (ammonium nitrate and TNT); Kalatol (potassium nitrate and TNT); Baratol (barium nitrate and TNT); Pentolite (PETN-pentaerythritol tetranitrate and TNT); and Baronal (barium nitrate, aluminum and TNT). The secondary high explosive may also include without limitation a plastic or putty explosive, which is hand malleable, such as composition 4, or C4, which includes approximately 91% 1,3,5-trinitroperhydro-1,3,5-triazine; 6% plasticizer, (diethylhexyl or dioctyl sebacate) and 2% plastic binder by weight, a polymer bonded explosive such as LX-14 (96% 1,3,5,7-tetranitro-1,3,5,7-tetrazocane and 4% polymer binders; or any combination thereof.

It is yet another aspect of the present invention for the nanocomposite to have Li$_3$AlH$_6$ nanoparticles with a diameter from about 15 nm to about 100 nm and the elemental Al nanoparticles to have a diameter from 7 nm to 100 nm.

It is yet another aspect of the present invention for the nanoscale organic layer about the surfaces of both core metal nanoparticles to be fractionally tuned from 5% to 75% by weight to modify the burn rate characteristics of the nanocomposite.

It is an aspect of the present invention wherein the nano-enhanced explosive formulation is used as in-line elements of an explosive train being a fuse, an initiator, a booster, or a main charge for munitions consisting of hand grenades; landmines; water reactive munitions; artillery shells, depth charges; an anti-tank warhead; anti-aircraft missile warhead; or shaped charges.

It is an aspect of the present invention for the nanoscale organic layer for both $Li_3AlH_6$ nanoparticles and elemental Al nanoparticles to impart air stability to the nanocomposite for safe handling in ambient conditions and wherein the nanoscale layer contains an oxygen atom mass from 5% to 34%.

It is yet another aspect of the present invention wherein any one of $nMx_{12}$-$nMx_{20}$, may be used to enhance a secondary high explosive, and then is associated with UV curable photopolymers being acrylates; monomers; oligomers; bismaleimides; thermosetting epoxies; urethanes; polyesters; silicones; and their combinations and blends or thermoplastic polyurethane, styrene block-copolymers, thermoplastic silicone elastomer, aliphatic or semi-aromatic polyamides, thermoplastic vulcanisate, acrylonitile butadiene styrene, polylactic acid, polyvinyl alcohol, polycarbonate, polylactic acid, acrylonitrile-butadiene-styrene (ABS), polylactic acid, polymethylmethacrylate, polyethylene, polypropylene, polystyrene, nylon, polycarbonate, polyvinyl chloride, Teflon, or any combination thereof for 3D printing in-line elements for an explosive train requiring custom shapes embedded with the nano-enhanced explosive.

BRIEF DESCRIPTION OF THE FIGURES

In order that the present invention is clearly understood and practiced, the following non-limiting figures are given. However, these figures are not intended to narrow the scope of the invention, but to show exemplary embodiments thereof.

FIG. 1 depicts a three-step explosive train known within the arts. A confined shell a.) houses an explosive train that includes three in-line elements being a fuse b.); an initiator c.); and a main charge d.). Prior art teaches that each in-line element is an ignitable material or a primary or secondary high explosive that can be interchanged with different explosive materials. The fuse can be gun powder that is ignited by a spark that sets off shockwaves within the initiator, usually being a primary or secondary high explosive, which then kickstarts a shockwave within the main charge causing rapid combustion within the confined shell a.) rendering an explosion due to the buildup of heat, and gaseous pressure.

FIG. 2 depicts a four-step explosive train known within the arts. A confined shell a.) houses an explosive train that includes four in-line elements being a fuse e.); an initiator f.); a booster material g.) and a main charge h.). Prior art teaches that each in-line element is an ignitable material or a primary or secondary high explosive that can be interchanged with different explosive materials. The fuse can be gun powder that is ignited by a spark that sets off shock waves within the initiator, usually being a primary or secondary high explosive, which then kickstarts a shockwave within a booster material that sends amplified shockwaves into the main charge causing an increase in rapid combustion within the confined shell a.) rendering an increased explosion due to the buildup of heat, and gaseous pressure.

GENERAL EMBODIMENT OF THE INVENTION

Figure 3:
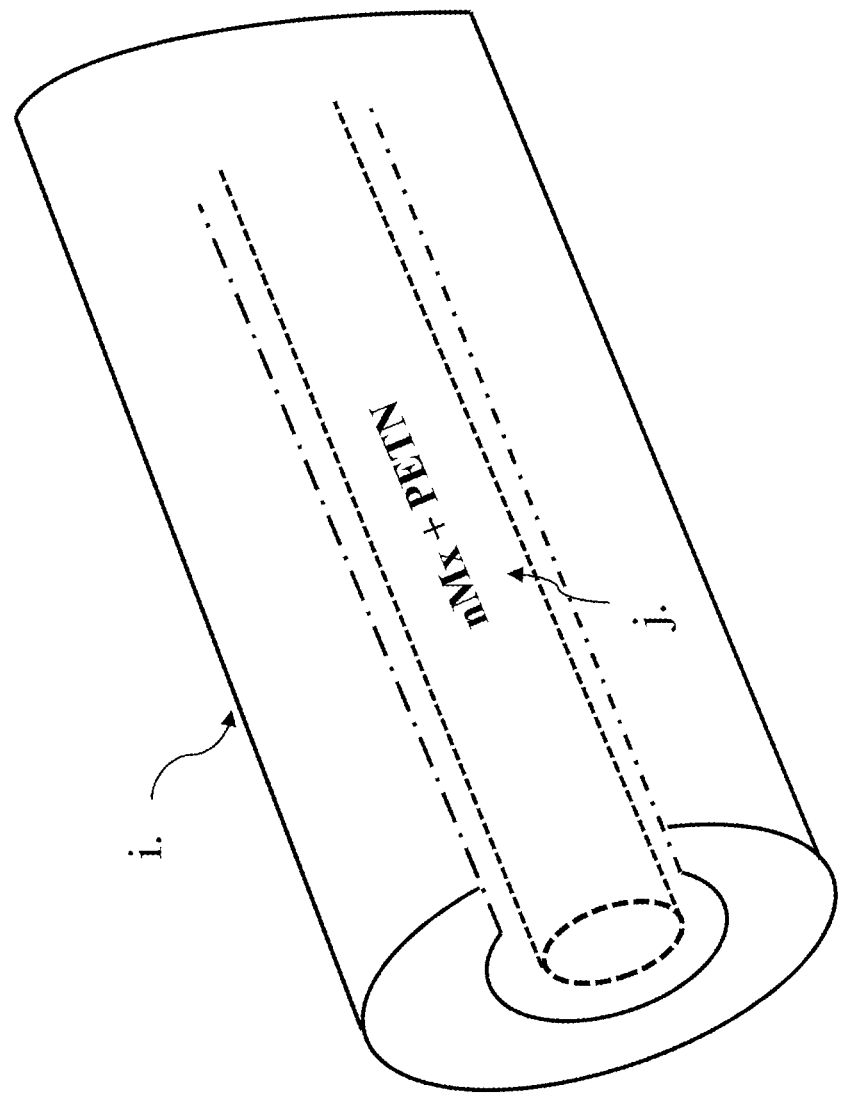
FIG. 3 is a cross section view of a detonation cord i or fuse that includes our nano-enhanced explosive j as the explosive material that is packed into a flexible sheath of cord i, where the cord i is hollow and has a distal terminal end that is directly connected to an initiator (not shown) within an explosive train.

From this point forward, the following words disclose our nano-enhanced explosive, methods for creating the nanocomposite, methods for making our explosive, and the explosive's use within various in-line elements of an explosive train. Our invention includes a singular material having two distinct nanoparticles, an amount of Ti metal, and an organic nanoscale layer, i.e., lithium aluminum hexahydride ($Li_3AlH_6$) and elemental aluminum nanoparticles with an amount of Ti metal having passivated surfaces that display unique burning characteristics that lend energy to explosions when admixed with a secondary high explosive. The nanocomposite is air stable for safe handling in air when mixing with a secondary high explosive. However, our words are not a limitation on the scope of the present invention but are written to detail certain embodiments thereof. After reading the detailed description, modifications will become apparent to those skilled in the art, and those modifications are intended to be covered by our disclosure.

Definitions

The terms "nanoparticle," "NP(s)," or "nanomaterial" generally refer to very small particles having all three dimensions from about 1 nm and to about 100 nm. Nanoparticles have a greater number of surface atoms relative to the same chemical species in bulk or microscale (µm) form. In contrast, for bulk materials larger than one micrometer, the percentage of atoms at the surface is minuscule relative to the total number of atoms within the material, which is why bulk materials generally have uniform physical properties throughout regardless of its size. Because the percentage of atoms at the surface of a nanomaterial are significantly higher than that of the bulk form, nanomaterials demonstrate chemical and physical properties that are not found in the bulk, even when that bulk material includes a dispersion of nanocrystalline domains [12, 13].

Nanoparticles are so small that their physical properties are not constant as a function of their size because the percentage of atoms at the surface of a material becomes significant, where these unique size dependent properties can be described using quantum physics. For nanospheres, size-dependent properties are observed, such as surface plasmon resonance in some metal particles, or increased magnetism for a metal that is significantly diminished as the metal moves into its bulk form.

Our invention examines and provides for air stable nanoparticles that exhibit unique burning characteristics synthesized via a controlled bottom up reaction. Due to the larger number of atoms at our nanoparticle surfaces, fundamentally new combustion and hydrogen evolution behaviors are observed when our material is kept at the nanoscale, while being air stable, i.e. the present invention stabilizes $Li_3AlH_6$ nanoparticles and elemental Al metal nanoparticles, which are more combustible than their bulk metal counterparts.

The term "nMx" generally refers to a singular material, being a nanocomposite of lithium aluminum hexahydride nanoparticles, $Li_3AlH_6$, elemental Al metal nanoparticles, an amount of Ti metal, and a nanoscale organic layer. nMx exists in various iterations according to the nanoscale organic layer used to passivate the surfaces of the core metals. Passivation makes nMx air-stable and protects and preserves the combustion properties of the singular material isolated from the decomposition of $LiAlH_4$.

The term "singular material" generally refers to the nanocomposite nature of nMx being a homogeneous mixture of two distinct nanoparticles, $Li_3AlH_6$ nanoparticles, elemental Al metal nanoparticles, and an amount of Ti metal. All aspects of both core metals are subjected to nanoscale organic passivation.

The term "passivation" generally refers to a process of covering or modifying the outer surfaces of a core material, being nanoparticles, to kinetically stabilize otherwise reactive molecules, where the stabilization substantially slows the ability of the underlying core material to react with oxidative or solvolytic agents.

The terms "nanoscale organic layer," "NSOL," "capping agents," or "passivation agents" generally refer to organic ligands or monomeric materials capable of polymerization or polymeric materials that cover the outer surfaces of two distinct core metals, being nanoparticles, to kinetically stabilize otherwise reactive nanoparticles, where the stabilization substantially slows the ability of the underlying core material to react with oxidative or solvolytic agents.

The term "explosive(s)," "secondary high explosive(s)," or "explosive material(s)" generally refer(s) to chemical compounds that rapidly and violently decompose when subjected to heat, striking, or a detonation, to release a large amount of energy in the forms of additional heat, potential flames, shockwaves, and an increased pressure (volume) of hot gases. The rapid and large release of heat and gases kickstart a propagating shockwave through the reactive material at, about, or above the speed of sound creating a destructive force and a loud sound. It is a preferred embodiment of the present invention where at least one iteration of our nMx nanocomposite is admixed with chemical composition being at least one secondary high explosive including but not limited to: 5-nitro triazol-3-one (NTO); 2,4,6-trinitrotoluene (TNT); tetranitro-dibenzo-1,3a,4,4a-tetraazapentalene (TACOT); cyclotetramethylene-tetranitramine; tetrahexamine tetranitramine; 1,3,5,7-tetranitro-1,3,5,7-tetrazocane (HMX); 2,2',4,4',6,6'-hexanitrostilbene (HNS); 1,3-diamino-2,4,6-trinitrobenzene (DATB); 1,3,5-triamino-2,4,6-trinitrobenzene (TATB); 1,3,5-trinitrobenzene (TNB); 3,5-dinitro-2,6-bis-picrylamino pyridine (PYX); 2,4-dinitrotoluene; 2,6-dinitrotoluene; nitroglycerine (NG); picrate (NQ); 2,4,6-trinitrophenol; ethylene glycol dinitrate (EGDN); ethylenedinitramine (EDNA); diethylene glycol dinitrate (DEGDN); Semtex; Pentolite; trimethylol ethyl trinitrate (TMETN); 1,3,5,-trinitrobenzene (TNB); tetryl, hexahydro-1,3,5-trinitro-1,3,5-triazine (RDX); T4 1,3,5-trinitro-1,3,5-triazacyclohexane; cyclotrimethylenetrinitramine; pentaerythritol tetranitrate (PETN); triethylene glycol dinitrate (TEGDN); 2,2,2-trinitroethyl-4,4,4-trinitrobutyrate (TNETB); methylamine nitrate; nitrocellulose; N3,N3,N'3,N'3,N7,N7,N'7,N'7-octafluoro-1,5-dinitro-1,5 diazocane-3,3,7,7-tetraamine (HNFX); CL-20 (HNIW); Hexanitrohexaazaisowurtzitane, nitroguanidine; hexanitrostilbene, 2,2-dinitroethene-1,1-diamin (FOX-7); dinitrourea, and picric acid; AFX 757; CHEMCORE (26% TNT/37% AP/37% AL); PBXN-111 (20% RDX/43% AP/25% AL12% wax binder); PWX MOD 19 (25% RDX/30% AP/33% AL/12% wax binder); PBXN-110 (88% HMX/12% HTPB binder); nitramine explosive; ammonium nitrate; potassium nitrate; barium nitrate; lead nitrate; potassium perchlorate; ammonium perchlorate; NQ (nitroguanidine); Cyclonite; octahydro-1,3,5,7-tetranitro-1,3,5,7-tetrazocane; Composition B (RDX-cyclotrimethylenetrinitramine and TNT-2,4,6-trinitrotoluene); Tritonal (TNT and aluminum powder); cyclotols (RDX and TNT in ratios of 75:25 to 60:40); Amatol (ammonium nitrate and TNT); Kalatol (potassium nitrate and TNT); Baratol (barium nitrate and TNT); Pentolite (PETN-pentaerythritol tetranitrate and TNT); and Baronal (barium nitrate, aluminum and TNT). The secondary high explosive may also include without limitation a plastic or putty explosive, which is hand malleable, such as composition 4, or C4, which includes approximately 91% 1,3, 5-trinitroperhydro-1,3,5-triazine; 6% plasticizer (e.g. diethylhexyl or dioctyl sebacate) and 2% plastic binder (e.g. polyisobutylene) by weight, or in contrast a polymer bonded explosive such as LX-14 (96% 1,3,5,7-tetranitro-1,3,5,7-tetrazocane and 4% polymer binders (e.g. estane & 5702-F1)).

The term "detonation" generally refers to the swift combustion of a fuel into energetic gases that expand where energy is released by heat, shock and a noise.

The term "explosive train" generally refers to a triggering sequence of in-line elements being a fuse, an initiator, an optional booster, and a main charge, where the fuse sends energy to the initiator to create shockwaves that enter and propagate through a main charge to initiate a rapid decomposition of a chemical compound resulting in an explosion.

The term "shockwave velocity" generally refers to the speed at which a shockwave propagates through an explosive material.

The term "Gurney Energy" generally refers to the kinetics imparted to metal, or other materials, that surround(s) an explosive when detonated. The speed at which metal fragments explode outward are a function of the explosive's shockwave velocity and energy imparted to the metal by explosive gases. There are various Gurney equations that change based on the size and shape of an incendiary device. For example, a spherical shaped charge, exploding from its core, can be defined as:

$$V \div \sqrt{2E} = (M/C + 3/5)^{-1/2};$$

where V is the velocity of the fragmented metal, $\sqrt{2E}$ is the Gurney constant, M is the mass of the fragmented metal, C is the mass of the explosive, and M is the mass of the fragmented metal.

The term "blast" generally refers to multiple phenomena, but blast is usually used to refer to a quantification of the energy delivered by, and effectiveness of, an explosive based on pressure differentials, an explosion. Blast could also be defined as the detonation pressure, or peak dynamic pressure, in the shock front of an explosive.

The terms "munition" or "ordnance" generally refer to "[a]mmunition and components produced for or used by armed forces for nation security defense. It includes ammunition products under the control of the Department of Defense, the U.S. Coast Guard, the Department of Energy, and the National Guard. The term also includes confined gases, liquid, and solid propellants; explosives; pyrotechnics; chemical and riot control agents; smokes and incendiaries; bulk explosives; chemical agents; chemical munitions; rockets; guided and ballistic missiles; bombs, warheads; mortar rounds; artillery munitions; small arms ammunition; hand and rifle grenades; land and underwater mines; torpedoes; depth charges; cluster munitions and dispensers; demolition charges; exploding bolts; claymores; or thermobaric devices" [14].

The term "binder" generally refers to the property of nMx's nanoscale organic layer or an additional chemical agent used to bond, and/or desensitize, or affect the overall mechanical properties of our formulation being a secondary high explosive admixed with our nanoparticles.

The term "thermite" generally refers to a combustible material that intramolecularly coexists with its oxidant and does not require an external oxygen supply to sustain the ensuing redox reaction, e.g. the material exhibits self-sustaining combustion in an inert environment.

The term "nanothermite" generally refers to a thermite material composed of nanoparticles.

The term "organic ether" generally refers to an oxygen-containing hydrocarbon comprised of connecting ether C—O—C bonds, i.e. an oxygen atom connected to alkyl or aryl groups.

The term "amu" generally refers to atomic mass unit, a unit of molecular mass measurement relative to a carbon-12 standard.

The term "polymerization" generally refers to a chemical process of bonding together multiple repeating units of a monomer, or differing molecules, to form a larger chain-like matrix, or network type structure. The monomer molecules may be alike, or they may represent two, three, or more different compounds. Combined monomers make a product that has certain unique physical properties such as elasticity, high tensile strength, or the ability to form fibers that differentiate polymers from substances composed of smaller and simpler molecules; often, many thousands of monomer units are incorporated in a single molecule of a polymer. The formation of stable covalent chemical bonds between the monomers sets polymerization apart from other processes, such as crystallization, in which large numbers of molecules aggregate under the influence of weak intermolecular forces.

The term "copolymerization' generally refers to the process of two or more different monomers bonding together to polymerize.

The term "organic matrix" generally refers to a three-dimensional interwoven net of polymer molecules that encompass a core nanoparticle material, or the ability of non-polymeric materials being monolayers about the surfaces of the nanoparticles to self-assemble.

The term "isolated nanoparticles" generally refers to metal containing cores that are not in direct contact such that they do not form micron scale metal aggregates.

The term "initiator" generally refers to a chemical that speeds up a reaction and is consumed in the reaction. In the present invention Ti alkoxide initiates the decomposition of $LiAlH_4$, is consumed, and becomes part of the final nanocomposite. However, the term also refers to an in-line element of an explosive train used to denote a secondary high explosive.

The term "pyrophoric" generally refers to the ability of true nanoparticles to spontaneously burn in air.

The term "air stable or "air stability" generally refers to our observation that the metal nanoparticles of $nMx_{12}$-$nMx_{20}$ neither spontaneously ignite nor rapidly react within seconds with ambient oxygen in air, primarily from $H_2O$ and $O_2$. $nMx_{12}$ through $nMx_{20}$ are all air stable when using proper preparation methods as disclosed herein. $nMx_{10}$ is unstable in air, where larger amounts have pyrophoric hot spots that spontaneously ignite. $nMx_{11}$ is not as pyrophoric as $nMx_{10}$, but larger quantities have pyrophoric hot spots, also making the material slightly air unstable.

The term "air sensitive" or "air sensitivity" generally refers to a similar but different property than air stability of reactive materials. Air sensitivity is the tendency for an energetic material to slowly react in air (primarily with water and molecular oxygen) to lose energy density. This loss of energy density may take place over the timescale of fractions of an hour, days, weeks, or longer periods of time. The air sensitivity of nMx is at a minimum for $nMx_{12}$ and $nMx_{13}$.

The term "terminal O—H cleavage" generally refers to the severing of an oxygen-hydrogen bond in an alcohol or carboxylic acid with a hydroxyl functionality at the end of a hydrocarbon chain.

The term "dispersed" generally refers to a nonuniform distribution of nanoparticles or nanocrystalline deposits within a micron sized bulk material.

The terms "energy," "enthalpy," "heat" or "energy density" are generally used interchangeably herein, where the important quantitative measurement of heat is via enthalpies. The amount of combustible energy, or heat, generated via a reaction is dictated by the chemical and energetic properties of the source material. Energy, (E), for combustion reactions may be defined as:

$$E = q + w,$$

where (E) is the sum of heat (q) plus work (w). Heat and work are typically path functions. Heat is the energy flow associated with changes in temperature of the source material. Work may take many forms, but it is typically associated with the ability of the heat energy to bring about mechanical or physical changes to its surroundings.

The term "work," as it relates to combustion processes, may be generally defined by the equation:

$$w = -P\Delta V,$$

where P=pressure against the system it is working upon, and $\Delta V$ is the system volume change.

The term Enthalpy (H) generally refers to the equation:

$$H = E + PV.$$

Energy and enthalpy are state functions that give enthalpy as equal to heat at constant pressure ($q_p$):

$$H = q_p.$$

Therefore, enthalpy is typically called "heat" and the "enthalpy of combustion" is called "heat of combustion," where the heat of combustion, ΔH°, indicates the amount of heat energy created per mol of a burning source material [kJ/mol]. The heat of combustion, or the heat of reaction, is defined by the following equation:

$$\Delta H°_{reaction} = \Delta H°_f(\text{products}) - \Delta H°_f(\text{reactants}),$$

ΔH° reaction of a chemical reaction is the net difference for the amount of heat gained or lost between the products and reactants under constant pressure in relation to the amount of work being done by the reaction, given as ΔH°$_f$(products)–ΔH°$_f$(reactants). More importantly, enthalpy is the heat per unit amount of substance. It is most often expressed as kJ/mol (molar heat), kJ/g (gravimetric energy density), or kJ/cm$^3$ (volumetric energy density).

The term "thermoplastic" generally refers to thermoplastic polyurethane, styrene block-copolymers, thermoplastic silicone elastomer, aliphatic or semi-aromatic polyamides, thermoplastic vulcanisate, acrylonitrile butadiene styrene (ABS), polylactic acid, polyvinyl alcohol, polycarbonate, polymethylmethacrylate, polyethylene, polypropylene, polystyrene, nylon, polycarbonate, polyvinyl chloride, Teflon, or any combination thereof.

The term "base material" generally refers to a feed stock for a 3D printer being a mixture of a thermoplastic polymer suitable for 3D printing, an amount of an admixture being at least one nMx nanocomposite and a secondary high explosive, and other optional fuels, additives, binders, stabilizers, and the like.

The term "Ti" generally refers to the chemical element titanium. It is a transition metal with atomic no. 22. In the current invention, it is associated with the nanoparticles of Li$_3$AlH$_6$ and elemental Al and is generated from a titanium (IV) compound, a titanium(IV) tetraalkoxylate, titanium(IV) isopropoxide (Ti(O$^i$Pr$_4$), or a titanium(IV) tetraaryloxylate.

LiAlH$_4$ Decomposition Via a Bottom Up Reaction

It is an embodiment of the present invention to provide those wanting to practice nano-enhanced explosives the methods for making various iterations of nMx, the importance of Ti based catalysis, the importance of passivation of the nanocomposite, and other characteristics thereof. The present invention harnesses the high energy densities of Li$_3$AlH$_6$ nanoparticles and elemental Al nanoparticles for enhancing secondary high explosives by exploiting the thermal catalytic decomposition of LiAlH$_4$. A bottom up reaction gives a final composite that has a greater number of surface atoms resulting in increased energy densities for each nanoparticle. The precise reaction method uses a catalyst to ensure that a significant number of both nanoparticles are generated and the nanoscale organic layer successfully air stabilizes and preserves the much-desired energetic potential of the final nMx nanocomposite.

Our precise reaction uses a co-solvent system of tetrahydrofuran (THF) and toluene. We dissolve LiAlH$_4$ in THF. The toluene co-solvent is not capable of dissolving the LiAlH$_4$ but serves as a solvent and heat sink for the reaction mixture when the reaction temperature is increased to 85° C. The high boiling point of toluene (110° C.) is much larger than the boiling point of THF (66° C.), which is expected to boil off partially even under reflux at 85° C. The volume to volume ratio of toluene to THF is about 5.8 to 1 in the co-solvent mixture. The LiAlH$_4$ powder is added first to the reaction flask followed by the co-solvents. When adding the co-solvents, the toluene is added first followed by the THF.

The passivation agent is added 10 minutes after the addition of the titanium isopropoxide solution is completed. It is an embodiment of the present invention wherein the full reaction time is about 40 minutes to about 2 hours. The reaction starts when the nanoscale organic layer is added to the reaction mixture, and the reaction ends when the reaction mixture is put under vacuum boil.

The molar ratio (moles of elemental Al nanoparticles and Li$_3$AlH$_6$ nanoparticles divided by the moles of nanoscale organic layer) differs between nMx iterations. The nMx cores are composed of 2 moles of elemental Al nanoparticles for 1 mole of Li$_3$AlH$_6$ nanoparticles. For nMx$_{12}$, the molar ratio of nMx (Al NPs and Li$_3$AlH$_6$ NPs) to stearyl alcohol is 7.9:1. Therefore, the molar ratio of elemental Al nanoparticles to Li$_3$AlH$_6$ nanoparticles to stearyl alcohol is 5.2: 2.6:1.

For nMx$_{13}$, the molar ratio of nMx to oleic acid is also 7.9:1. For nMx$_{16}$, the molar ratio of nMx to capping agents is 6.3:1. For nMx$_{19}$, the molar ratio of nMx to capping agent is 49:1. This molar ratio is very high due to the molecular weight of the PEG molecules. For nMx$_{20}$, the molar ratio of nMx to capping agent is 4.4:1. In nMx$_{11}$, the nanoscale organic layer is not a self-assembled monolayer but nMx$_{11}$ cores initiate a PIERMEN (polymerization initiation by electron rich metal nanoparticles) capping mechanism. So, the molar ratio of nMx$_{11}$ to epoxydecene (monomer) to octadiene (monomer) is 10:1:2.

Although nanocrystals of Li$_3$AlH$_6$ and Al metal are observed via a top down synthesis, i.e. decomposing LiAlH$_4$ by high energy ball milling, using force to create our composite is problematic. Ball milling is a mechanical process, where chemical reactions are carried out by striking powder reactants with fast moving heavy balls. Strikes from the balls grind down reactants forcing a chemical change.

Surface and interface contamination is a major concern for nanocrystalline materials made by high-energy ball milling. The force from the striking balls causes surface interactions of nascent nanoparticles to cold weld the particles together, which makes an aggregate that is difficult or impossible to disrupt. The milling balls themselves can contribute to contamination as well in the reactant materials. Ambient gases (trace impurities such as O$_2$, N$_2$ in rare gases) are also problems. One can take precautions in reducing these contaminations, but, because there is no true control over the reaction or reaction species, other than controlling milling time, there is no control on nanoparticle morphology, agglomerates, and residual strain on the crystalline structures formed through force.

Cold welding reduces the surface area of the final ball milled material, thereby reducing the observed energy output of the same. Cold welding is an unavoidable side effect of ball milling Cold welding not only creates a distribution of unwanted chemical species in the reaction vessel, but also contributes to a large distribution size of the final products, where one can observe nanoparticles, microparticles, and species that are essentially bulk metals [15].

Ball milling removes our ability to properly isolate true Li$_3$AlH$_6$ nanoparticles and elemental Al metal nanoparticles without impurities during the decomposition of LiAlH$_4$. Ball milling would also remove our ability to control the particle size of our composite. Strikes from the balls would inevitably crack and damage our nanoscale organic layer used to protect and preserve the composite. This would result in a pyrophoric material that is unsafe for handling. It could also affect the combustion properties of the composite material and if an oxide layer forms about the core metal surfaces, this could result in a noticeable reduction in the unique burning properties of our invention. Therefore, it is a preferred embodiment of the present invention for the decomposition of LiAlH$_4$ to be carried out via the bottom up reactions as detailed below.

Catalytic Decomposition of LiAlH$_4$ to Create Nanoparticles

It is an embodiment of the present invention to add an alkoxide catalyst to the reaction vessel to facilitate LiAlH$_4$ decomposition, which ensures that a sufficient number of both nanoparticles are created. We precisely push and pull between reaction temperature, reaction time, and catalyst amount to create a system that holds LiAlH$_4$ decomposition at the first reaction step, where the resulting invention includes the two distinct nanoparticles, an amount of Ti metal, and a nanoscale organic layer for passivation. The alkoxide or Ti catalyst for the present invention may include, without limitation, a titanium(IV) compound, a titanium(IV) tetraalkoxylate, such as titanium(IV) isopropoxide, or a titanium(IV) tetraaryloxylate, or any combination thereof. However, it is an embodiment of the present invention where the alkoxide catalyst is titanium isopropoxide (Ti(O$^i$Pr$_4$, 97%).

Although ball milling will not give the high energy nanoparticles of the present invention, the technique lends insight into: 1.) the stability of LiAlH$_4$, 2.) the difficulty of using alkoxide catalysts with ball milling, 3.) the sensitivity of Li$_3$AlH$_6$, and 4.) a possible explanation as to why there are trace amounts of Ti metal in our final composite absent cold welding and traditional alloying methods at the nanoscale level brought on by ball milling [7, 16, 17].

Ball milling studies indicate that, without a catalyst, LiAlH$_4$ decomposition is difficult to achieve. The preferred catalyst for LiAlH$_4$ decomposition via ball milling is a Ti halide. When an alkoxide is used as a catalyst for this decomposition, impurities are observed [7]. In comparison, the present invention cannot use Ti halide catalysts such as TiCl$_4$ due to the formation of chloride impurities during the reaction.

Catalytic decomposition of LiAlH$_4$ via ball milling shows that short grind times are necessary to ensure that newly formed Li$_3$AlH$_6$ does not further decompose into the second and third decomposition reactions and that Ti alkoxide catalysts are detrimental to ball milling LiAlH$_4$, and, as such, Ti halides are the preferred catalysts for the ball milling experiments [16].

Without the use of a catalyst, the decomposition of LiAlH$_4$ is a relatively slow reaction [16]. The method of making the present invention is a delicate push and pull between reaction temperature, reaction time, and catalyst amount used to create a system that holds the decomposition of LiAlH$_4$ to its first reaction step, where we create nanoparticles of both Li$_3$AlH$_6$ and elemental Al metal. The reaction is performed below 100° C. to stop Li$_3$AlH$_6$ from further decomposition.

Not to be bound by theory, but, the true nature of Ti's catalytic effect on metal hydride decomposition is open for debate. For the present invention, Ti alkoxides are more like nanoparticle initiators, where the alkoxide reacts with LiAlH$_4$ to form molecular seeds by which the nanoparticles grow and where there are Ti remnants associated with the metals surfaces of both Li$_3$AlH$_6$ and elemental Al nanoparticles.

With the catalytic decomposition of NaAlH$_4$ with TiCl$_4$ by ball milling, Balema et al. observed a nascent Ti-Alloy phase form between Ti and Al [17]. If this true, then it is possible that unbound Ti from our alkoxide catalyst could readily bind to the highly reactive surfaces of our core nanoparticles before passivation with the nanoscale organic layer. We propose that Ti—Al and Ti—Li$_3$AlH$_6$ bonds form in our nanocomposite at about 0.5% wt to about 1.0% wt of Ti metal in our final composite.

nMx and the Importance of Passivation

The present invention discloses a singular material that is a nanocomposite made of elemental aluminum nanoparticles, lithium aluminum hexahydride nanoparticles, an amount of Ti metal, and a nanoscale organic layer. We named this composite material nMx, which is air stable and protects and preserves the combustion properties of the composite isolated from the first reaction step of LiAlH$_4$ decomposition. We created a range of composites, nMx$_{10}$-nMx$_{20}$, based on the capping agents used to passivate their surfaces.

In our reactions, when we passivate the core nanoparticles, we can either use monomeric organic materials that self-assemble about the surfaces of the nanoparticles or organic polymers that form a matrix about the same. Monomers passivate the outer surfaces of the core nanoparticles and then polymerize on nascent nanoparticle surfaces. Passivating with monomers may (in the case of dienes) or may not (in the case of fatty acids or alcohols) polymerize. If polymerization ensues, then the resulting polymer caps protect the underlying core material. However, the actual act of passivation can still be done by either a monomer type material or a polymeric type material. Nanoscale organic layers that are epoxyalkenes and alkadienes form monolayers around the nanoparticles (molecules that are tethered to the nanoparticle surface, but are only weakly interacting with each other through intermolecular forces).

Passivation of our nanoparticle surfaces serves multiple purposes. It controls particle size and distribution, prevents aggregation to keep the core metals as isolated nanoparticles, passivation blocks impurities that may form on particle surfaces, controls morphology and shape of the nanoparticles, and gives air stability, thereby getting rid of unwanted burning in ambient conditions. It is an embodiment of the present invention where the shape of the nanoparticles are a function of the passivation agent used and the nanometer scale. The shapes range from equant to 1 dimensional structures and may be spheroidal to rod shaped as well.

Elemental Al and Li$_3$AlH$_6$ nanoparticles are very sensitive and dangerous to work with. In their unpassivated states, these particles are highly reactive and will spontaneously ignite and burn in ambient conditions. Because of the danger related to the core metals' high reactivity, our nanoparticle surfaces are altered to ensure air stability and removes the possibility of flammability and pyrophoricity in air over a period of time. This makes nMx safe to handle in air and to transport for use in applications.

Many passivation strategies have been reported. For micron-sized particles, simple oxide passivation may be useful since an oxide coating of tens of nanometers up to hundreds of nanometers thick can account for only a few percent or less of the total particle mass. For larger particles, alternatives to oxide passivation of aluminum that provide increased energy content include graphite, polymer, or transition metal coatings.

For nanoscale particles, Jouet and coworkers reported nano-Al stabilization with perfluorocarboxylic acid monolayer coatings while Foley and coworkers reported effective transition metal capping of nano-aluminum [18, 19]. Additional metal coating and passivation techniques would be a great advantage. However, most passivation techniques for Al nanoparticles are very expensive, are not scalable for mass production levels, and lack the chemistry needed to keep the passivated particles stable in air for more than a few hours.

nMx Air Stability & Air Sensitivity

It is an embodiment of the present invention where the highly reactive $Li_3AlH_6$ nanoparticles and the elemental Al nanoparticles are safe to handle in air without the concern of immediate combustion with ambient moisture or oxygen while transporting them for use in other applications. However, as we measure the energetic properties of our invention with different passivating agents, we observe that air stability and sensitivity strongly correlate with the oxygen atom content of the nanoscale organic layer. nMx's air stability fluctuates as the oxygen atom content increases in the same.

Figure 8:
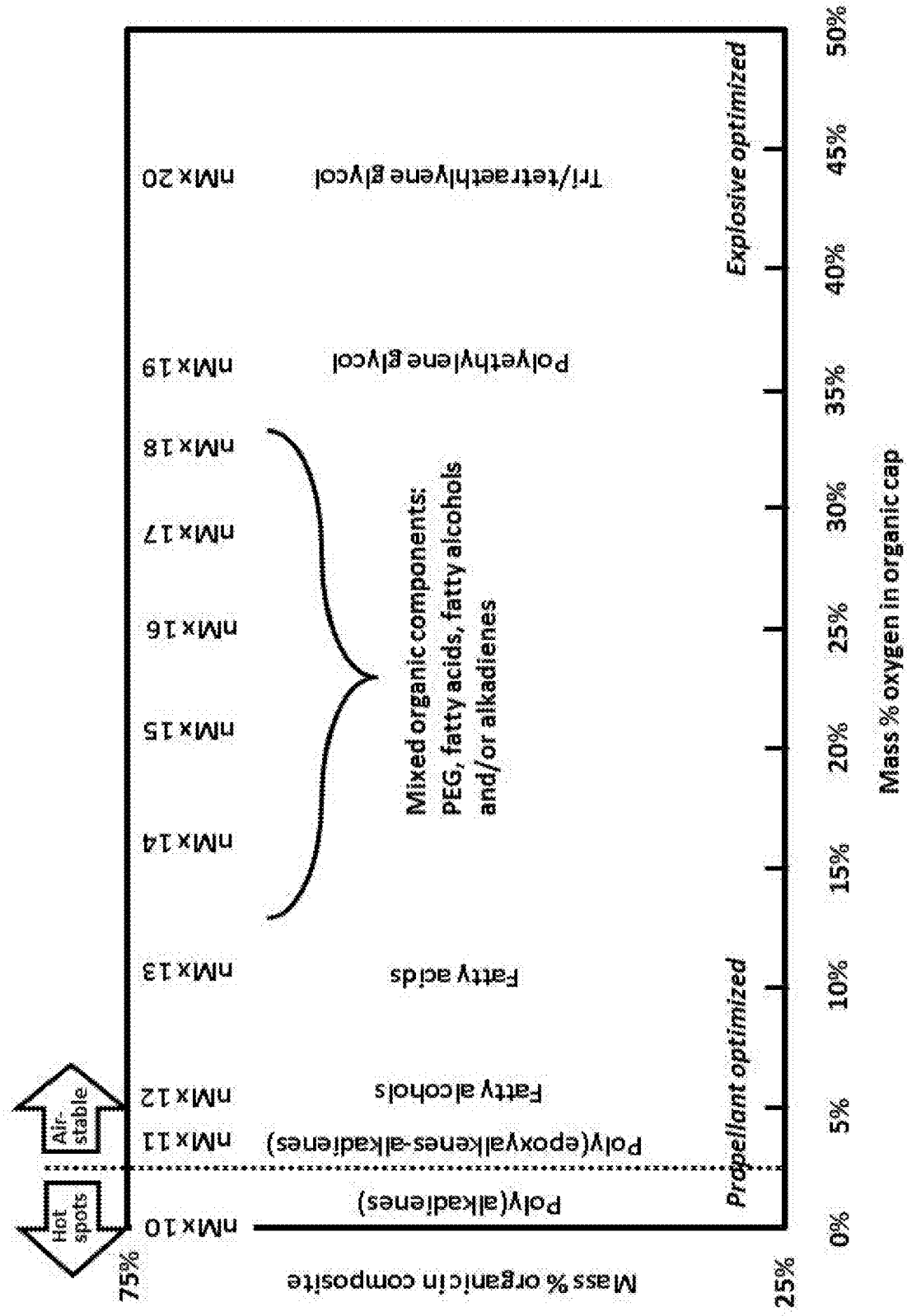
FIG. 8 depicts, in chart form, variations in the oxygen atom mass percentages for the nanoscale organic layer used between $nMx_{10}$ and $nMx_{20}$. The nMx nanocomposites between $nMx_{10}$ and $nMx_{20}$ has oxygen atom (O) mass percentages between 0% and 42% respectively. The x-axis of FIG. 8 shows the variation in passivation agents. The y-axis of FIG. 8 represents the total mass fraction of organic in the nanocomposite. At one end, $nMx_{10}$ has a polymerized organic hydrocarbon cap, where the O atom mass percentage is 0%, and, at the other end, $nMx_{20}$, having polyethylene oxide capping structure, has an O atom mass percentage of ~42%.
Figure 9:
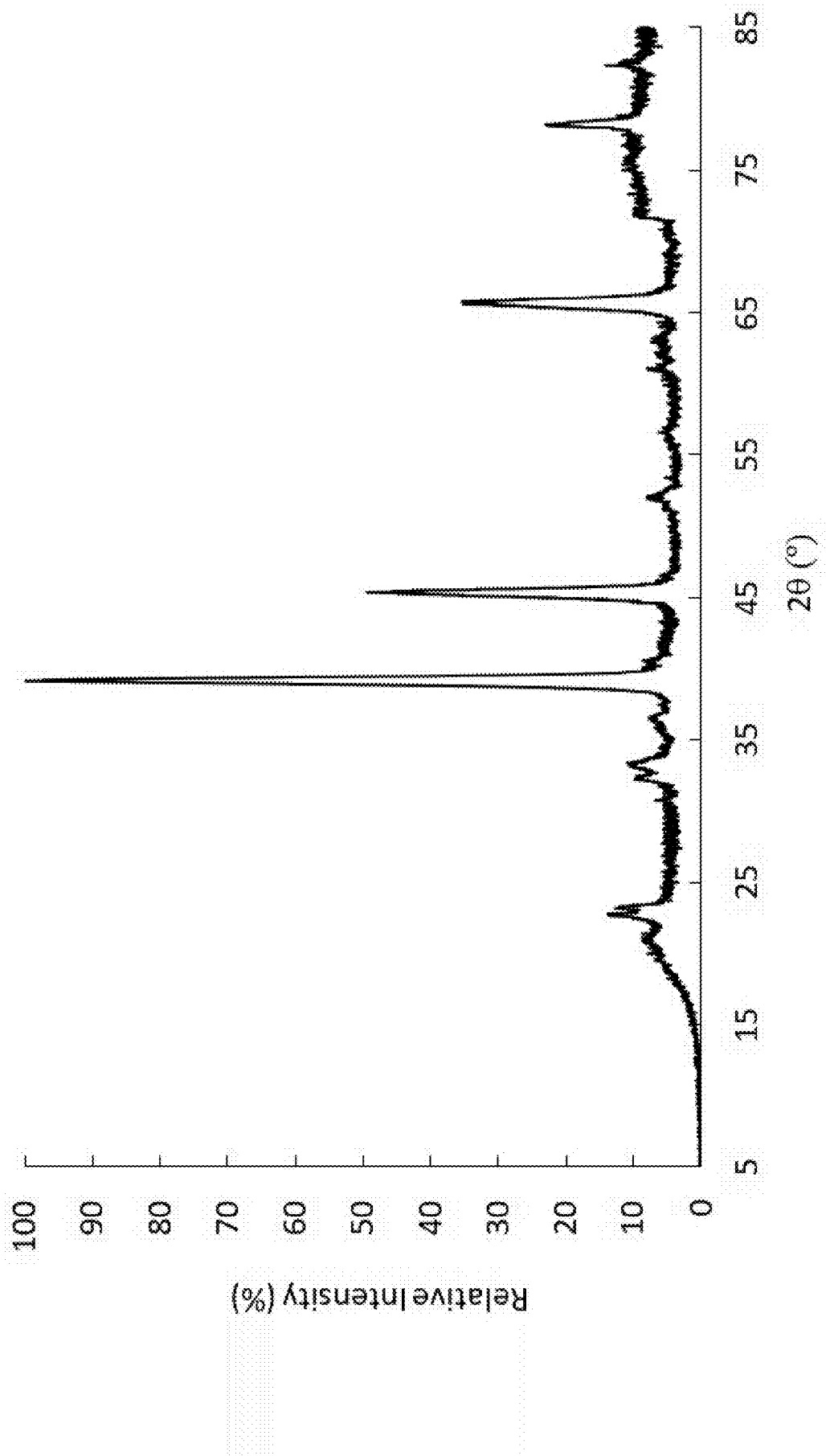
FIG. 9 depicts a PXRD diffraction pattern for $nMx_{11}$, having peaks about the x-axis rendered in degrees relative to 2Θ. For FIGS. 9-14, the y-axis is labeled as Relative Intensity from 0% to 100%. The highest peak (100%) is attributed to elemental Al NPs at 38.4° and $Li_3AlH_6$ gives double peaks throughout the diffraction pattern. All PXRD diffractograms give nearly identical information for the core crystalline nanoparticles.
Figure 10:
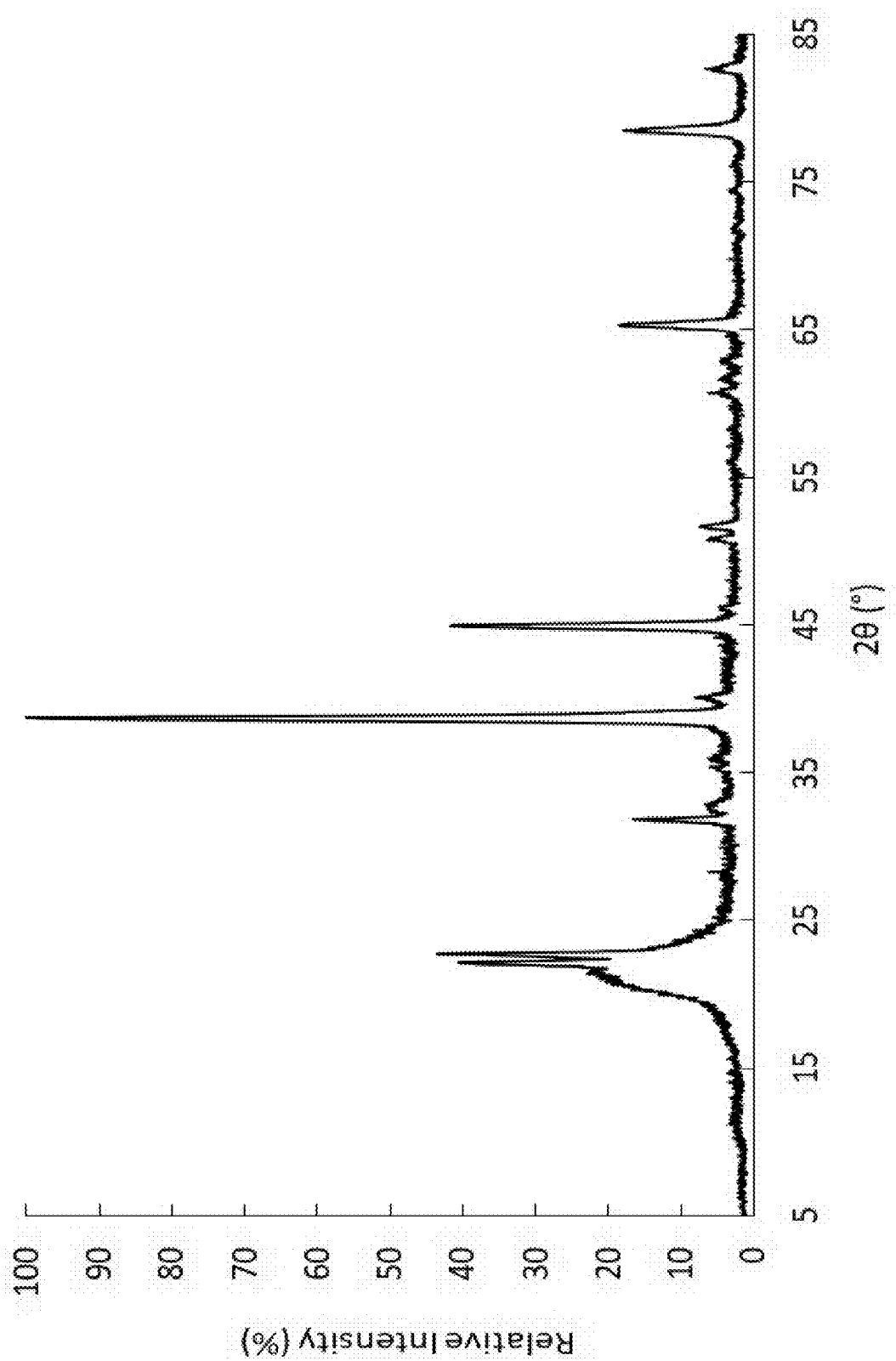
FIG. 10 depicts a PXRD diffraction pattern for $nMx_{12}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.
Figure 11:
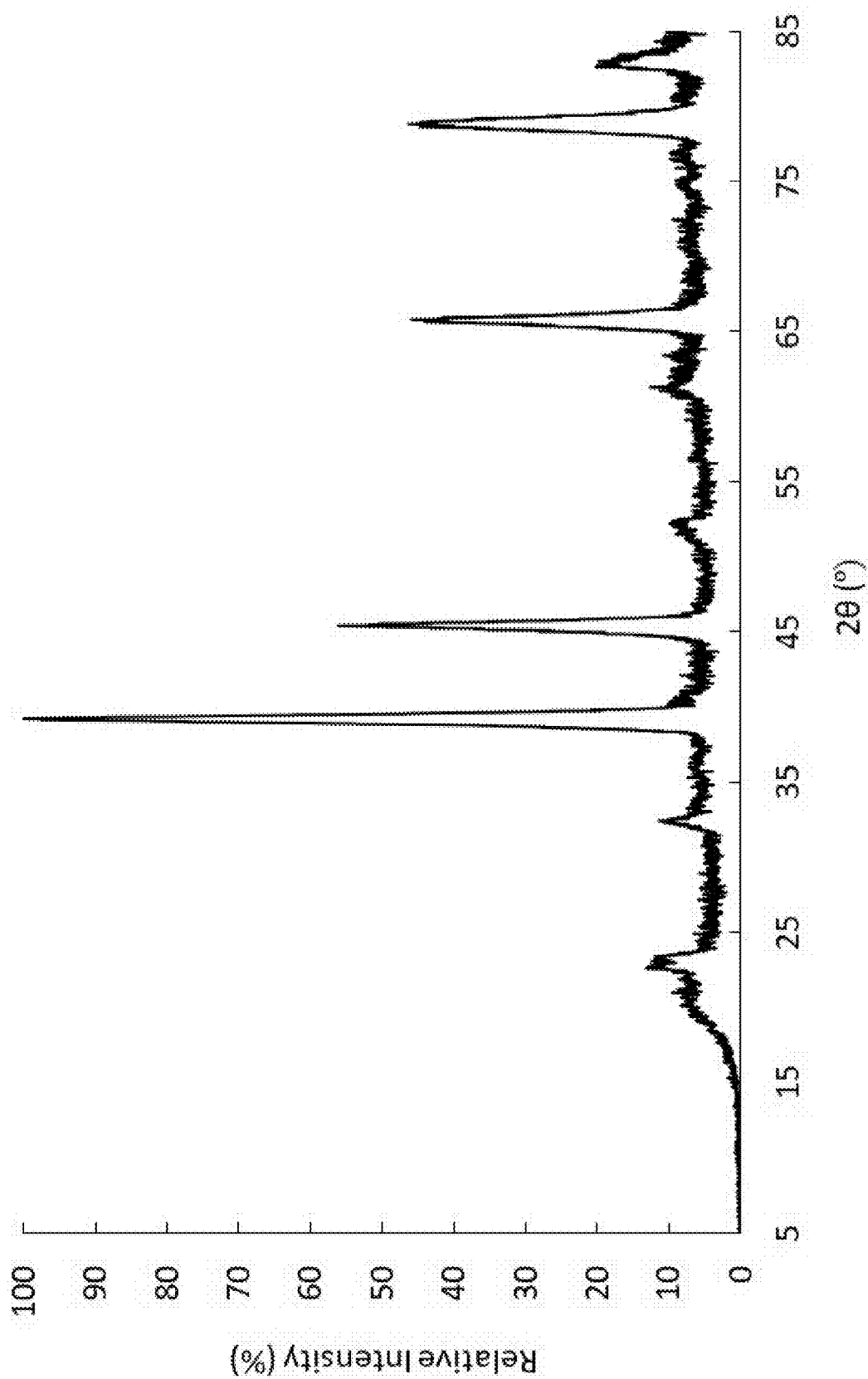
FIG. 11 depicts a PXRD diffraction pattern for $nMx_{13}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.
Figure 12:
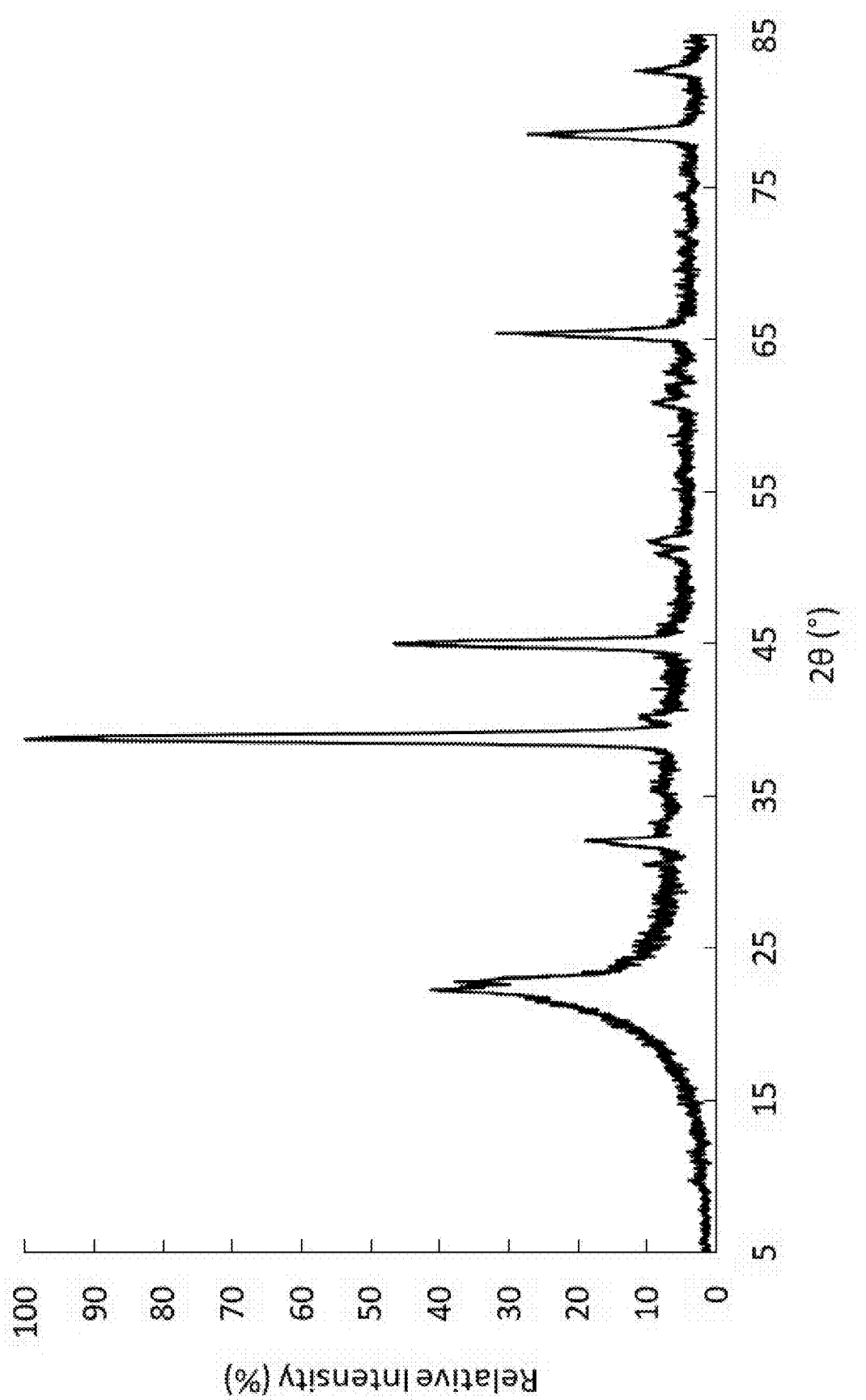
FIG. 12 depicts a PXRD diffraction pattern for $nMx_{16}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.
Figure 13:
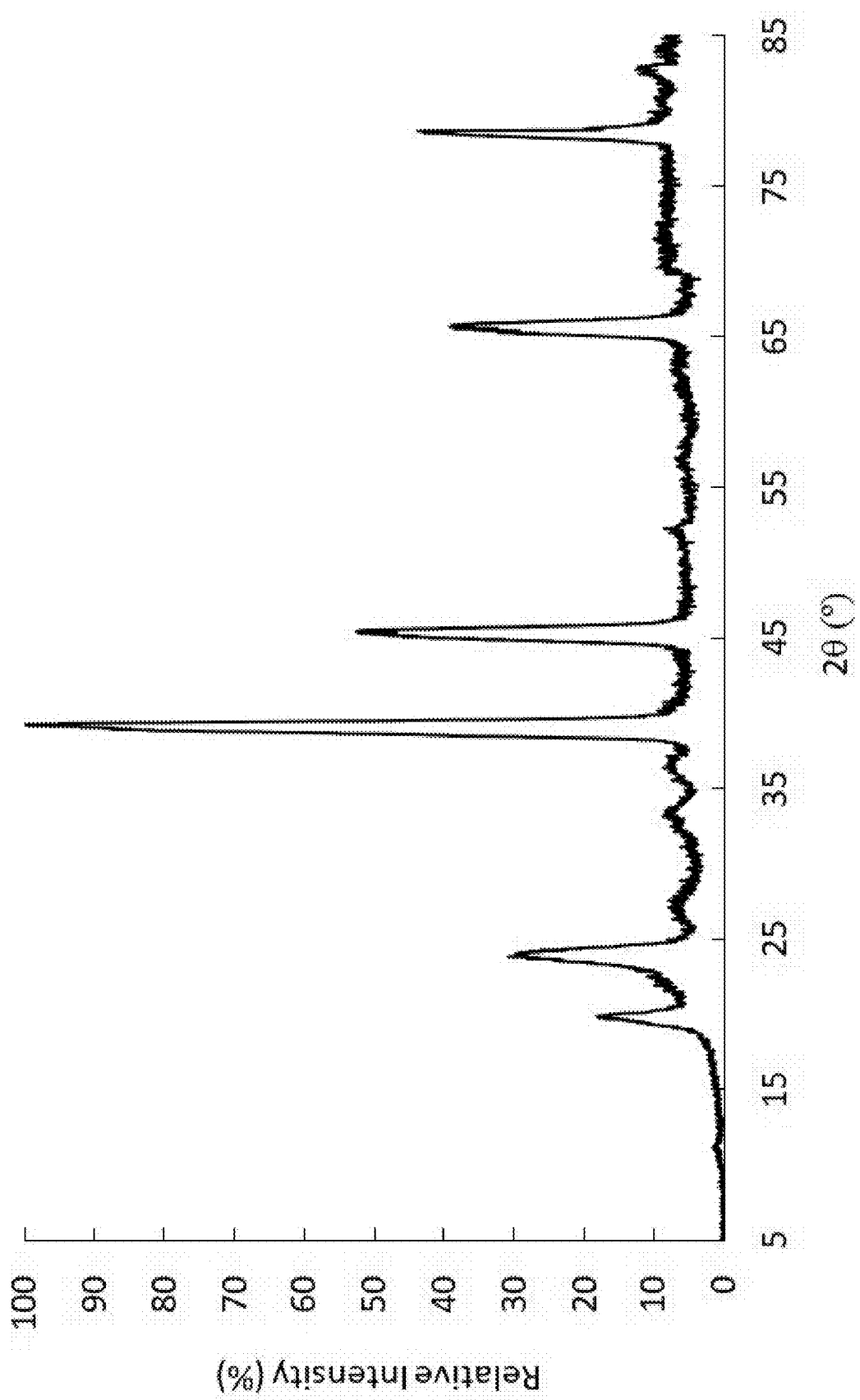
FIG. 13 depicts a PXRD diffraction pattern for $nMx_{19}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.
Figure 14:
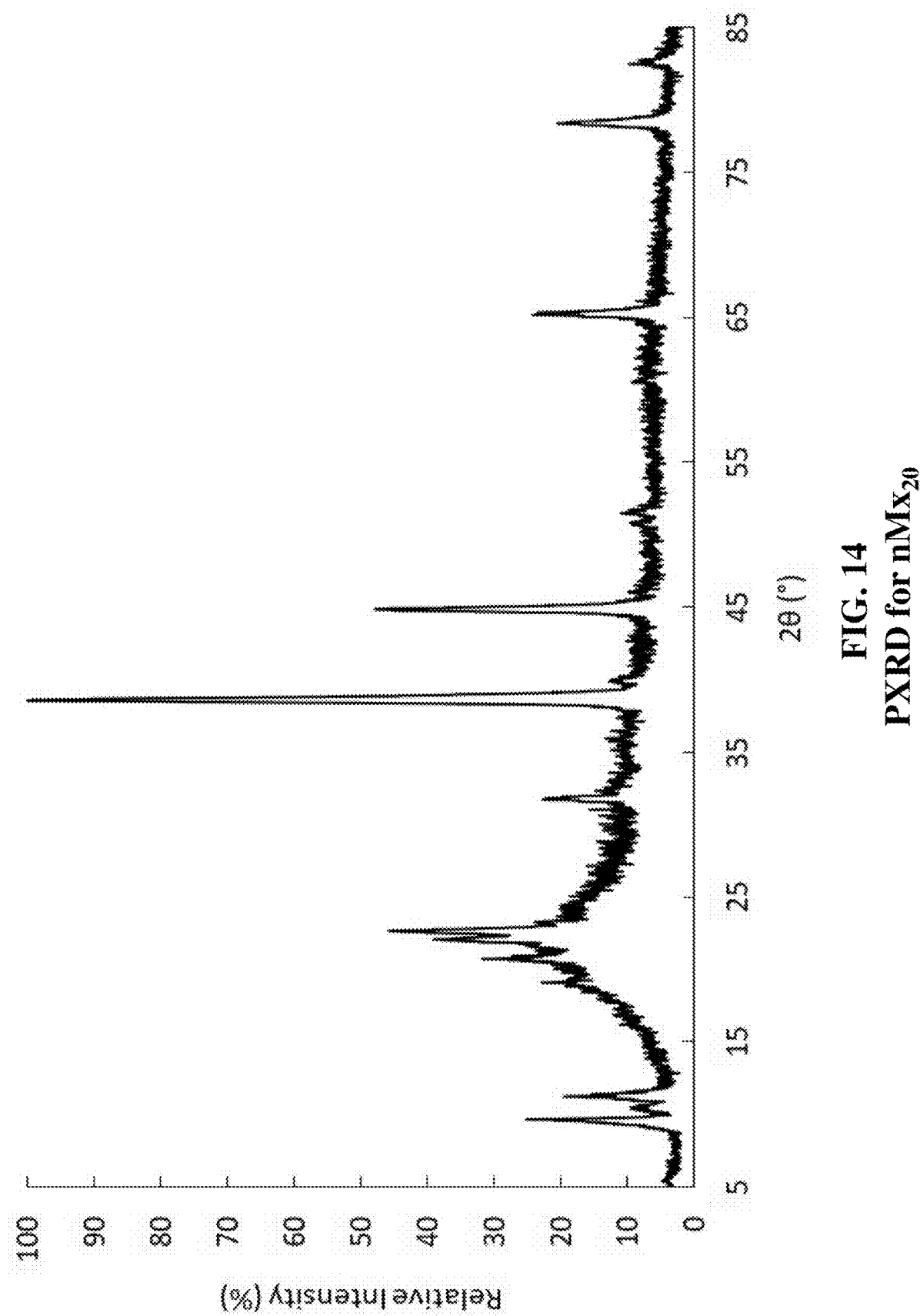
FIG. 14 depicts a PXRD diffraction pattern for $nMx_{20}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.

FIG. 8 depicts a chart showing a relationship between the oxygen atom content of the nanoscale organic layer and air stability for $nMx_{10}$-$nMx_{20}$, where the increasing nMx subscripts correspond to increased oxygen content in the nanoscale organic layer about the core metals. The x-axis of FIG. 8 shows the variation in passivation agents. The y-axis of FIG. 8 represents the total mass fraction of organic in the nanocomposite. At one end, $nMx_{10}$ has a polymerized organic hydrocarbon cap. The O atom mass percentage is 0%, and, at the other end, $nMx_{20}$, has a polyethylene oxide capping structure, with an O atom mass percentage of ~42%.

From FIG. 8, variations between $nMx_{10}$ and $nMx_{20}$ have intermediate O atom mass percentages between 0% and 42%. The maximum oxygen atom content we observe for a stable composite is for $nMx_{20}$, with 42% by mass oxygen content in the passivating agent. In contrast, the oxygen atom content for $nMx_{12}$ and $nMx_{13}$ (approximately 6% and 12%, respectively) leads to the formation of surface aluminum oxygen bonds throughout the composite that renders the material fully air stable. However, it is an embodiment of the present invention where the nanoscale organic layer is located about the surfaces of the composite, with a mass percentage from about 5.0% to about 75% of the total mass. One mass fraction of organic can vary down to 5.0% for air stability of the nanocomposite. Hot spots are not observed with $nMx_{12}$ that would lead to spontaneous burning and the energy density of the material is at a maximum (~38 kJ/g for $nMx_{12}$).

The metal nanoparticles of $nMx_{12}$ through $nMx_{20}$ neither spontaneously ignite nor rapidly react with ambient oxygen in air, primarily from $H_2O$ and $O_2$. $nMx_{12}$ through $nMx_{20}$ are all air stable when using the methods of making disclosed herein. $nMx_{10}$ to $nMx_{20}$ vary in both air stability and air sensitivity. $nMx_{10}$ is unstable in air, where large quantities of $nMx_{10}$ have pyrophoric hot spots that spontaneously ignite.

$nMx_{11}$ is not as reactive as $nMx_{10}$, but, in large quantities, $nMx_{11}$ displays pyrophoric behavior, making large quantities of the material air unstable. $nMx_{10}$ and $nMx_{11}$ are generally unsafe to handle in any humid environment. In summary, nMx nanocomposites below $nMx_{12}$ are not air stable. The reactivity of nMx with air is very high with $nMx_{10}$, decreases to a minimum at $nMx_{12}$ and $nMx_{13}$, and slowly increases as one moves left from $nMx_{13}$ across FIG. 8 to $nMx_{19}$ and $nMx_{20}$.

For the present invention, air sensitivity is a similar but different property than air stability. Air sensitivity is the tendency for an energetic material to slowly react in air (primarily with water and molecular oxygen) to lose energy density. This loss of energy density may take place over the timescale of fractions of an hour, days, weeks, or longer periods of time.

The air sensitivity of nMx is at a minimum for $nMx_{12}$ and $nMx_{13}$. These materials are air stable and have low air sensitivity, losing energy density over longer periods of time, depending on air humidity. The air sensitivity increases moving from $nMx_{12}$ and $nMx_{13}$ to $nMx_{19}$ and $nMx_{20}$. The nanoscale organic layer for both $nMx_{19}$ and $nMx_{20}$, for example PEG capping groups, are more hydrophilic. This hydrophilicity results in more atmospheric water accessing the metal cores of $nMx_{19}$ and $nMx_{20}$, thus reducing the energy density more rapidly in air and indicating that they are more air sensitive. The combination of the elemental Al nanoparticles and the $Li_3AlH_6$ nanoparticles are in an approximately equal amount by mass to the entire nanocomposite.

As the oxygen atom content for the capping agent increases, the air stability of the nMx continue to evolve. Due to increased air sensitivity, the air stability of $nMx_{19}$ and $nMx_{20}$ decrease. The increase in O-atom content of the organic cap increases the accessibility of atmospheric water to the Al-containing nanoparticles. This accessibility limits the long-term air stability. The less oxygen in the organic layer the higher the nMx combustion enthalpy, which proceeds by way of the following combustion reaction:

$$2Al(NPs)+Li_3AlH_6(NPs)+NSOL+O_2(g) \rightarrow \frac{3}{2}Li_2O(s)+\frac{3}{2}Al_2O_3(s)+12CO_2(g)+15H_2O(g),$$

where the NSOL may include, without limitation, a poly(alkadiene), a poly(epoxyalkene-co-alkadiene), a fatty alcohol, a fatty acid, a polyethylene glycol (either with or without substitution and having a molecular weight from about 200 g/mol to about 6000 g/mol).

Air stability is measured for both $nMx_{12}$ and $nMx_{20}$. Each sample is a powder form and left exposed to the ambient air in a pan, where the humidity was greater than or equal to 55% relative humidity. Table 2 shows air stability for $nMx_{12}$ and $nMx_{20}$. After exposure to ambient air, energy densities are measured against time, where all bomb calorimetry data is acquired with a Parr1341 Plain Jacket calorimeter.

All nMx samples are ignited under 20 atm of oxygen gas within the Parr 1108 Oxygen Bomb. The sample is placed into a stainless steel capsule (Parr 43AS), and the sample is ignited with a ~10 cm nickel alloy fuse wire (Parr 45C10). The electric current used to ignite the sample is provided by a Parr 2901EB Ignition Unit. The temperature is monitored with a digital thermometer (Parr 6775). The assembled bomb calorimeter containing the sample is brought to thermal equilibrium with the aid of mechanical stirring. Once the calorimeter reaches thermal equilibrium, the sample is ignited to raise the temperature, and the calorimeter is left to stir until thermal equilibrium is established.

The heat of combustion is acquired from the rise in temperature, the weight of the sample, and the premeasured calorimeter constant value. For the air stability measurements, the sample is placed on a 102 mm diameter Al dish and rests in the air for ~20-30 minutes with a relative humidity of ~55%. It is an embodiment of the present invention where the nanocomposite air stability is measured by an 10% decrease in measured energy density for a period of 8 hours when the nanocomposite is exposed to ambient air and remains non-pyrophoric.

TABLE 2

The change in energy density against time as a measure of air stability for $nMx_{12}$ and $nMx_{20}$ over a duration of 8 hours.

| $nMx_{12}$ Energy Density (kJ/g) | $nMx_{20}$ Energy Density (kJ/g) | Time (Hours) |
|---|---|---|
| −38 | −28 | 0 |
| −37 | −26 | 0.5 |
| −35 | −25 | 2 |
| −35 | −24 | 4 |
| −34 | −21 | 8 |

$nMx_{19}$ and $nMx_{20}$ as a Thermite

Another significant change that occurs with the increase in oxygen atoms for the nanoscale organic layer at $nMx_{19}$ and $nMx_{20}$, as made by Reaction No. 6 below, is that both nanoparticles display thermite behavior. We observe that both $nMx_{19}$ and $nMx_{20}$ carry out self-sustaining combustion in an inert gas environment, such as argon, and even carries out self-sustaining combustion in vacuo, where our composite burns in the absence of any other oxidizer. Not to be bound by theory, but we believe that the unexpected behavior for both nanothermites is due to the PEG organic matrix serving as an effective oxidizer for the elemental aluminum nanoparticles and the $Li_3AlH_6$ nanoparticles.

Both nanothermites may combust via the following reactions. We list the primary thermite reaction in the absence of $O_2$ for $nMx_{20}$ (and $nMx_{19}$) as:

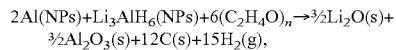

where $\Delta H°_{reaction} = -8.03$ kJ/g for $nMx_{20}$. Further energy release can occur when the released hydrogen gas oxidizes, which we have observed during oxidation of these systems in air:

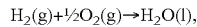

where $\Delta H°_{reaction} = -143$ kJ/g H2.

The other possible pathway includes:

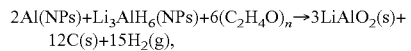

where $\Delta H°_{reaction} = -642.5$ kJ/mol = −1.73 kJ/g for $nMx_{20}$.

Based on the thermodynamic date taken from Table 3, we calculate the enthalpy of reaction as $\Delta H°_f = -2988$ kJ/mol for the reaction stoichiometry as written. This large reaction enthalpy is driven by the highly reducing and reactive natures of the composite reactants working in tandem to facilitate unique burning. We observe copious amounts of soot and hydrogen gas released in this reaction, verifying the products of $nMx_{20}$ thermite reaction. The combination of the aluminum nanoparticles and $Li_3AlH_6$ nanoparticles gives a high energy density material with an extremely high burn rate. The close interfacial contact between the oxygen atoms of PEG and the aluminum and lithium aluminum hexahydride cores is present, allowing for a fast-kinetic redox reaction. In this material, the ether becomes a significant oxidizer.

TABLE 3

Thermodynamic data relevant to the nMx20 nanothermite reaction.

| Component | Enthalpy of formation ($\Delta H°_f$ kJ/mol) |
|---|---|
| $Li_3AlH_6$ | −332.2 |
| $Li_2O$ | −131.7 |
| $Al_2O_3$ | −1669.8 |
| PEG (per monomer unit $\{C_2H_4O\}$) | 103 |
| Elemental Al, C, & $H_2$ | 0 |

Table 4 lists the % oxygen by mass for various nMx iterations $nMx_{12}$-$nMx_{20}$ and their corresponding combustion enthalpies as measured by bomb calorimetry. For simplicity $nMx_{14}$, $nMx_{15}$, $nMx_{17}$, and $nMx_{18}$ are not listed. As the extent of oxidation of the organic capping layer increases, the enthalpy of combustion of the system decreases, as expected. However, as not to be bound by theory, $nMx_{20}$ includes pure PEG (no carbon side chains) and derives its large energy density from the nanoparticle cores. The range of physical parameters that provide nanothermite behavior for $nMx_{20}$ includes, but are not limited to, the elemental Al nanoparticles having particle diameters in the range of about 7 nm to about 100 nm, the $Li_3AlH_6$ nanoparticles having particle diameters in the range of about 15 nm to about 100 nm, the PEG capping agent having a molecular weight range from about 150 amu to about 10,000 amu, the composite to PEG mass ratio being from about 1:10 to about 4:1, and the elemental aluminum nanoparticles and the $Li_3AlH_6$ nanoparticles having a mass ratio from about 10:1 to about 1:3. It is a preferred embodiment of the invention wherein the PEG capping agent has a molecular weight of about 194 amu for the passivation of $nMx_{20}$.

TABLE 4 lists iterations $nMx_{12}$ - $nMx_{20}$, where the % oxygen by mass is given for various nMx iterations according to the capping agent along with the corresponding combustion enthalpies, $\Delta°_{combustion}$, as measured by bomb calorimetry.

| Formulation | $nMx_{12}$ | $nMx_{13}$ | $nMx_{16}$ | $nMx_{19}$ | $nMx_{20}$ |
|---|---|---|---|---|---|
| % O cap by mass | 8% | 12% | 25% | 37% | 41% |
| $\Delta H°_{combustion}$ | −38 kJ/g | −35 kJ/g | −32 kJ/g | −27 kJ/g | −28 kJ/g |

Reaction No. 6 below represents the first aluminum-based nanothermite with an organic ether as the oxidizing agent. Organic explosives (typically ring strained organic compounds with covalently bonded nitro groups) are known to combust in vacuum. Aluminum nanoparticles containing nanothermites that are known in the literature typically contain a metal oxide (such as copper (I) oxide or molybdenum (VI) oxide) that serves as the oxygen source.

Our prior work on polyether-coated aluminum nanoparticles, see US Pat. Pub. No. 2012/0009424 as filed by Jelliss et al. does not display thermite behavior, where this publication does not disclose nMx as claimed herein [20]. We did not see thermite behavior with the polyether-coated aluminum nanoparticles due to: (1) the absence of $Li_3AlH_6$ nanoparticles from the composite and (2) the extra organic side chains that were present on the prior materials that were produced, greatly reducing the oxygen content in the organic cap. Those extra carbon atoms on the side chain are known to significantly slow or inhibit these types of reactions—hence the thermite behavior is not observed when the PEG cap has an organic side chain. Therefore, prior produced materials were not thermites.

The reaction for $nMx_{20}$ uses an organic ether as the thermite oxidant. Ethers are generally considered to be relatively unreactive and they are not considered to be oxidizing agents under normal chemical conditions. This is one reason organic ethers have not been investigated as nanothermite oxidizers. nMx iterations with capping agents having lower oxygen atom content are better suited to applications as a propellant due to their increased air stability, better compatibility with binders, and higher overall energy density. Our composite has shown unique burning characteristics and energy outputs that could lead to improved specific impulses for engines needing a high-energy output with a higher velocity of released gases and improved mass flow.

The energetic properties of each nMx composite depend on the percentage of oxygen available in the organic nanoscale layer used when passivating our nanoparticles. More specifically, the combustion properties of the material track to the oxygen atom content in the organic matrix. As the oxygen atom content increases in the capping agent, nMx's air stability changes.

For $nMx_{10}$ and $nMx_{11}$, the less or non-air stable iterations of nMx, the capping agents are selected from alkadienes ($nMx_{10}$) or a mixture of an epoxyalkene and an alkadiene ($nMx_{11}$), including but not limited to 1,7-octadiene, 1,9-decadiene, myrcene, or 1,13-tetradecadiene, epoxyhexene, epoxyheptene, epoxyoctene, epoxynonene, epoxydecene, epoxyundecene, epoxydodecene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, and combinations thereof. Not to be bound by theory, but these particular capping agents have an oxygen content that ranges from about 0% to about 7% and only forms minimal aluminum oxygen, Al—O, bonds during the passivation process by reaction with epoxide.

Instead, passivation of $nMx_{10}$ and $nMx_{11}$ occurs via polymerization or co-polymerization of the alkadienes or a mixture of an epoxyalkene and an alkadiene to form a matrix about the Al nanoparticles and $Li_3AlH_6$ nanoparticles. It is believed that the reductive nature of the elemental aluminum nanoparticles causes the carbon-carbon double bonds of the alkadiene or the epoxyalkene to cleave, which promotes polymerization or copolymerization about our composite core material. In some embodiments, the polyolefin polymerization is thermally promoted. In addition, we believe that surface hydrides are not able to initiate polymerization of certain capping agents, leaving those areas on the surface unpassivated. Because of the low oxygen content and lack of substantial aluminum oxygen bonding at the surfaces of our composite, this polymerization scheme leaves portions of the $Li_3AlH_6$ nanoparticles exposed to ambient reactions, which can induce unwanted burning across the entire mixture.

In some embodiments, these organic polymers form a hydrophobic layer around the nanomaterial such that the polymer hinders the reactivity of the same. In some respects, capping the nanoparticles with an organic polymer hinders the formation of aluminum oxide leading to a more reactive nanomaterial. Without being bound by theory, the hydrophobic polymer may delay reactive molecules such as water and oxygen from reaching the surface of the nanomaterial.

In some embodiments, the nanoparticles are capped with alkyl-substituted epoxides. In some embodiments, these polymers are formed from the polymerization of the alkadienes.

It is an aspect of the present invention wherein our singular material, being a composite of both $Li_3AlH_6$ nanoparticles and elemental Al nanoparticles, are both passivated with a variety of organic or inorganic compounds. In some embodiments, capping is achieved using transition metal ions or the use of perfluoroalkylcarboxylic acids as shown by Foley, et al., 2005 and Jouet, et al., 2005, both of which are incorporated herein by reference [18, 19]. The use of polymers to act as a capping agent is also considered. Other capping agents include without limitation fatty acids, fatty alcohols, poly(alka-dienes), poly(epoxyalkene-co-alkadiene), polyethylene glycol (PEG), or any combinations thereof.

For $nMx_{12}$, capping agents for passivation may include, but are not limited to, fatty alcohols being tert-butyl alcohol, tert-amyl alcohol, 3-methyl-3-pentanol, ethchlorvynol, 1-octanol (capryl alcohol), (1-nonanol), 1-decanol (decyl alcohol, capric alcohol), undecyl alcohol (1-undecanol, undecanol, hendecanol), HTPB, lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol, cluytyl alcohol, or 1-octacosanol, 1-nonacosanol, myricyl alcohol, melissyl alcohol, or 1-triacontanol, 1-dotriacontanol (lacceryl alcohol), geddyl alcohol (1-tetratriacontanol), cetearyl alcohol or any combinations thereof, or using enols for crosslinking with aladienes enols, or enoic acids.

For $nMx_{13}$, capping agents for passivation may include, but are not limited to, carboxylic (fatty) acids being butyric acid [$CH_3(CH_2)_2COOH$], valeric acid [$CH_3(CH_2)_3COOH$], caproic acid [$CH_3(CH_2)_4COOH$], enanthic acid [$CH_3(CH_2)_5COOH$], caprylic acid [$CH_3(CH_2)_6COOH$], pelargonic acid [$CH_3(CH_2)_7COOH$], capric acid [$CH_3(CH_2)_8COOH$], undecylic acid [$CH_3(CH_2)_9COOH$], lauric acid [$CH_3(CH_2)_{10}COOH$], tridecylic acid [$CH_3(CH_2)_{11}COOH$], myristic acid [$CH_3(CH_2)_{12}COOH$], pentadecylic acid [$CH_3(CH_2)_{13}COOH$], palmitic acid [$CH_3(CH_2)_{14}COOH$], margaric acid [$CH_3(CH_2)_{15}COOH$], stearic acid [$CH_3(CH_2)_{16}COOH$], nonadecylic acid [$CH_3(CH_2)_{17}COOH$], arachidic acid [$CH_3(CH_2)_{18}COOH$] or any combinations thereof, or using enols for crosslinking with aladienes enols, or enoic acids.

For $nMx_{14}$-$nMx_{18}$, capping agents for passivation include, but are not limited to, a mixture of a fatty acid, fatty alcohol, polyethylene alcohol (PEG), and an alkadiene. Fatty acids include the list of acids used to passivate $nMx_{13}$ or any combinations thereof. The fatty alcohols include the list of alcohols used to passivate $nMx_{12}$ or any combinations thereof. The alkadienes include the list of alkadienes used to passivate $nMx_{10}$ and $nMx_{11}$ or any combinations thereof.

For $nMx_{19}$ and $nMx_{20}$, capping agents for passivation include, but are not limited to, PEG, PEO, tetraethylene glycol, or triethylene glycol all having various molecular weights.

Reagents & Materials for nMx Reactions

This is a list of the chemicals used to make any of $nMx_{11}$-$nMx_{20}$: Lithium aluminum hydride ($LiAlH_4$, powder, reagent grade, 95%), titanium (IV) isopropoxide (99.999% trace metals basis), 1,7-octadiene (98%), 1,9-decadiene (98%), 1,13-tetradecadiene (90%), toluene (anhydrous, 99.8%), tetrahydrofuran (THF, anhydrous, 99.9%, inhibitor-free), polyethylene glycol (PEG), tetrethylene glycol, triethylene glycol, stearyl alcohol, and stearic acid were all purchased from Sigma Aldrich. Anhydrous diethyl ether was purchased from J. T. Baker. Toluene and THF were distilled over sodium metal and potassium metal, respectively, to remove any trace oxygen and water. Diethyl ether and methanol were distilled over 4 Å molecular sieves. All alkenes were subjected to numerous freeze-pump-thaw cycles to remove any oxygen present. Generally, titanium (IV) alkoxide was dissolved in toluene to create a dilute (millimolar range) solution. Both $LiAlH_4$ and the titanium catalyst were stored under argon atmosphere to prevent oxygen/water exposure.

Reaction No. 1: Creating $nMx_{10}$

Reaction No. 1 begins by adding $LiAlH_4$ (0.246 g, 6.48 mmol) to a round-bottom Schlenk flask and dissolving the ternary metal hydride in either THF or diethyl ether to create a 1.0 M solution. Following the addition of 20 mL toluene, the reaction mixture is heated to 85° C. using a J-KEM Model Apollo dual channel temperature controller. Upon reaching 85° C., 16 µL $Ti(O^iPr)_4$ is added followed by the immediate addition of the capping agent (octadiene, decadiene, or tetradecadiene; 10:1 Al:capping agent molar ratio). The reaction mixture can stir under reflux for 30 minutes, and all solvents are then removed in vacuo.

The nanocomposite is formed from the decomposition of $LiAlH_4$ in the presence of $Ti(O^iPr)_4$ at 85° C. in either THF or diethyl ether. However, the reaction temperature can be from about 75° C. to about 150° C. The temperature is selected to stop the decomposition of $LiAlH_4$ at the first reaction step to produce Al NPs, $Li_3AlH_6$ NPs, and $H_2$ gas. Note that the composite material is co-formed (~50 weight % aluminum:lithium alanate NPs) in the $LiAlH_4$ decomposition reaction. In some embodiments, the method further comprises heating the solution for a time of about 1 minute to about 3 hours. In some embodiments, the time is about 30 minutes. Dienes, such as 1,7-octadiene, 1,9-decadiene, and 1,13-tetradecadiene, were used as passivating agents since the uncapped particles were pyrophoric in air. All reactions were performed on a Schlenk line under argon atmosphere.

In some embodiments of the present invention, the composite has a ratio of Al nanoparticles to $Li_3AlH_6$ nanoparticles from about 5:1 to about 1:5, and in some cases, the ratio is about 1:1. Also note that the composite material, being a mixture of Al nanoparticles and $Li_3AlH_6$ nanoparticles, comprise a core diameter from about 15 nm to about 60 nm. However, the optimal diameter for all formed nanospheres should have a core diameter from about 35 nm to about 55 nm.

It is an aspect of the present invention where the method includes adding 0.1 equivalents of capping agent per equivalent of aluminum. The capping agents for the above reaction may include without limitation an alkene($C \leq 30$), substituted alkene($C \leq 30$), an alkene($C \leq 18$), an alkene($C \leq 14$), an epoxide($C \leq 30$), or a substituted epoxide($C \leq 30$), where the capping agent may undergo polymerization to form a matrix like coating across all nanoparticle surfaces. In other embodiments of the present invention, the alkene contains two or more carbon carbon double bonds. In some embodiments, the capping agent is 1,7-octadiene, 1,9-decadiene, myrcene, or 1,13-tetradecadiene.

In some embodiments, the solvent is heated to reflux. In some embodiments, the titanium compound is added after the solution has reached the temperature from about 70° C. to about 100° C. In some embodiments, the method is performed under an inert atmosphere. In some embodiments, the inert atmosphere is nitrogen gas or a noble gas. In some embodiments, the inert atmosphere is argon. In some embodiments, the method further comprises adding a capping agent to the reaction.

In some aspects of the present invention, the solvent is an organic solvent, non-limiting examples being ether($C \leq 12$), tetrahydrofuran or diethyl ether, arene($C \leq 12$), toluene, a mixture of toluene and tetrahydrofuran, a mixture of toluene and diethyl ether, or any combinations thereof.

In some aspects of the present invention the catalyst may be, without limitation, a titanium(IV) compound, a titanium (IV) tetraalkoxylate, such as titanium(IV) isopropoxide, or a titanium(IV) tetraaryloxylate or any combinations thereof.

In addition, atoms making up aluminum nanoparticles, the $Li_3AlH_6$ nanocomposites, and aluminum nanocomposite materials are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$. Isotopes of lithium and aluminum are also contemplated in the compounds so long as the isotopes are stable.

Reaction No. 1 and its corresponding data is our first attempt to make the present invention. This reaction is disclosed in U.S. patent application Ser. No. 14/259,859, to which the current application claims priority. $nMx_{10}$, although passivated, displays unwanted burning in ambient conditions. Those in the art that wish to practice $nMx_{10}$ please take precautions against unpredictable burning events, as the cores are not as air stable as the subsequent iterations $nMx_{11}$-$nMx_{20}$. Not to be bound by theory, but the instability of $nMx_{10}$ in ambient conditions may be due to the type of capping agents used in passivation. The method of making $nMx_{10}$ has organic capping agents, including but not limited to, an alkadiene such as myrcene or other alkadienes from $C_6$ to any higher alkadiene, which results in polymerization and only partial stabilization of the core metal nanoparticles.

$nMx_{10}$ capping agents may include without limitation: dienes, such as 1,7-octadiene, 1,9-decadiene, and 1,13-tetradecadiene, myrcene, any alkene containing at least two carbon-carbon double bonds greater than 4 carbons and less than 30 carbons, an alkene($C \leq 30$), substituted alkene ($C \leq 30$), an alkene($C \leq 18$), an alkene($C \leq 14$), an epoxide ($C \leq 30$), or a substituted epoxide($C \leq 30$), where the capping agent may undergo polymerization to form a matrix like coating across all nanoparticle surfaces.

Powder X-Ray Diffraction for $nMx_{10}$

All PXRD measurements were made using a Rigaku Miniflex 600 equipped with a Cu source operated at 40 kV and a scintillation counter detector. All assignments were made via comparison with the appropriate patterns from the ICDD Crystallographic Database. Powder X-ray diffraction (PXRD) of the resulting grey powder shows the presence of 2 different phases in the resulting sample: face-centered cubic aluminum (fcc Al) and monoclinic lithium hexahydride ($Li_3AlH_6$).

Estimated NP core sizes and d-spacings from PXRD analysis are presented in Table 5. The crystalline Al NP cores were ~29 nm in diameter as determined from Scherrer analysis of the (111), (200), (220), and (331) diffraction peaks. The $Li_3AlH_6$ nanoparticles also appear to be nanocrystalline with NP core diameters between ~23-36 nm. The estimated d-spacings are also in agreement with those reported for $Li_3AlH_6$ by Bastide et al., which is incorporated herein by reference [25].

Elemental analysis of the nanocomposite using PDXL software provided by Rigaku indicates 51% by mass of the crystalline nanocomposite material is comprised of Al whereas the remaining 49% is comprised of $Li_3AlH_6$. These mass percentages are expected based on the stoichiometry presented in Reaction 1. These mass percentage values do not account for the presence of organic cap at the NP surface however. We can vary the particle diameters by (a) allowing the reaction to proceed for a longer time prior to addition of capping agent and (b) addition of polymers to the solution during reaction to increase viscosity. Our Al nanoparticle sizes can be varied from 10 nm to around 75 nm by adjusting these parameters.

TABLE 5

PXRD data for nMx10, where estimated crystalline core sizes and d-spacing values for various lattice planes of fcc Al nanoparticles and monoclinic $Li_3AlH_6$ nanoparticles are presented.

| 2θ(°) | Material (Lattice Plane) | Crystalline Size (nm) | d-spacing |
|---|---|---|---|
| 21.9 | $Li_3AlH_6$ (110) | 36 | 0.406 |
| 22.5 | $Li_3AlH_6$ (012) | 35 | 0.395 |
| 31.7 | $Li_3AlH_6$ (202) | 32 | 0.282 |
| 38.4 | Al (111) | 20 | 0.234 |
| 39.8 | $Li_3AlH_6$ (104) | 33 | 0.226 |
| 44.7 | Al (200) | 28 | 0.202 |
| 50.6 | $Li_3AlH_6$ (13-2) | 28 | 0.180 |
| 51.5 | $Li_3AlH_6$ (12-4) | 28 | 0.177 |
| 60.5 | $Li_3AlH_6$ (21-5) | 23 | 0.153 |
| 61.4 | $Li_3AlH_6$ (32-2) | 36 | 0.151 |
| 62.6 | $Li_3AlH_6$ (11-6) | 28 | 0.148 |
| 65.1 | Al (220) | 28 | 0.143 |
| 66.1 | $Li_3AlH_6$ (404) | 34 | 0.141 |
| 78.2 | Al (311) | 32 | 0.122 |
| 82.4 | Al (222) | 35 | 0.117 |

Although lithium hydride (LiH) is a byproduct of the proposed breakdown of $LiAlH_4$, no LiH is observed via PXRD. While LiH is expected to have a fcc crystal lattice similar to that of the fcc Al, the diffraction pattern that can be observed closely aligns with that expected for fcc Al rather than LiH including exact d-space values corresponding to fcc Al and a strong (111) diffraction peak that is weak for LiH. Furthermore, $LiAlH_4$ is not observed in the diffraction pattern either, indicating complete conversion to the nanocomposite product.

Fourier-Transform Infrared Spectroscopy for $nMx_{10}$

A Shimadzu model FTIR-8400S spectrometer equipped with an attenuated total reflectance (ATR) attachment was used to collect all infrared spectroscopic data. All samples were dispersed in toluene prior to analysis. Using Fourier-transform infrared spectroscopy (FTIR), the presence of organic materials on the Al NP surface is noted by the C—H stretching vibrations at ~2970 $cm^{-1}$ and ~2850 $cm^{-1}$. Since alkenes were chosen as the capping monomers for this material, C—H stretching vibrations are expected. The IR spectrum shows no evidence of C=C stretching supporting the conclusion that the reaction produced C=C polymerization thereby reducing the double bonds. PIERMEN when using alkenes as capping monomers for Al NPs prepared by alane decomposition has been observed [21].

Transmission Electron Microscopy (TEM) of $nMx_{10}$

Figure 22:
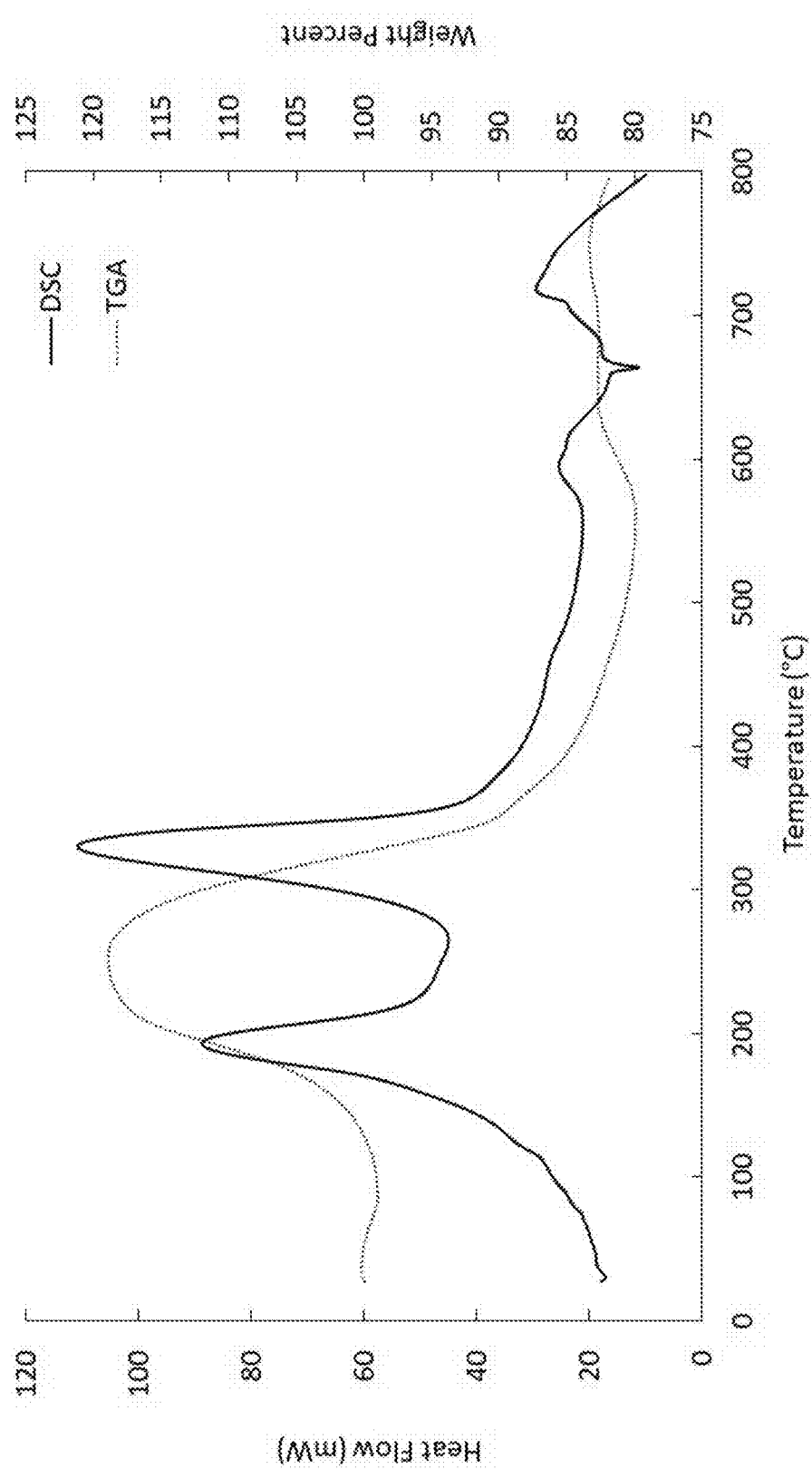
FIG. 22 displays DSC-TGA curves for $nMx_{12}$ under ambient air flow with 50% steryl-alcohol as the nanoscale organic layer.

FIG. 22 depicts TEM images for $nMx_{10}$ as acquired using a Philips EM430ST operated at 300 kV. Samples are cast on Formvar grids. Image J software is used to estimate d-spacing values from the electron diffraction pattern. The TEM images indicate the nanoparticles are ~50 nm in diameter. The nanoparticles also appear to be enveloped within a polymer matrix, which is a result of the capping monomer, 1,7-octadiene. The cross-linked polymer layer well protects the crystalline NP cores, with no visible evidence of an amorphous Al oxide layer. The TEM images also reveal a homogenous mixture of Al NPs and $Li_3AlH_6$ NPs. The less dense spherical particles observed in the TEM are most likely $Li_3AlH_6$ NPs. Spectroscopic data (FTIR) supports the presence of polymeric hydrocarbons on the alanate NP surface as well.

TABLE 6

$nMx_{10}$ estimated d-spacing values for the rings resulting from fcc Al nanoparticles.

| Ring | d-spacing (nm) | Material (Lattice Plane) |
|---|---|---|
| 1 | 0.362 | $Li_3AlH_6$ (012) |
| 2 | 0.254 | Al (111) |
| 3 | 0.218 | Al (200) |
| 4 | 0.155 | Al (220) |
| 5 | 0.132 | Al (331) |

A similar observation was also noted for electron diffraction patterns (not shown). Table 6 presents aggregate data for defined rings with d-spacings corresponding to those for fcc Al that were clearly denoted. Our data showed visible and more diffuse rings; however, proper identification of those rings was difficult in that instance. Presumably, the diffuse rings were the result of monoclinic $Li_3AlH_6$. An estimated d-spacing value of 0.362 nm was calculated for the inner diffuse ring located closest to the electron beam (Ring 1). Without being bound by theory, the inner ring could be assigned to the (111) lattice plane of $Li_3AlH_6$; presumably, electron diffraction resulting from the (111) plane would be strongest. Although the diffuse rings cannot positively be identified, the extreme homogeneity of the nanocomposite is evident based on both the noticeable presence of multiple phases in both the electron diffraction patterns and in the TEM images (FIG. 22).

Reaction No. 2: Creating $nMx_{11}$

Reaction No. 2 and its corresponding data relates to our process for making and identifying $nMx_{11}$. It is an aspect of the present invention wherein $nMx_{11}$ is produced by a bottom up synthesis that creates nanoparticles of both $Li_3AlH_6$ and elemental Al metal that are carefully sized and passivated at the controlled first reaction step of $LiAlH_4$ decomposition, where the capping agent is a mixture of epoxydecene and an alkadiene. The combination of an epoxide and an alkadiene (1,7-octadiene has been demonstrated, but other alkadienes from $C_6$ to any higher alkadiene can also be used) results in polymerization and partial stabilization of the metal cores that can be stated simply as:

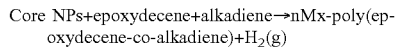
Core NPs+epoxydecene+alkadiene→nMx-poly(epoxydecene-co-alkadiene)+$H_2$(g)

where the mixture of capping agents copolymerize to form a slightly hydrophobic nanolayer about both core nanoparticles.

The following chemicals for making $nMx_{11}$ are purchased from Sigma-Aldrich and are as follows: Lithium aluminum hydride ($LiAlH_4$ (95%)), titanium isopropoxide ($Ti(O^iPr_4$, 97%), toluene (anhydrous grade, 99.8%), tetrahydrofuran (THF, anhydrous grade, ≥99.9%, inhibitor-free), epoxydecene, and 1,7-octadiene.

The solvents toluene and THF are not distilled and are kept in a glovebox, since they are anhydrous. Before reaction, both the toluene and the THF are deoxygenated by simply pumping their containers for 3 cycles on a Schlenk line. The $Ti(O^iPr)_4$ is placed in an air-free storage flask and then freeze-pumped-thawed. All liquid reagents are transferred to separate pre-heat dried, air-free flask inside the glovebox. The capping agents epoxydecene and 1,7-octadiene are degassed using either freeze-pump-thaw cycles or by purging with an inert gas such as Ar or $N_2$.

The entirety of Reaction No. 2 is performed on a Schlenk line under argon atmosphere. The co-solvent system of toluene and THF can heat for at time at 85° C. The co-solvents are then added to a round bottom air free flask having $LiAlH_4$, where the metal hydride is dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of $LiAlH_4$.

The decomposition reaction is left heating and stirring for ~10 minutes until the epoxydecene and 1,7-ocatdiene are added. Typical ratios of the capping molecules are from 1:1 to about 2:1 for the alkadiene:epoxyalkene.

Once the epoxydecene and the 1,7-octadiene are added, the reaction mixture can react for a duration from about 0.5 hours to about 2 or more hours. After about a 2-hour reaction time, the solvent is removed by boiling in vacuo or can be removed by filtration or other methods. The organic content of the final $nMx_{11}$ is about 50 w/w. A theoretical yield of 6 g of $nMx_{11}$ is produced.

Reaction No. 3: Creating $nMx_{12}$

Reaction No. 3 and its corresponding data relates to our process for making and identifying $nMx_{12}$. It is an aspect of the present invention wherein $nMx_{12}$ is produced by a bottom up synthesis that creates nanoparticles of both $Li_3AlH_6$ and elemental Al metal that are carefully sized and passivated at the controlled first reaction step of $LiAlH_4$ decomposition, where the passivation agent is a fatty alcohol. It is an embodiment of the present invention wherein the capping agent is stearyl alcohol and passivation is by way of aluminum oxygen bonding between the oxygen atoms available on the passivation agent and the surfaces of the aluminum nanoparticles and can be stated simply as:

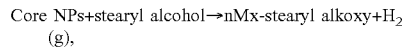
Core NPs+stearyl alcohol→nMx-stearyl alkoxy+$H_2$ (g), wherein the organic layer binds to the composite through aluminum oxygen bonds thereby forming stearyl alkoxy at the composite's aluminum surfaces.

The following chemicals for making $nMx_{12}$ are purchased from Sigma-Aldrich and are as follows: Lithium aluminum hydride ($LiAlH_4$ (95%)), titanium isopropoxide ($Ti(O^iPr)_4$, 97%), toluene (anhydrous grade, 99.8%), tetrahydrofuran (THF, anhydrous grade, ≥99.9%, inhibitor-free), and stearyl alcohol.

The solvents toluene and THF are not distilled and are kept in a glovebox, since they are anhydrous. Before reaction, both the toluene and the THF are deoxygenated by simply pumping their containers for 3 cycles on a Schlenk line. The $Ti(O^iPr)_4$ is placed in an air-free storage flask and then freeze-pumped-thawed. All liquid reagents are transferred to separate pre-heat dried, air-free flasks inside the glovebox. Stearyl alcohol is used as supplied without further purification.

The entirety of Reaction No. 3 is performed on a Schlenk line under argon atmosphere. The co-solvent system of toluene and THF can heat for at time at 85° C. The co-solvents are then added to a round bottom air free flask having $LiAlH_4$, where the metal hydride is dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system, the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of $LiAlH_4$.

The decomposition reaction is left heating and stirring for ~10 minutes until the stearyl alcohol is added. The stearyl alcohol is used directly as supplied and dissolved in THF prior to addition to the reaction mixture. The concentration of the stearyl alcohol is on the 0.5-2 M range.

Once the stearyl alcohol is added, the reaction mixture can react for a duration from about 0.5 hours to about 2 or more hours. After about a 2-hour reaction time, the solvent is removed by boiling in vacuo or can be removed by filtration or other methods. A theoretical yield of 6 g of $nMx_{12}$ is produced.

Reaction No. 4: Creating $nMx_{13}$

Reaction No. 4 and its corresponding data relates to our process for making and identifying $nMx_{13}$. It is an aspect of the present invention wherein $nMx_{13}$ is produced by a bottom up synthesis that creates nanoparticles of both $Li_3AlH_6$ and elemental Al metal that are carefully sized and passivated at the controlled first reaction step of $LiAlH_4$ decomposition, where the capping agent is a long chain carboxylic (fatty) acid. It is an embodiment of the present invention wherein the capping agent is stearic acid, where passivation is by way of aluminum oxygen bonding between the oxygen atoms available on the capping agent and the surfaces of the aluminum nanoparticle and can be stated simply as:

Core NPs+stearic acid→nMx-stearyl carboxylate+H$_2$ (g), wherein the organic layer binds to the composite through aluminum oxygen bonds thereby forming stearyl carboxylate at the composite's aluminum surfaces.

The following chemicals for making nMx$_{13}$ are purchased from Sigma-Aldrich and are as follows: Lithium aluminum hydride (LiAlH$_4$ (95%)), titanium isopropoxide (Ti(O$^i$Pr)$_4$, 97%), toluene (anhydrous grade, 99.8%), tetrahydrofuran (THF, anhydrous grade, >99.9%, inhibitor-free), and stearic acid.

The solvents toluene and THF are not distilled and are kept in a glovebox, since they are anhydrous. Before reaction, both the toluene and the THF are deoxygenated by simply pumping their containers for 3 cycles on a Schlenk line. The Ti(O$^i$Pr)$_4$ is placed in an air-free storage flask and then freeze-pumped-thawed. All liquid reagents are transferred to separate pre-heat dried, air-free flasks inside the glovebox. The stearic acid is placed in an air-free flask and heated with a heat gun under vacuum with a Schlenk line. The stearic acid is melted and some degassing is observed. The stearic acid can return to room temperature, in which the stearic acid solidified. The stearic acid is purged with argon gas. This cycle is done twice to further reduce the water content.

The entirety of Reaction No. 4 is performed on a Schlenk line under argon atmosphere. The co-solvent system of toluene and THF can heat for at time at 85° C. LiAlH$_4$ is then added to a round bottom, air-free flask and dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the LiAlH$_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of LiAlH$_4$.

The decomposition reaction is left heating and stirring for ~10 minutes until the stearic acid is added. The stearic acid is used directly as supplied and dissolved in THF prior to addition to the reaction mixture. The concentration of the stearic acid is in the 0.5-2 M range.

Once the stearic acid is added, the reaction mixture can react for a duration from about 0.5 hours to about 2 or more hours. After about a 2 hour reaction time, the solvent is removed by boiling in vacuo or can be removed by filtration or other methods. The organic content of the final nMx$_{13}$ is about 50% w/w. A theoretical yield of 6 g of nMx$_{13}$ is produced.

Reaction No. 5: Creating nMx$_{14}$-nMx$_{18}$

Reaction No. 5 is exemplary for each of nMx$_{14}$-nMx$_{18}$ and its corresponding data relates to our process for making the same. It is an aspect of the present invention wherein these iterations of nMx are produced individually via a bottom up synthesis that creates nanoparticles of both Li$_3$AlH$_6$ and elemental Al metal that are carefully sized and passivated at the controlled first reaction step of LiAlH$_4$ decomposition. However, the capping agent is a combination of a fatty acid, a fatty alcohol, PEG with an alkadiene, tetraethylene glycol or triethylene glycol (an oligomer of ethyelene glycol), or any combinations thereof. The combinations and ratios for each of these organics are given in Table 7.

TABLE 7 nMx$_{14}$-nMx$_{18}$ and the ratios for capping agent combinations.

| nMx Iteration | octadecanol % w/cap | tetraethylene glycol % w/cap |
|---|---|---|
| nMx$_{14}$ | 70.1% | 29.9% |
| nMx$_{15}$ | 58.4% | 41.6% |
| nMx$_{16}$ | 44.3% | 55.7% |
| nMx$_{17}$ | 35.0% | 65.0% |
| nMx$_{18}$ | 23.4% | 76.6% |

It is an embodiment of the present invention wherein the combination of capping agents facilitates passivation of the composite by way of aluminum oxygen bonding between the oxygen atoms available for each capping agent and the surfaces of the aluminum nanoparticle and can be stated simply as:

Core NPs+fatty acid/alcohol or PEG+alkadiene 4 organic-O-nMx+H$_2$(g), wherein the organic layer binds to the composite through aluminum oxygen bonds thereby forming a complex organic oxygen interface at the composite's aluminum surfaces. In addition, the reaction will release H$_{2(g)}$ and, in cases where the fatty alcohol or acid is unsaturated, may result in copolymerization of the complex organic layer bound via the aluminum oxygen bonding.

The following chemicals for making nMx$_{14}$-nMx$_{18}$ are purchased from Sigma-Aldrich and are as follows: Lithium aluminum hydride (LiAlH$_4$ (95%)), titanium isopropoxide (Ti(O$^i$Pr)$_4$, 97%), toluene (anhydrous grade, 99.8%), tetrahydrofuran (THF, anhydrous grade, ≥99.9%, inhibitor-free), stearic acid, stearyl alcohol, 1, 7- octadiene, and Polyethylene glycol (PEG) (average molecular weight (M$_n$) of 6000 amu and having water content of ≤1% w/w).

For simplicity, the following details the method for making nMx$_{16}$, where the co-capping agents tetraethylene glycol (an oligomer of ethyelene glycol) and stearyl alcohol are used to passivate the core nanoparticles. The solvents toluene and THF are not distilled and are kept in a glovebox, since they are anhydrous. Before reaction, both the toluene and the THF are deoxygenated by simply pumping their containers for 3 cycles on a Schlenk line. The Ti(O$^i$Pr)$_4$ is placed in an air-free storage flask and then freeze-pumped-thawed. All liquid reagents are transferred to separate pre-heat dried, air-free flasks inside the glovebox. The PEG is placed in an air-free flask and heated with a heat gun in vacuo on a Schlenk line. The PEG is melted and some degassing is observed. The PEG is allowed to return to room temperature and re-solidify. The PEG is purged with argon gas. This cycle is done twice to further reduce the water content.

The entirety of Reaction No. 5 is performed on a Schlenk line under argon atmosphere. The co-solvent system of toluene and THF can heat for at time at 85° C. LiAlH$_4$ is then added to a round bottom, air-free flask and dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the LiAlH$_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of LiAlH$_4$.

The decomposition reaction is left heating and stirring for ~10 minutes until the combination of capping agents is added. Note that adding the combination of capping agents according to Table 4 will form the desired iteration of nMx$_{14}$-nMx$_{18}$. The PEG is prepared by dissolving it in ~85 mL of toluene in a separate air-free flask, and some heat is applied to the solution to aid in dissolving the capping agent. The reaction uses 3 g of PEG to produce a 50 w/w of organic content of a 6 g yield of nMx$_{16}$. The PEG may consist of one number average molecular weight (M$_n$) or a mixture of M$_n$.

Once the combination of capping agents is added, the reaction mixture can react for a duration from about 0.5 hours to about 2 or more hours. After about a 2-hour reaction time, the solvent is removed by boiling in vacuo or can be removed by filtration or other methods. For a typical synthesis, nMx$_{16}$ is capped with polyethylene glycol (PEG, M$_n$=6000 amu). The organic content of the final nMx$_{16}$ is about 50% w/w. A theoretical yield of 6 g of nMx$_{16}$ is produced.

Reaction No. 6: nMx$_{19}$ & nMx$_{20}$

Reaction No. 6 and its corresponding data relates to our process for making and identifying nMx$_{19}$ and nMx$_{20}$. It is an aspect of the present invention wherein both nMx$_{19}$ and nMx$_{20}$ are produced by a bottom up synthesis that creates nanoparticles of both Li$_3$AlH$_6$ and elemental Al metal that are carefully sized and passivated at the controlled first reaction step of LiAlH$_4$ decomposition, where the capping agents various PEGs, PEO, or TEG of varying molecular weights.

For nMx$_{19}$, larger molecular weight PEG systems (from about 500 amu to about 6000 amu) are used as the capping agent, where the percent oxygen by mass of the PEG cap varies from about 36.4% to about 39%. For nMx$_{20}$, triethylene glycol (PEG with 3 monomer units) and/or tetraethylene glycol are used as capping agents, with 42.6% and 41.2% by mass oxygen mass of the capping agent, respectively.

It is an embodiment of the present invention wherein passivation of either nMx$_{19}$ or nMx$_{20}$ is by way of aluminum oxygen bonding between the oxygen atoms available on the capping agent and the surfaces of the aluminum nanoparticle and can be stated simply as:

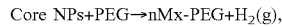

wherein the organic layer binds to the composite through aluminum oxygen bonds thereby forming an nMx-PEG complex.

The following chemicals for making nMx$_{19}$ and nMx$_{20}$ are purchased from Sigma-Aldrich and are as follows: Lithium aluminum hydride (LiAlH$_4$ (95%)), titanium (IV) isopropoxide (Ti(OiPr)$_4$, 97%), toluene (anhydrous grade, 99.8%), tetrahydrofuran (THF, anhydrous grade, ≥99.9%, inhibitor-free), PEO, Polyethylene glycol (PEG) (average molecular weight (Mn) of 6000 amu and having water content of ≤1% w/w) [nMx$_{19}$], triethylene glycol (PEG with 3 monomer units), and tetraethylene glycol (TEG) [nMx$_{20}$].

The solvents toluene and THF are distilled and kept in a glovebox. Before reaction, both the toluene and the THF are deoxygenated by simply pumping their containers for 3 cycles on a Schlenk line. The Ti(OiPr)$_4$ is placed in an air-free storage flask and then freeze-pumped-thawed. All liquid reagents are transferred to separate pre-heat dried, air-free flasks inside the glovebox. The PEG is placed in an air-free flask and heated with a heat gun in vacuo on a Schlenk line. The PEG is melted and some degassing is observed. The PEG can return to room temperature and resolidify. The PEG is purged with argon gas. This cycle is done twice to further reduce the water content.

The entirety of the reaction is performed on a Schlenk line under argon atmosphere. LiAlH$_4$ is introduced into a round bottom, air-free flask within a glovebox. Under a Schlenk line, the co-solvent system of toluene and THF are added to the flask containing LiAlH$_4$. The reaction mixture can heat for a time at 85° C. Other ethers beside tetrahydrofuran can be used such as diethyl ether or 1,4-dioxane. A thermocouple is inserted into the reaction mixture to monitor the temperature of the reaction.

Once the LiAlH$_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium (IV) isopropoxide is dissolved in toluene to create a solution with a concentration of ~10% v/v. Once the reaction mixture reaches from 85° C. to about 110° C., the titanium (IV) isopropoxide solution is added to catalyze the decomposition of LiAlH$_4$.

The decomposition reaction is left heating and stirring for ~10 minutes until the PEG is added. The PEG is prepared by dissolving in ~85 mL of toluene or THF in a separate air-free flask, and some heat is applied to the solution to aid in dissolving the capping agent. The reaction uses 3 g of PEG to produce a 50% w/w of organic content of a 6 g yield of nMx$_{20}$. The PEG may consist of one number average molecular weight (M$_n$) or a mixture of M$_n$.

Once the PEG is added, the reaction mixture can react for a duration from about 0.5 hours to about 2 or more hours. After about a 2-hour reaction time, the solvent is removed by boiling in vacuo or can be removed by filtration or other methods. For a typical synthesis, nMx$_{20}$ is capped with tetraethylene glycol (PEG with four monomer units and Mn=6000 amu). The organic content of the final nMx$_{20}$ is about 50% w/w to about 55% w/w. A theoretical yield of 6 g of nMx$_{20}$ is produced. For nMx$_{19}$, the nanoscale organic layer is a blend of polyethylene glycol having Mn=600 amu and Mn=6000 amu, where the blend may range from 1:1 to about 35:1.

nMx can be incorporated with a secondary high explosive by any traditional means, including slurry casting (with an appropriate solvent such as an ether or a hydrocarbon) of nMx and a secondary high explosive, or by directly pressing a pellet of nMx with the secondary high explosive, or by using an epoxide binder (or other appropriate binder) to combine the nMx and the secondary high explosive into a formable composite. nMx can be included into a secondary high explosive composite in concentrations ranging from about 0.1% w/w up to about 50% w/w.

Removal of Excess Organics Via Filtration

We purify our nanoparticles to maximize metal content and processability by removing any excess organic cap that did not passivate the two distinct metal cores. This step can be vital for production of materials with the highest metal content and improved processability. After the passivation period, the reaction vessel is removed from the heating mantle and placed on a cork ring. The reaction mixture is observed until a visible phase separation occurs. At this point, the top half of the reaction (clear/cloudy liquid) is decanted into a 1 L Erlenmeyer flask with a funnel until no more liquid will come out of the reaction. 50 mL of THF is added to the reaction mixture, and the flask is heated until the solvent boils.

The mixture can settle, and the solvent is again poured into the Erlenmeyer flask until no more can be decanted. 50 mL of THF is added, heated, and poured off several times. Then, the 50 mL is added to the reaction and the mixture is heated and poured into a 200 mL filtration flask under an argon environment. The funnel is heated to ensure a boiling solvent. The liquid is pulled with vacuum through the frit to a three (3) neck collection flask. Any remaining material in the reaction flask is rinsed with THF, heated, and poured into the filtration flask. The stopcock at the bottom of the filtration flask is closed, and the material is placed under vacuum overnight to remove any remaining solvent.

In certain batches or variants of nMx, the washing and filtration steps may still leave excess unbound organic material, evidenced by a hard or crunchy end product instead of a free-flowing powder. In these cases, the material is transferred from the filtration flask back to a three-neck flask. THF is added at a ratio ranging from 3:1 to 4:1. Heat and stirring is applied until the THF is boiling and a visible phase change is observed (~66° C.), and the temperature is held for ten minutes. The material can settle, and excess organic is poured off into an Erlenmeyer flask, similarly to the decanting step described previously. 50 mL of THF is added and heated, and the solvent is decanted once more. 50 mL THF is added, and the mixture is heated to boiling and added to the filtration flask. The material is heated, and the solvent is pulled through the fit using vacuum. The middle stopcock is closed, and vacuum is pulled through the top of the flask overnight.

Powder X-Ray Diffraction—nMx Structural Analysis

Powder X-Ray Diffraction (PXRD) is an analytical technique known in the art to categorize samples having crystalline phases. With PXRD, X-rays wavelengths relative to a diffraction angle can give insight into the lattice spacing of a nanocomposite's crystalline structure. nMx is finely ground into a powder and irradiated with X-rays to extract characteristic peaks from scattered waves. Only $Li_3AlH_6$ and elemental Al are in detectable amounts in crystal form and thus render PXRD peaks, indicating the lack of byproducts in our nanocomposite.

The PXRD scans for nMx samples are performed on a Rigaku XRD MiniFlex 600 diffractometer that has a Cu source operated at 40 kV/15 mA and a scintillation counter detector. Conversion of the diffraction peaks to d-spacings allows for further identification of nMx's core metals, as given for $nMx_{10}$. In addition, a Scherrer analysis is performed to discern the particle sizes from the peak widths of the diffractogram. The analysis uses an equation that relates the size of nanoparticles in a solid to the broadening of a peak in the diffractogram. The equation is as follows:

$$\tau = K\lambda/\beta \cos \Theta,$$

where $\tau$ is the mean size of the ordered (crystalline) domains, K is a dimensionless shape factor, $\lambda$ is the wavelength of the X-ray, $\beta$ is line broadening in radians, and $\Theta$ is the Bragg angle. Because the nanoscale organic layer is not a crystalline material, the nanocomposite's passivation layer cannot be examined by constructive interference of diffracted X-rays as defined by Bragg's Law ($n\lambda = 2d \sin \theta$), meaning the fundamental stretching frequencies of the nanoscale organic layer will be qualified via Raman and FTIR spectroscopy.

FIGS. 9-14 depict PXRD diffractograms for $nMx_{11}$, $nMx_{12}$, $nMx_{13}$, $nMx_{16}$, $nMx_{19}$, and $nMx_{20}$ respectively. Each iteration of nMx gives, on the average, very similar peaks at 2$\Theta$, where the average peak positions for FIGS. 9-14 that characterize the two distinct nanoparticles are given in Table 8 along with their corresponding Miller indices and Scherrer nanoparticle sizes. The diffractograms depicted in FIGS. 9-14 show the y-axis labeled as Relative Intensity from 0% to 100%. The x-axis is rendered in degrees relative to 2$\Theta$. For all nMx PXRD scans, the Al (111) plane located at about 38.4° has the highest peak intensity. All other peak intensities corresponding to crystalline Al and $Li_3AlH_6$ are measured relative to the intensity of the Al (111) peak.

The average relative intensities for the other peaks corresponding to crystalline Al nanoparticles, across the as mentioned nMx sample selection, are as follows: the Al (200) peak at 44.7° has a relative intensity of 49%; the Al (220) peak at 65.1° has a relative intensity of 32%; the Al (311) peak at 78.2° has a relative intensity of 30%; and the Al (222) peak at 82.4° has a relative intensity of 12%.

The crystalline Al nanoparticles peaks are larger in intensity and more pronounced than the peaks belonging to $Li_3AlH_6$ nanoparticles. $Li_3AlH_6$ nanoparticles have a lower scattering cross section for the X-rays due to 90% of the atoms in $Li_3AlH_6$ having a low atomic weight (Li and H), which renders peak intensities that are lower in magnitude relative to the heavier Al atomic core.

$Li_3AlH_6$ nanoparticles render PXRD double, or unresolved peaks, at 2$\Theta$. The average relative intensities for the peaks corresponding to crystalline $Li_3AlH_6$ nanoparticles, across the as mentioned nMx sample selection, are as follows: $Li_3AlH_6$ (110) peak at 21.9° has a relative intensity of 29%; $Li_3AlH_6$ (012) peak at 22.5° has a relative intensity of 30%; $Li_3AlH_6$ (202) peak at 31.7° has a relative intensity of 16%.

The average Scherrer width of the Al (111) peak at 38.4° relative to 2$\Theta$ for the various types of nMx is 18 nm. The average Scherrer width of the $Li_3AlH_6$ (202) peak at 37.1° relative to 2$\Theta$ for the various types of nMx is 23 nm. PXRD scans confirm that our method produces elemental Al nanoparticles and $Li_3AlH_6$ nanoparticles that are below 50 nm. Therefore, it is an aspect of the present invention wherein the lower limit of nMx's nanoparticle size distribution for elemental Al core metals is about 18 nm and the lower limit for nanoparticle size distribution for $Li_3AlH_6$ core metals is about 23 nm.

TABLE 8

PXRD data for various nMx iterations at 2θ, Relative
Intensity, Lattice spacing, and Scherrer size.

| Core Metal NPs | $Li_3AlH_6$ NPs | | | Elemental Al NPs | | | | |
|---|---|---|---|---|---|---|---|---|
| 2θ Diffraction | 21.9° | 22.5° | 31.7° | 38.4° | 44.7° | 65.1° | 78.2° | 82.4° |
| Relative Intensity | 29% | 30% | 16% | 100% | 49% | 32% | 30% | 12% |
| Lattice spacing | (110) | (012) | (202) | (111) | (200) | (220) | (311) | (222) |
| NPs Scherrer Size | | 23 nm | | | | 18 nm | | |

FTIR & Raman Data—nMx Spectroscopic Analysis

Because the nanoscale organic layer is not a crystalline material, the passivation agent for the core nanoparticles cannot be examined by constructive interference of diffracted X-rays as defined by Bragg's Law ($n\lambda = 2d \sin \theta$). nMx's nanoscale organic layer is analyszed via traditional FTIR and Raman spectroscopy, which are well known in the art. Raman spectroscopy measures scattered laser light based on the fundamental stretching frequencies of the nanoscale organic layer to observe vibrational, rotational, and other low-frequency modes in organics, giving a finger print for each passivation agent about the core nanoparticles.

Figure 15:
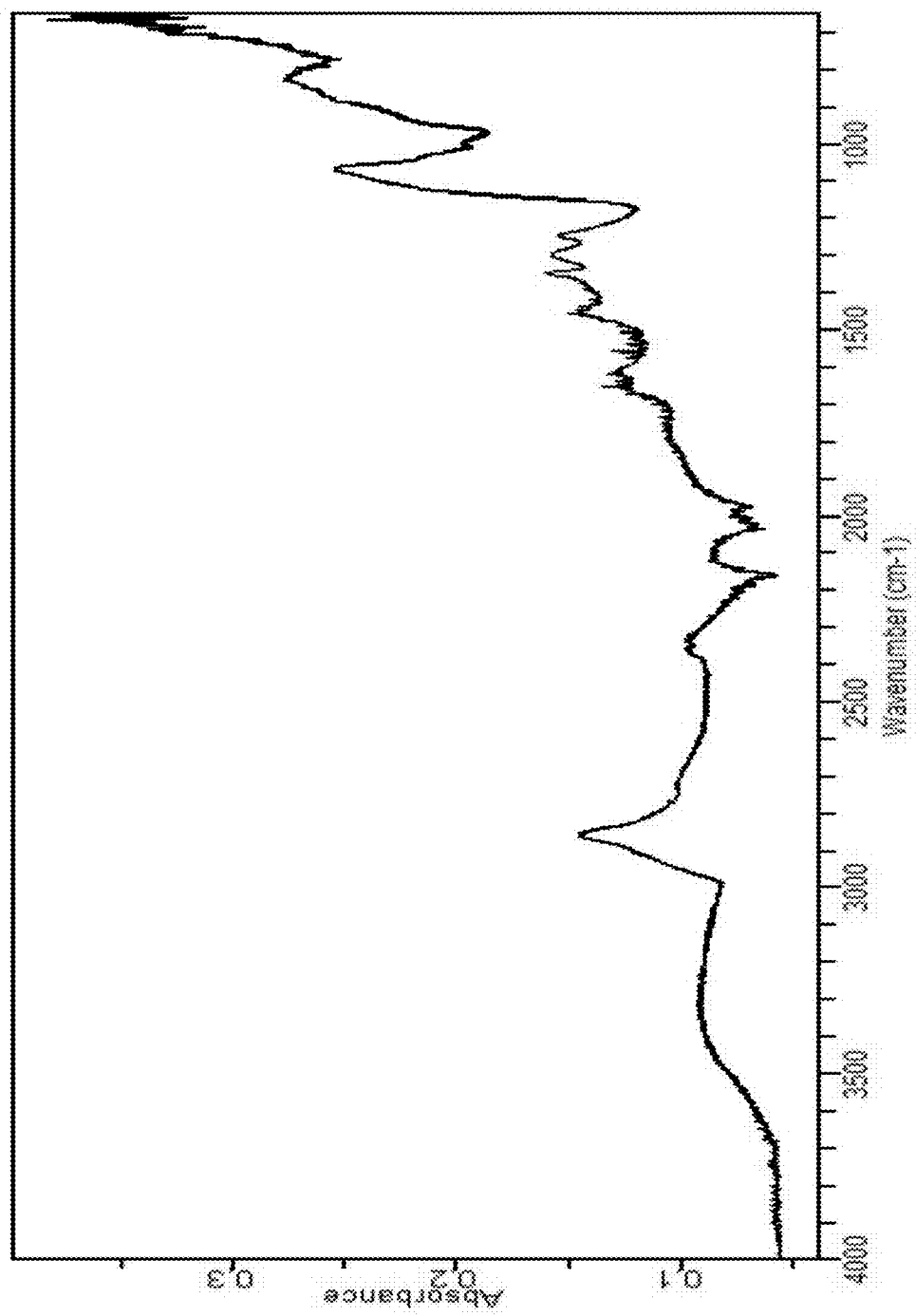
FIG. 15 depicts FTIR stretching frequencies of the nanoscale organic layer for $nMx_{20}$. The nanoscale organic layer is a glycol and shows a band at 1080 $cm^{-1}$ (C—O stretching in the glycol) and at 2850-2970 $cm^{-1}$ (C—H stretching in the glycol). This indicates that the there is an association with the glycol nanoscale organic layer and the two distinct core nanoparticles.

FIG. 15 depicts FTIR stretching frequencies of the nanoscale organic layer for $nMx_{20}$. The nanoscale organic layer is a glycol and shows a band at 1080 $cm^{-1}$ (C—O stretching in the glycol) and at 2850-2970 $cm^{-1}$ (C—H stretching in the glycol). This indicates that the there is an association with the glycol nanoscale organic layer and the two distinct core nanoparticles.

Figure 16:
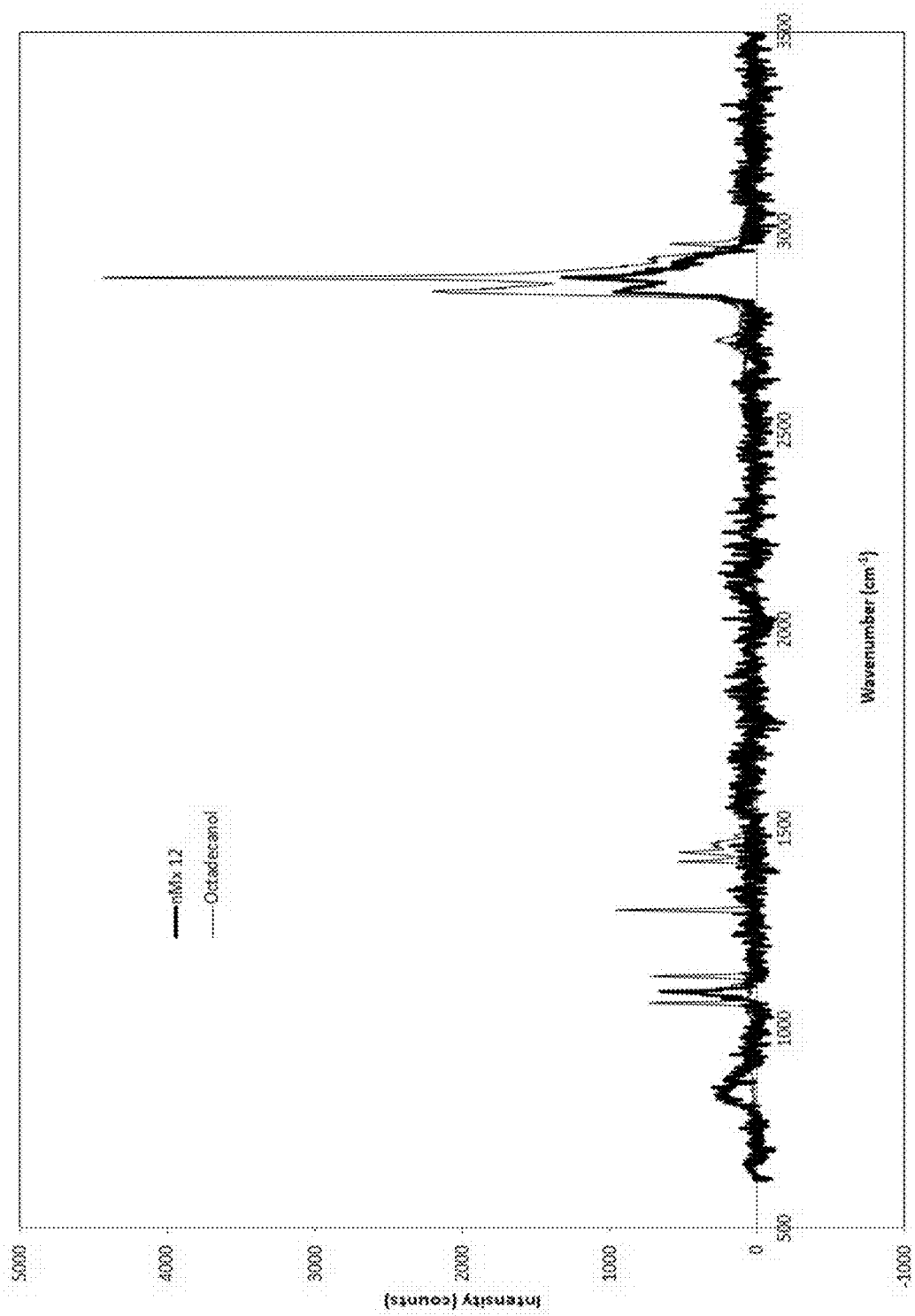
FIG. 16 depicts Raman scattering for $nMx_{12}$, where octadecanol is the nanoscale organic layer. The Raman scan is performed from 500 $cm^{-1}$ to 3500 $cm^{-1}$. Octadecanol gave Raman frequencies for $nMx_{12}$ at about 1092 $cm^{-1}$ (C—O stretch) and at about 2850-2920 $cm^{-1}$ (C—H stretch).

FIG. 16-FIG. 19 are Raman spectra for $nMx_{12}$, $nMx_{13}$, $nMx_{16}$, and $nMx_{19}$ respectively. FIG. 16 depicts Raman scattering for $nMx_{12}$, where the scan is performed from 500 $cm^{-1}$ to 3500 $cm^{-1}$ for octadecanol as the nanoscale organic layer. Octadecanol gave Raman frequencies for $nMx_{12}$ at about 1092 $cm^{-1}$ (C—O stretch) and at about 2850-2920 $cm^{-1}$ (C—H stretch).

Figure 17:
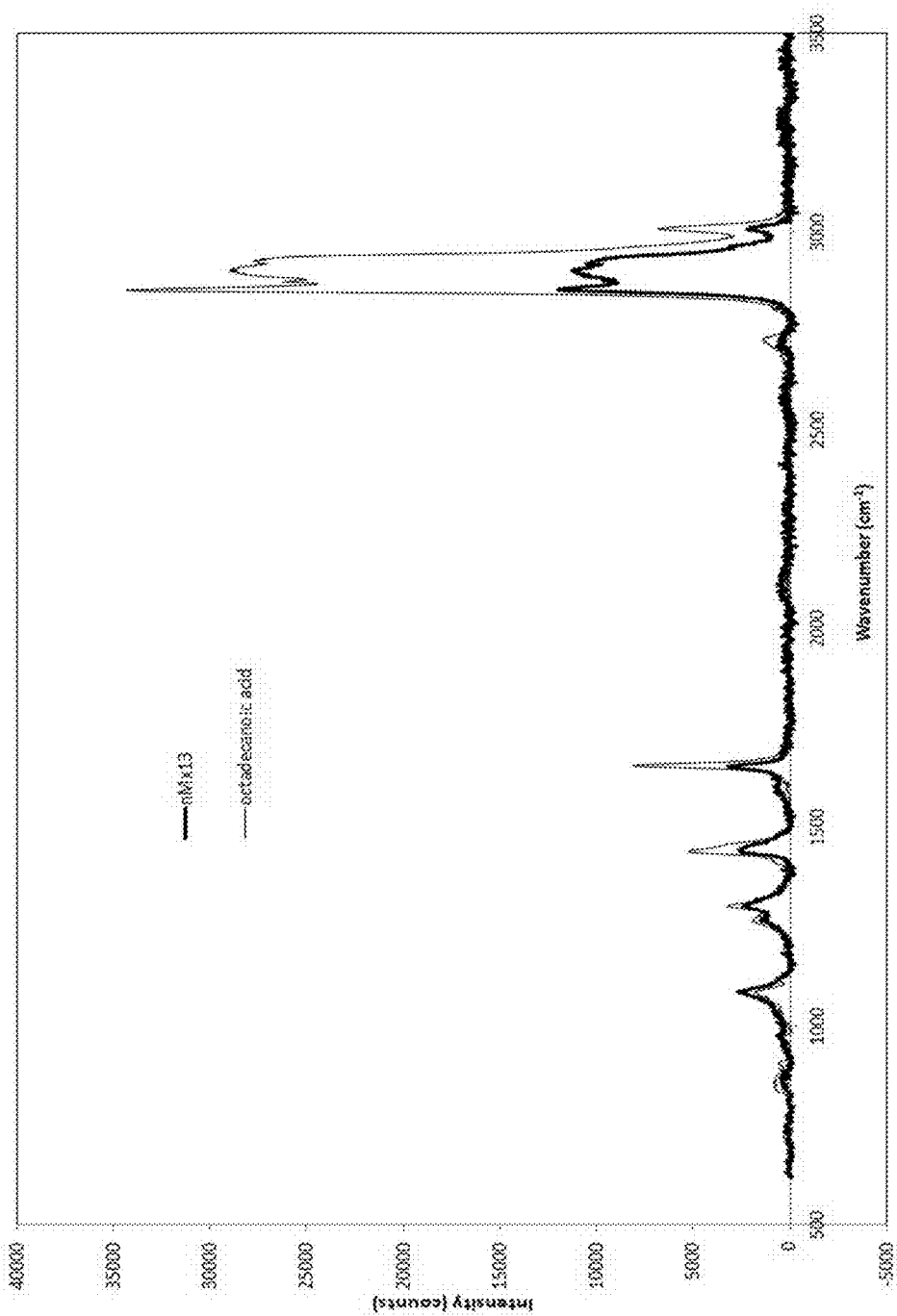
FIG. 17 depicts Raman scattering for $nMx_{13}$, where octadecanoic acid is the nanoscale organic layer. The Raman scan is performed from 500 $cm^{-1}$ to 3500 $cm^{-1}$. Octadecanoic acid gave Raman frequencies for $nMx_{13}$ at about 1294 $cm^{-1}$ (C—O stretch), at about 1645 $cm^{-1}$ (C=O stretch), and at about 2841-3024 $cm^{-1}$ (C—H stretch).

FIG. 17 depicts Raman scattering for $nMx_{13}$, where the scan is performed from 500 $cm^{-1}$ to 3500 $cm^{-1}$ for octadecanoic acid as the nanoscale organic layer. Octadecanoic acid gave Raman frequencies for $nMx_{13}$ at about 1294 $cm^{-1}$ (C—O stretch), at about 1645 $cm^{-1}$ (C=O stretch), and at about 2841-3024 $cm^{-1}$ (C—H stretch).

Figure 18:
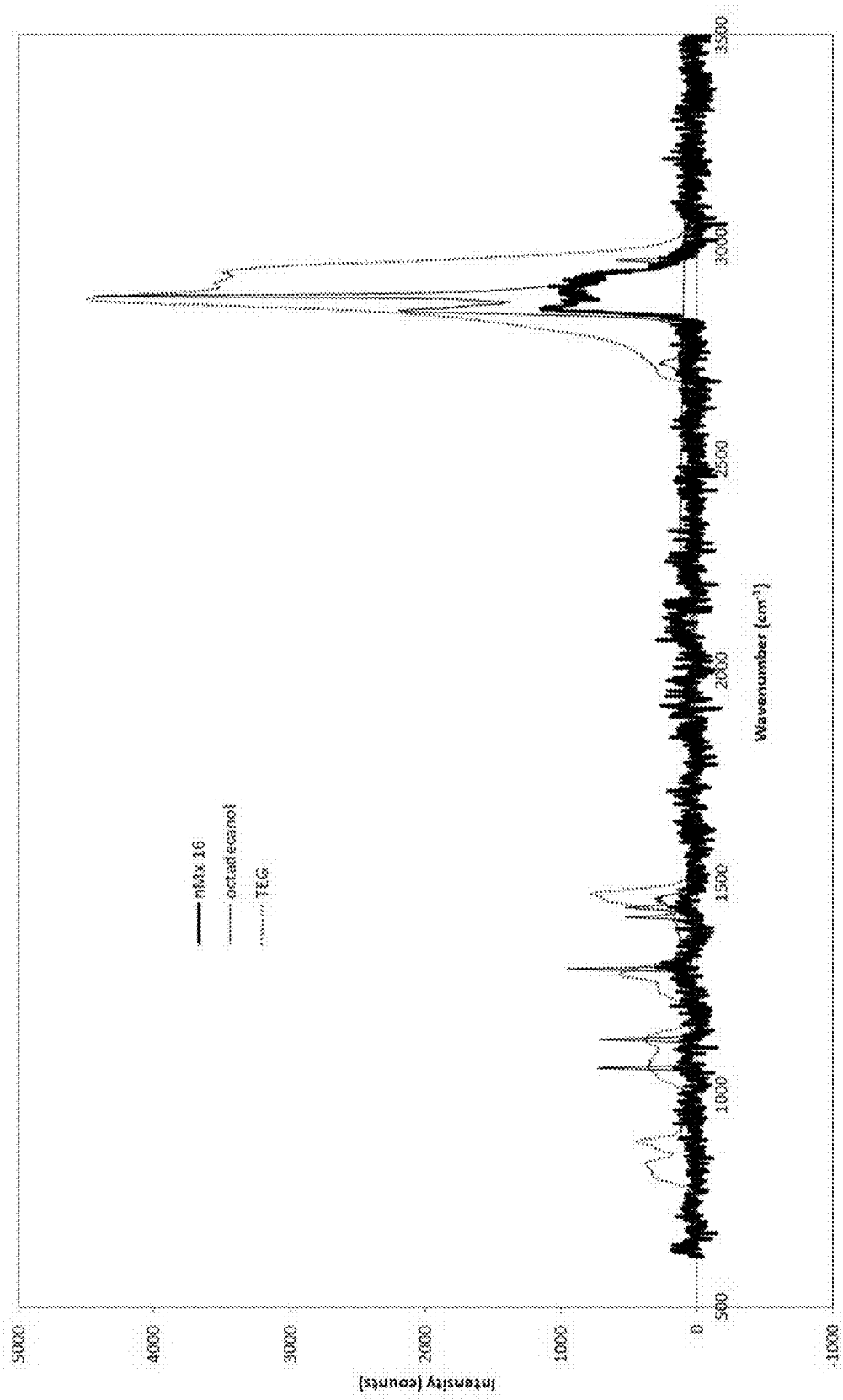
FIG. 18 depicts Raman scattering for $nMx_{16}$, where a mixture of octadecanol and TEG is the nanoscale organic layer. The Raman scan is performed from 500 $cm^{-1}$ to 3500 $cm^{-1}$. The mixture of octadecanol and TEG gave Raman frequencies for $nMx_{16}$ from about 2839 $cm^{-1}$ to about 2915 $cm^{-1}$ (C—H stretch). Note that the C—O stretch is too weak and not observable.

FIG. 18 depicts Raman scattering for $nMx_{16}$, where the scan is performed from 500 $cm^{-1}$ to 3500 $cm^{-1}$ for a mixture of octadecanol and TEG as the nanoscale organic layer. The mixture of octadecanol and TEG gave Raman frequencies for $nMx_{16}$ from about 2839 $cm^{-1}$ to about 2915 $cm^{-1}$ (C—H stretch). Note that the C—O stretch is too weak and not observable.

Figure 19:
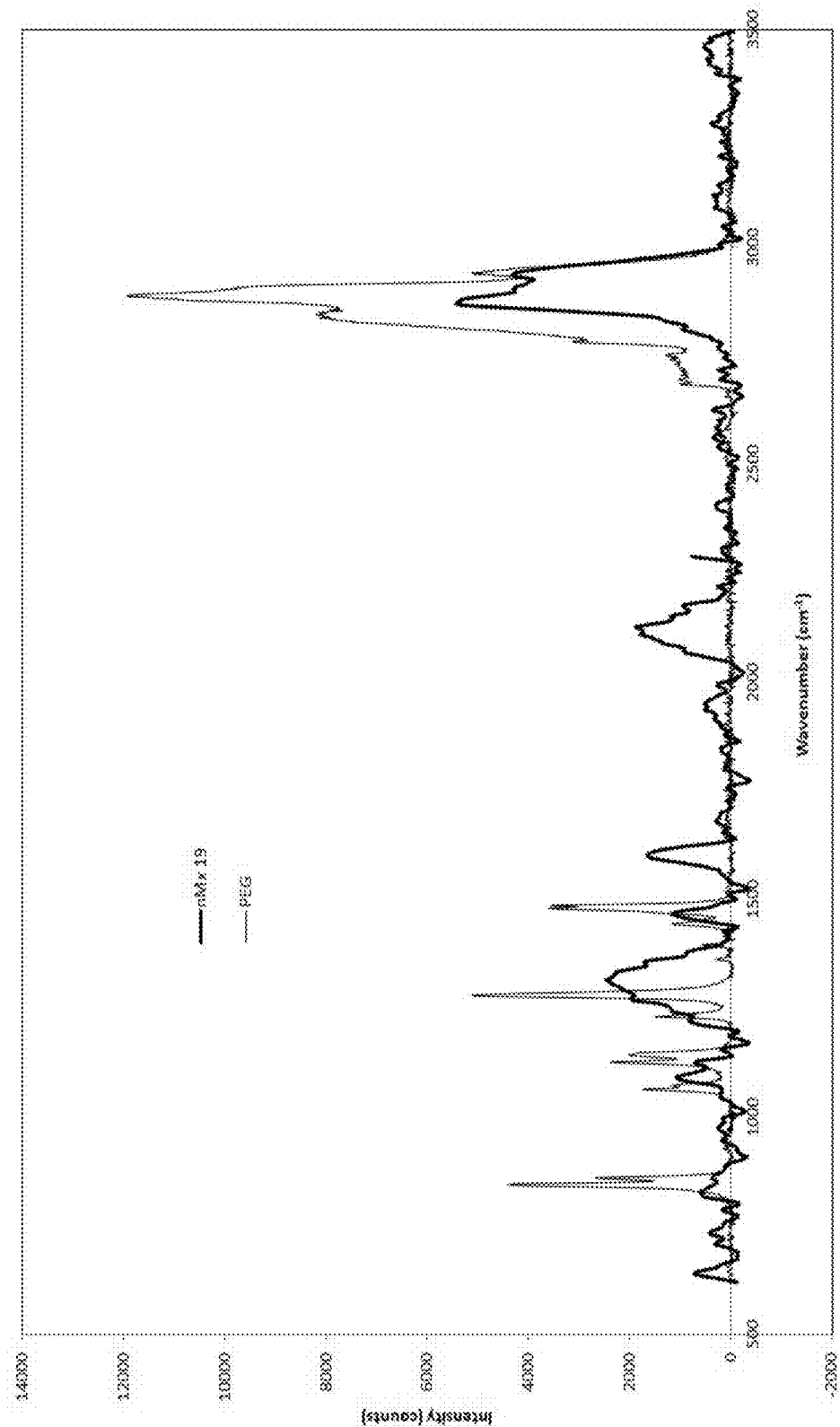
FIG. 19 depicts Raman scattering for $nMx_{19}$, where PEG is the nanoscale organic layer. The Raman scan is performed from 500 $cm^{-1}$ to 3500 $cm^{-1}$. PEG gave Raman frequencies for $nMx_{19}$ at about 1086 $cm^{-1}$ (C—O stretch) and at about 2868-2950 $cm^{-1}$ (C—H stretch).

FIG. 19 depicts Raman scattering for $nMx_{19}$, where the scan is performed from 500 $cm^{-1}$ to 3500 $cm^{-1}$ for PEG as the nanoscale organic layer. PEG gave Raman frequencies for $nMx_{19}$ at about 1086 $cm^{-1}$ (C—O stretch) and at about 2868-2950 $cm^{-1}$ (C—H stretch).

It is an aspect of the present invention wherein $nMx_{11}$ through $nMx_{20}$ may be identified as a nanometallic organic hybrid that is best described by the combination of PXRD peaks for both core nanoparticles and the Raman fundamental stretching frequencies of the agents used for the nanoscale organic layer as follows: $Li_3AlH_6$ nanoparticles giving PXRD double peaks at 2θ at about about 21.9°, at about 22.5°, and at about 31.7°, elemental Al nanoparticles giving PXRD peaks at 2θ at about 38.4° [highest peak], about 44.7°, at about 65.1°, at about 78.2°, and about 82.4°, and the nanoscale organic layer giving C—O stretching frequencies from about 1086 cm–1 to about 1294 $cm^{-1}$, C=O stretching frequencies of about 1645 $cm^{-1}$, C—H stretching frequencies from about 2841 $cm^{-1}$ to about 3024 $cm^{-1}$.

DSC/TGA—nMx Thermal Analysis

Because nMx can be used as an advanced fuel in various applications, DSC/TGA data examines the thermal behavior of the present invention. Differential Scanning calorimetry/Thermo Gravimetric Analysis (DSC-TGA) are combined thermal analysis techniques that find combustion events of a sample relative to time and increased heat (DSC) and mass change of a substance relative to the same (TGA). The DSC-TGA analysis is done on TA Instruments DSC/TGA SDT Q600. The exotherms for various nMx iterations give ignition and combustion events for the Li3AlH6 nanoparticles, the elemental Al nanoparticles, and the nanoscale organic layer in air. The DSC scanning rate for all nMx scans are either 5° C. per minute ($nMx_{12}$), 10° C. per minute ($nMx_{10, 11, 16, 19, and\ 20}$), or ~20° C. per minute ($nMx_{13}$).

Figure 20:
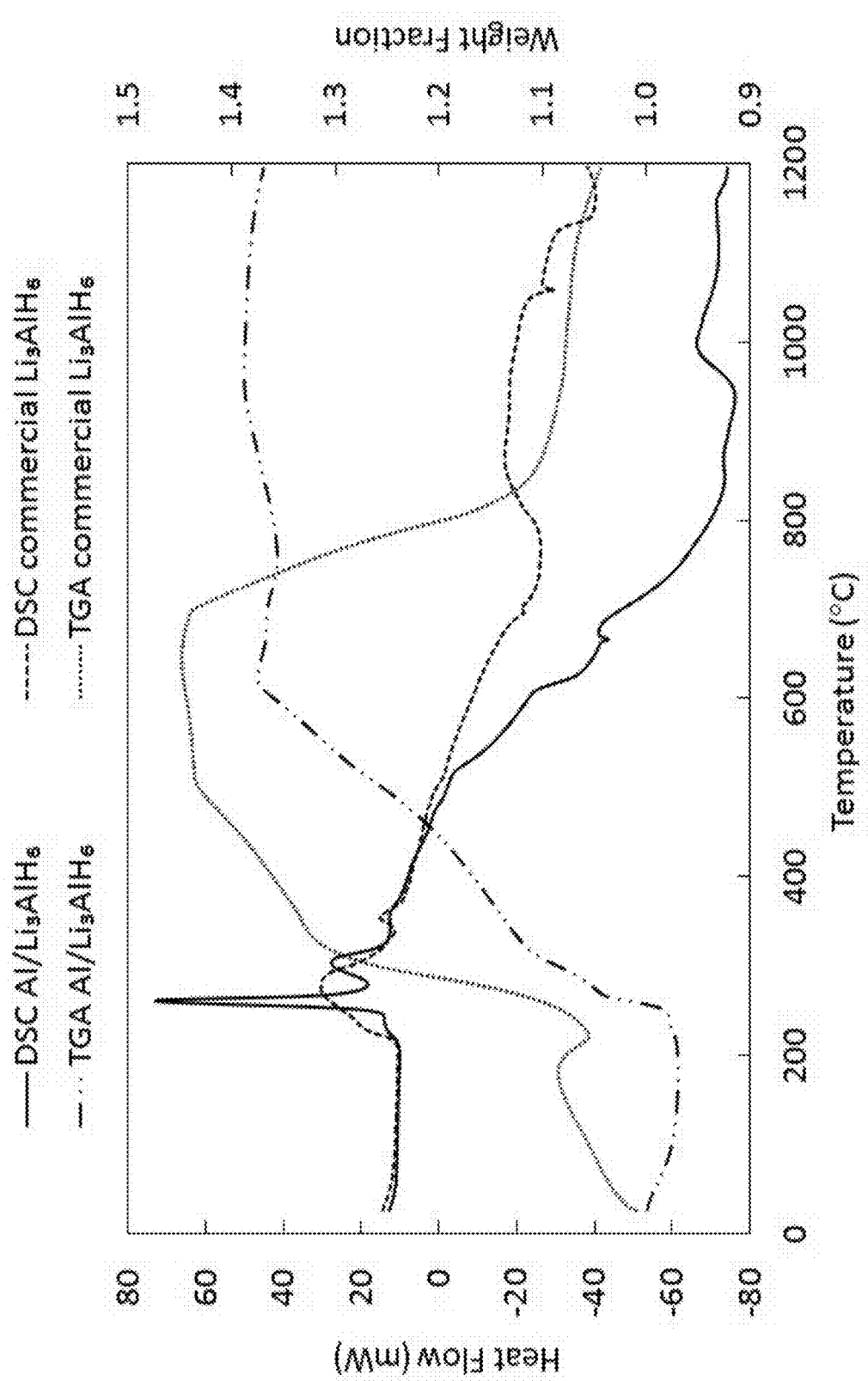
FIG. 20 displays DSC-TGA curves for $nMx_{10}$ and commercial $Li_3AlH_6$ under ambient air flow. The nanoscale organic layer is 1, 7-octadiene.

FIG. 20 depicts DSC-TGA curves for $nMx_{10}$ and commercial $Li_3AlH_6$ under ambient air flow. The nanoscale organic layer is octadiene for $nMx_{10}$. The DSC-TGA scan of $nMx_{10}$ is compared with the DSC-TGA scan of commercial $Li_3AlH_6$. The DSC onset temperature of the exotherm on $nMx_{10}$ is at 252° C., which is like the onset of the exotherm (218° C.) located on the commercial $Li_3AlH_6$. The slight bump at 600° C. is attributed to the ignition and combustion of elemental Al nanoparticles. The TGA shows mass gains for these exotherms on the $nMx_{10}$ and commercial $Li_3AlH_6$ are due to the combustion with oxygen gas to produce the solid combustion products of $Li_2O$ and $Al_2O_3$.

Figure 21:
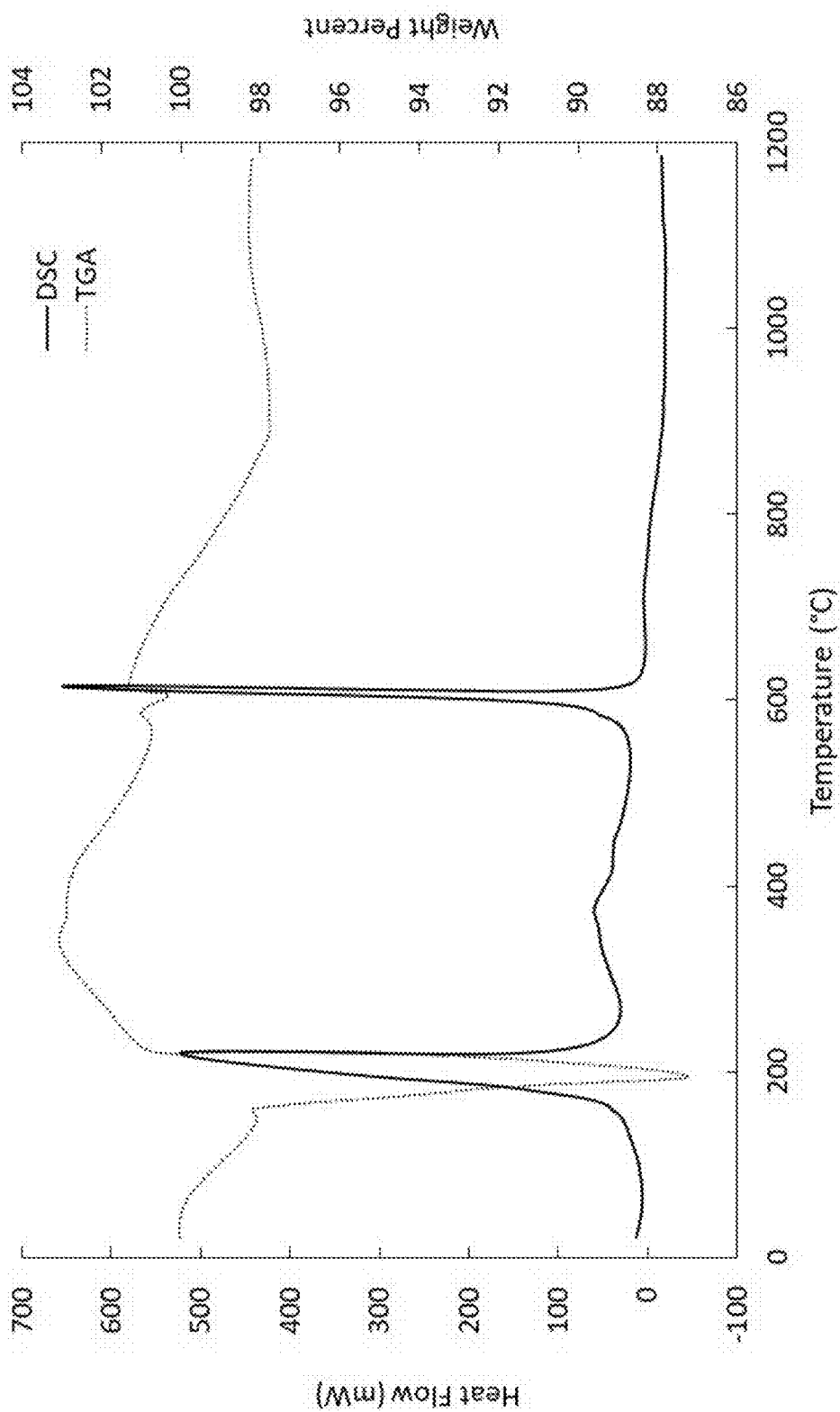
FIG. 21 displays DSC-TGA curves for $nMx_{11}$ under ambient air flow with a mixture of epoxydecene and alkadiene as the nanoscale organic layer, where the starting materials are mixed at a ratio of 10:1:2 of $LiAlH_4$:epoxydecene:octadiene respectively.

FIG. 21 displays DSC-TGA curves for $nMx_{11}$ under ambient air flow with epoxydecene and an alkadiene as the nanoscale organic layer. The starting materials for $nMx_{11}$ are mixed at ratios of 10:1:2 of $LiAlH_4$:epoxydecene:octadiene respectively, and where the nanoscale organic layer is a mixture of epoxydecene and octadiene. The DSC exotherm for $nMx_{11}$, being the solid black line, exhibits an $Li_3AlH_6$ exotherm with an onset of 160° C. $nMx_{11}$ also exhibits an exotherm related to elemental Al nanoparticle combustion, in which the onset is at 586° C. Also note that there is a small exothermic peak at about 380° C. This peak can be attributed to the combustion of the nanoscale organic layer. We believe the decrease from 450° C. onward is due to other chemical species such as $Li_2O$ and $Al_2O_3$ and the like.

FIG. 22 displays DSC-TGA curves for $nMx_{12}$ under ambient air flow with 50% steryl-alcohol as the nanoscale organic layer. For $nMx_{12}$, two exothermic peaks correspond to the combustion of $Li_3AlH_6$. The first exothermic peak is accompanied with a mass gain and its onset is at 110° C., in which the mass gain is due to the association with molecular oxygen during the combustion of $Li_3AlH_6$. The second exothermic peak is accompanied with a mass loss and its onset is at 265° C. This mass loss is due to the combustion of the organic cap into gaseous combustion products, which is offset with the mass gain of the oxidation of $Li_3AlH_6$. Another exotherm related to the combustion of the Al nanoparticles occur with an onset of 568° C. In addition, another exotherm is observed with an onset of 690° C., which is related to the reaction of $Li_2O$ and $Al_2O_3$ associates together to produce $LiAlO_2$.

Figure 23:
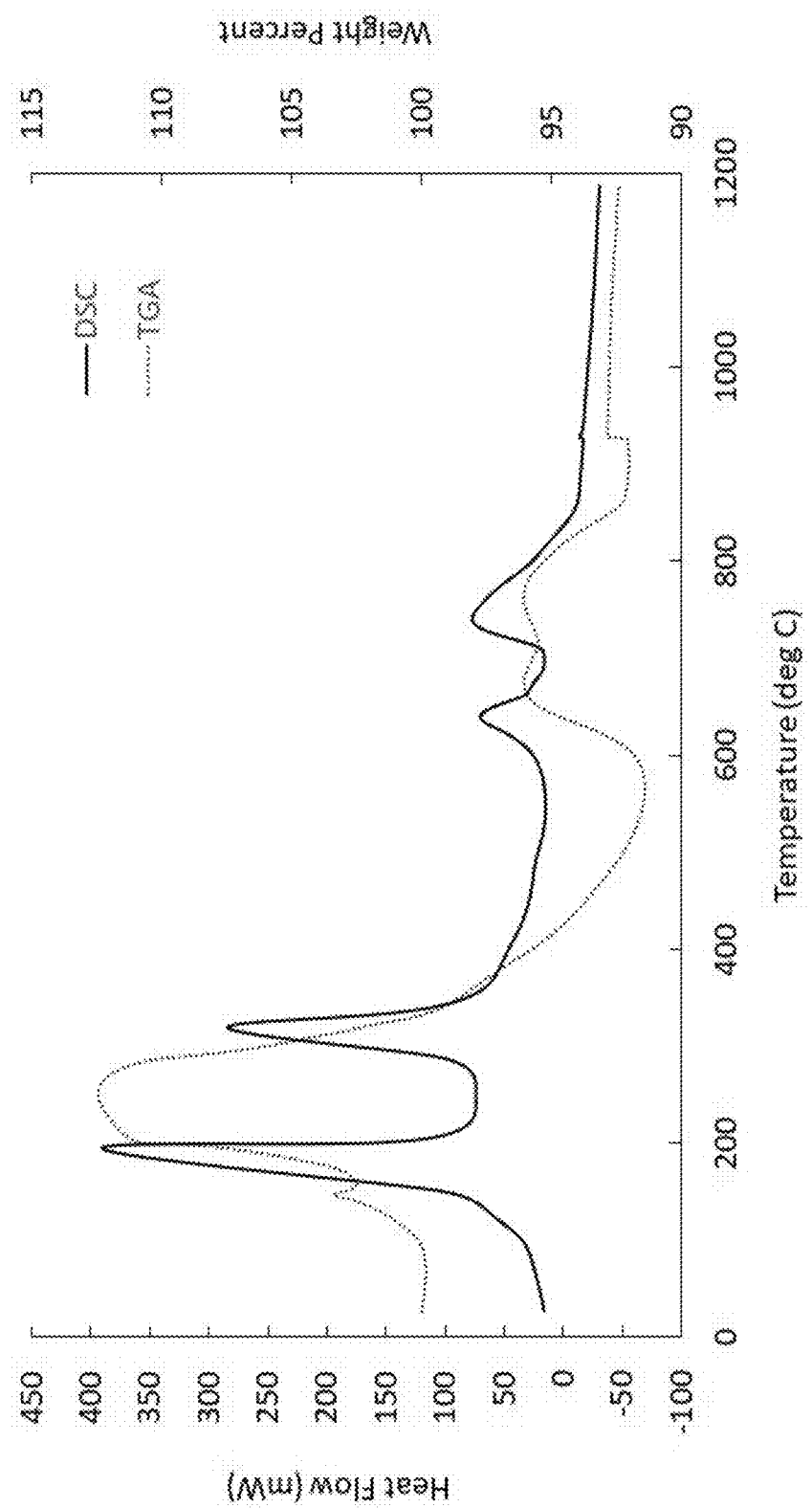
FIG. 23 displays DSC-TGA curves for $nMx_{13}$ under ambient air flow with 44% oleic acid as the nanoscale organic layer.

FIG. 23 displays DSC-TGA curves for $nMx_{13}$ under ambient air flow with 44% oleic acid as the nanoscale organic layer. $nMx_{13}$ has a similar DSC-TGA profile as $nMx_{12}$. It also exhibits two exotherms related to the combustion of $Li_3AlH_6$ at 90° C. and 270° C., in which the first exotherm experiences a mass gain and the second exotherm experiences a mass loss. The intense peak at about 325° C. is attributed to the ignition and combustion of the nanoscale organic layer. It also has two exotherms related to the combustion of Al and the appearance of $LiAlO_2$ at the respective onset temperatures of 570° C. and 700° C.

Figure 24:
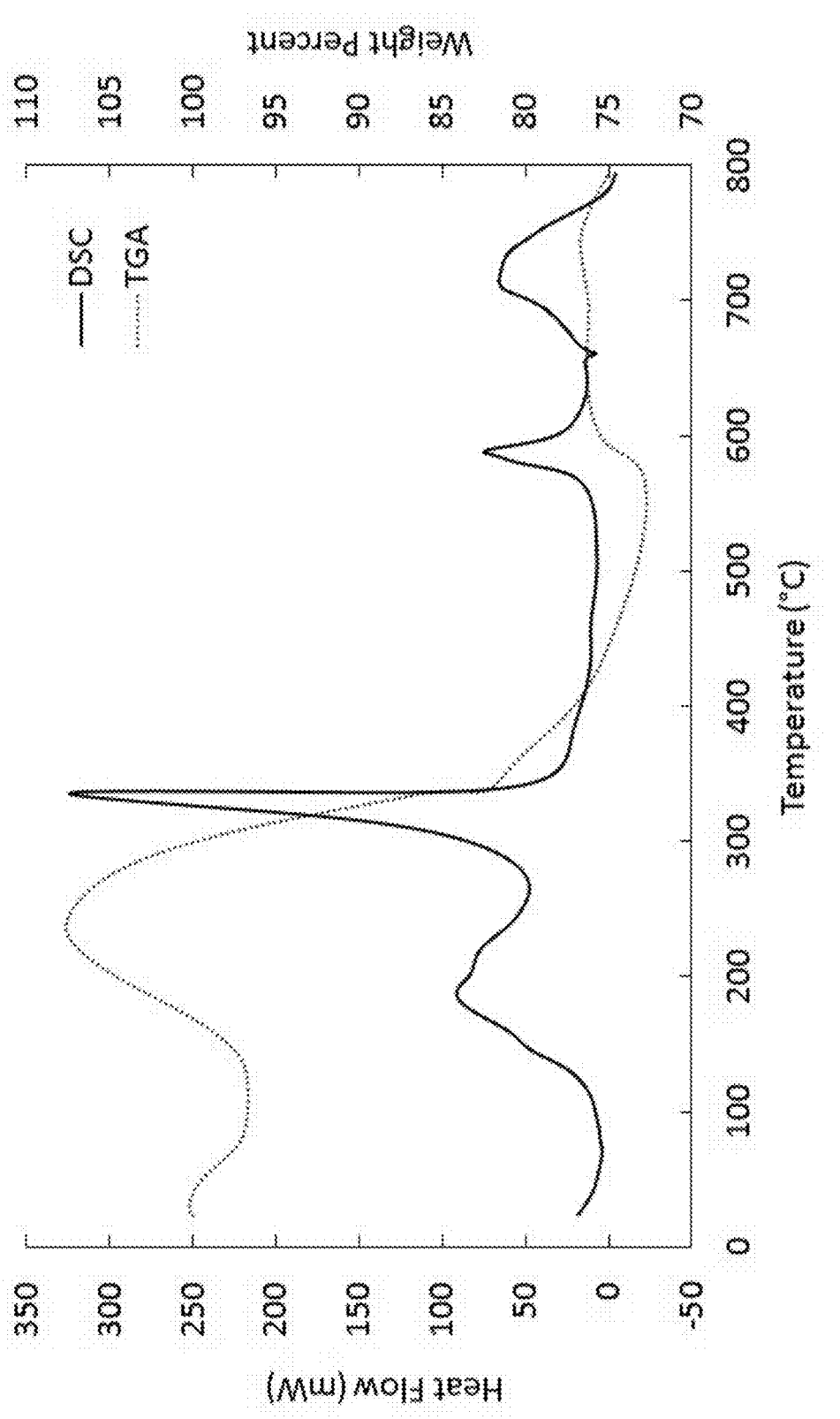
FIG. 24 displays DSC-TGA curves for $nMx_{16}$ under ambient air flow with a mixture of octadecanol/TEG as the nanoscale organic layer.

FIG. 24 displays DSC-TGA curves for $nMx_{16}$ under ambient air flow with a mixture of octadecanol/TEG as the nanoscale organic layer. $nMx_{16}$ has a similar DSC-TGA profile with $nMx_{12/13}$. The exotherm onsets of $Li_3AlH_6$ are at 125° C. and 270° C. The onsets of exotherms of elemental Al nanoparticle combustion and $LiAlO_2$ association are located respectively at 560° C. and 670° C.

Figure 25:
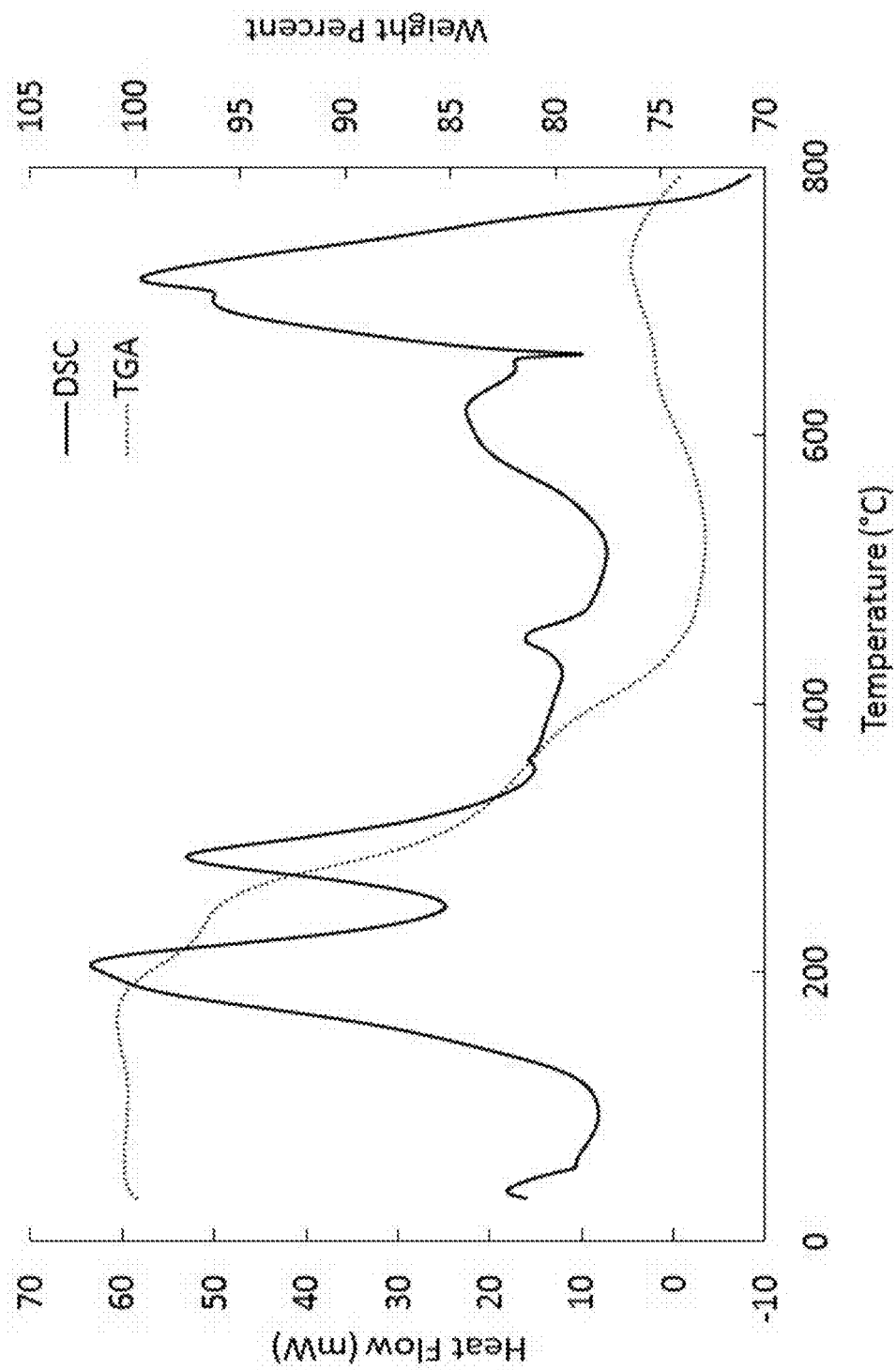
FIG. 25 displays DSC-TGA curves for $nMx_{19}$ under ambient air flow with PEG 600 as the nanoscale organic layer.

FIG. 25 displays DSC-TGA curves for $nMx_{19}$ under ambient air flow with PEG 600 as the nanoscale organic layer. $nMx_{19}$ gives three exotherms with a mass loss that are related to the combustion of $Li_3AlH_6$, in which the onsets are located at 110° C., 250° C., and 430° C. Three exothermic peaks due to the combustion of $Li_3AlH_6$ rather than two peaks like the nMx12/13/16 may occur since there is a trimodal size distribution of $Li_3AlH_6$ nanoparticles in $nMx_{19}$. The exothermic onset for elemental Al nanoparticle combustion is at 550° C., and the exothermic onset of $LiAlO_2$ association is located at 675° C. The relative amount of exothermic heat (integral of peak) relating to production of $LiAlO_2$ is much larger than the same peak in the formulations of $nMx_{10-16}$ possibly because the diol of a PEG molecule covalently links an Al and $Li_3AlH_6$ nanoparticle, which reduces their interfacial distance.

Although DSC-TGA scans for $nMx_{20}$ are not shown, the scans disclose five exothermic peaks related to the $Li_3AlH_6$ nanoparticles located with an onset of 90° C., 200° C., 280° C., 340° C., 470° C. The modes of size distribution have increased with $nMx_{20}$ over the $nMx_{19}$ perhaps due to the smaller size of the tetraethylene glycol over the PEG molecules, in which smaller molecules may provide a greater number of size distributions. The exothermic peak for elemental Al nanoparticle combustion has an onset of 525° C. Like $nMx_{19}$, a relatively large amount of exothermic heat is produced from the association of $LiAlO_2$, in which the onset is at 665° C.

In total, the DSC data shows that a few exotherms are located at about 200° C.-400° C., which are due to the combustion of $Li_3AlH_6$ nanoparticles with oxygen to produce $Li_2O$ and $Al_2O_3$ and the unexpected combustion event of the nanoscale organic layer immediately after the same. Another important exotherm is located at about 600° C., which is due to the combustion of elemental Al nanoparticles to produce $Al_2O_3$. In addition, an exotherm at about 700° C. is due to the reaction between the $Li_2O$ and $Al_2O_3$ to produce lithium aluminate, $LiAlO_2$. The TGA data infers that the exotherms are accompanied by either a mass gain due to the oxidation of the metals or a mass loss due to the capping agent oxidation to produce combustion gases.

DSC data indicates that nMx, on average, can render at least three combustion events. Two combustion events can be attributed to the core nanoparticles and another to the combustion of the nanoscale organic layer. nMx and certain oxidizers used in combustion processes ignite within the same temperature ranges. If the oxidizer, a nonlimiting example being ammonium perchlorate, and the nMx nanocomposite ignite within the same temperature range, then the multiple combustion behavior could lead to improved advanced fuels or additives that give a unique burning behavior for many combustion applications.

TEM Data—nMx Nanoparticle Images

True nanoparticles for nMx are readily seen in TEM images shown in FIGS. 26-31. Transmission Electron Microscopy (TEM) is a well-known spectroscopic technique for giving high resolution images of samples that are 100 nm or less in diameter. All images were taken using a JEOL 1200ex TEM operated at 60 kV. Samples were cast on formvar TEM grids. An image analysis software suite, non-limiting examples being MacTempas image simulation software, Cerius2, EMAN, IMAGIC, CCP4, CRISP, MRC, or FEI Amira, was used to properly analyze nanoparticle size distributions for nMx samples.

With TEM, an image is formed from the interaction of electrons with the sample as the beam is transmitted through the specimen. This image provides information about the space group symmetries and orientation of the single crystal nanoparticles relative to the electron beam's path, giving the physical dimensions of the nanoparticles or a nanoscale size distribution of the same [24]. While PXRD scans identify the nanoscale extent of the crystalline domains, true nanoparticle nature is confirmed by TEM imaging.

Figure 26:
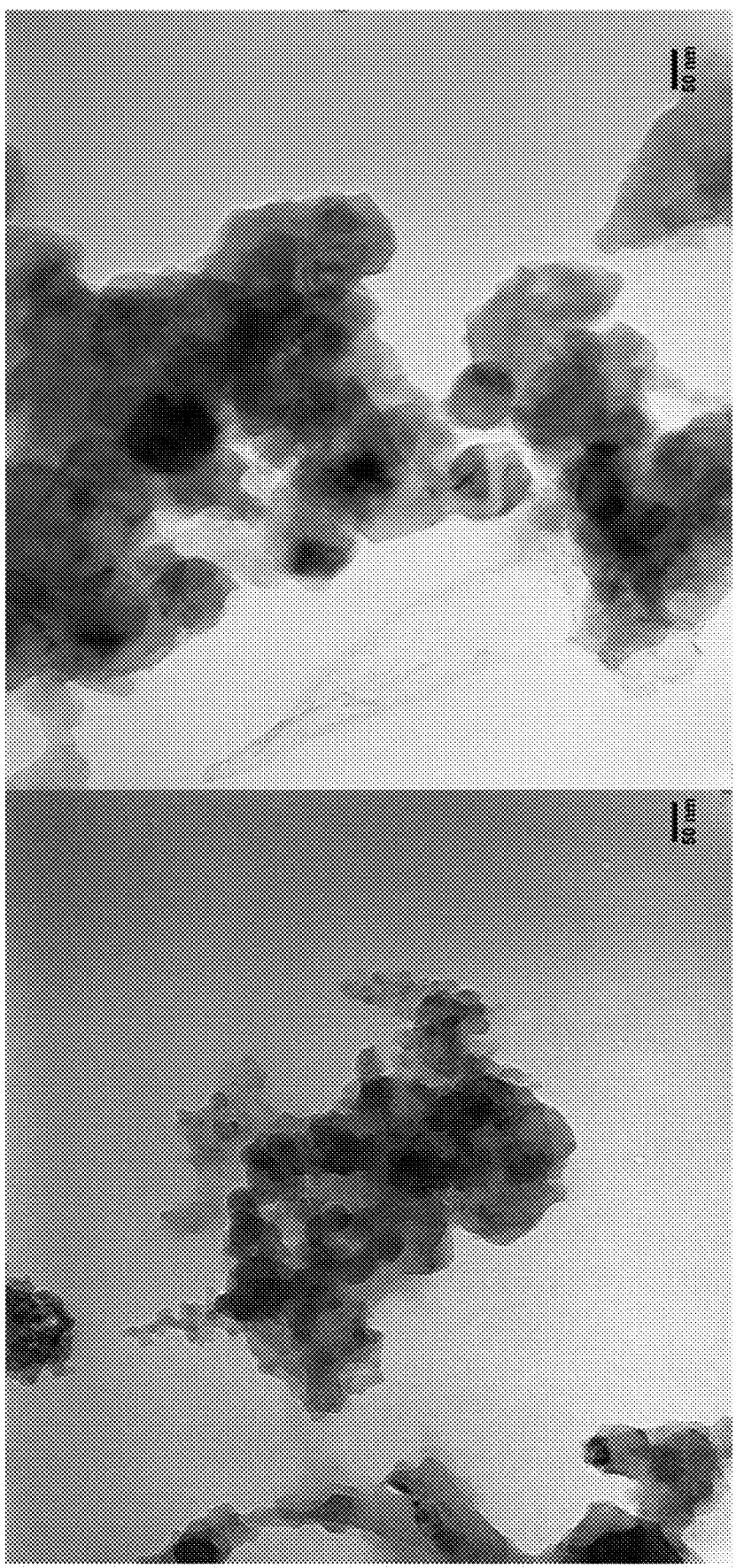
FIG. 26 depicts two separate TEM images of $nMx_{10}$, where core metal nanosurfaces are passivated by octa-diene as the nanoscale organic layer.

TEM images show that the shape and size of nMx nanoparticles vary depending on the type of passivation agent used during the reaction and the push and pull of reaction conditions. FIG. 26 depicts two separate TEM images of $nMx_{10}$, where core metal nanosurfaces are passivated by octadiene as the nanoscale organic layer. FIG. 26 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 50 nm.

Figure 27:
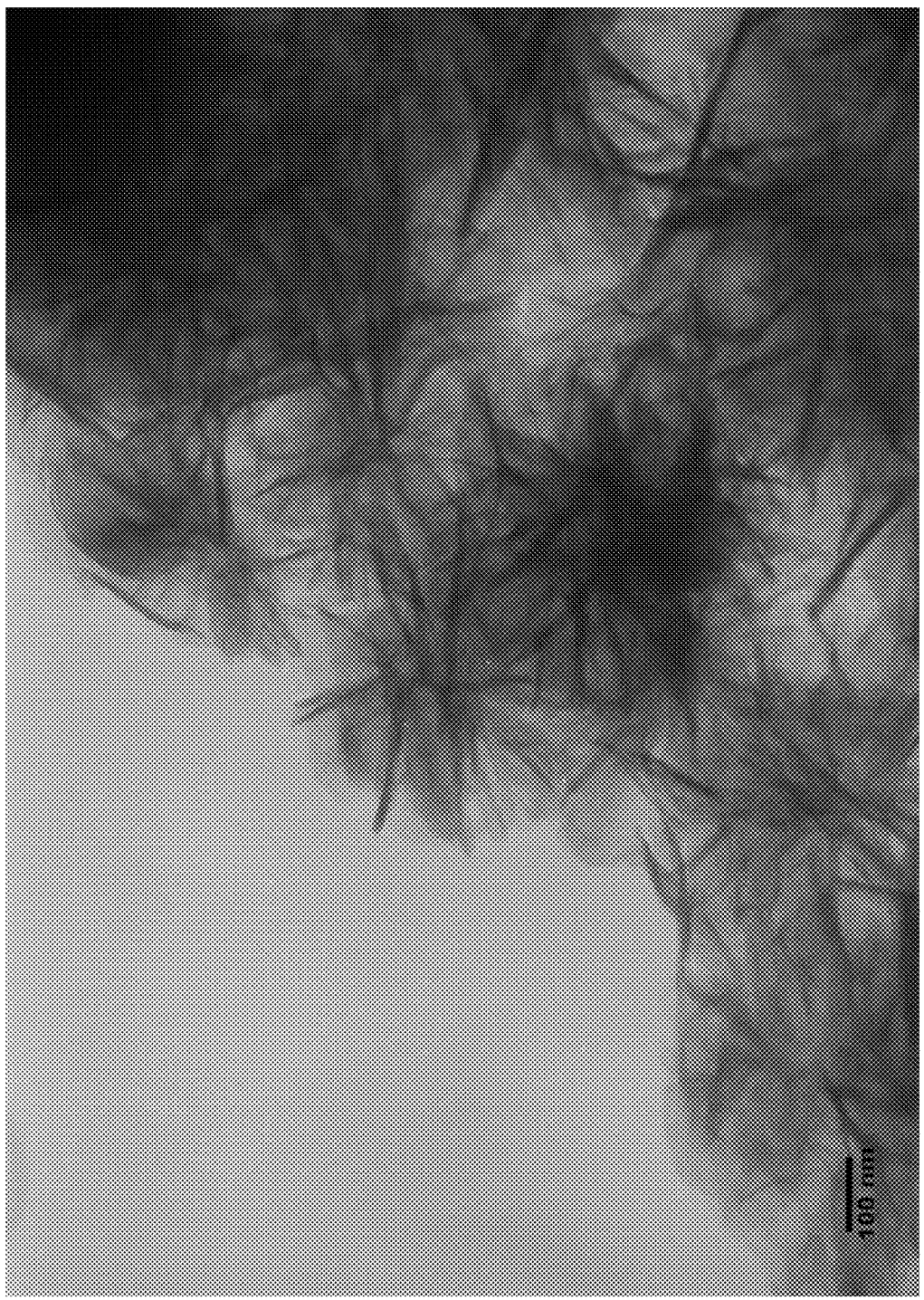
FIG. 27 depicts TEM imaging of $nMx_{12}$, where core metal surfaces are passivated by 50% steryl alcohol as the nanoscale organic layer.

FIG. 27 depicts TEM imaging of $nMx_{12}$, where core metal surfaces are passivated by 50% steryl alcohol as the nanoscale organic layer. FIG. 27 shows the core metals as dark rods having a 1-dimensional (nanowire) shape for both elemental Al and $Li_3AlH_6$ nanoparticles. The lower density of the nanoscale organic layer surrounds the rods as a passivating agent, as shown by the lower contrast. The average nanoparticle size is 100 nm.

Figure 28:
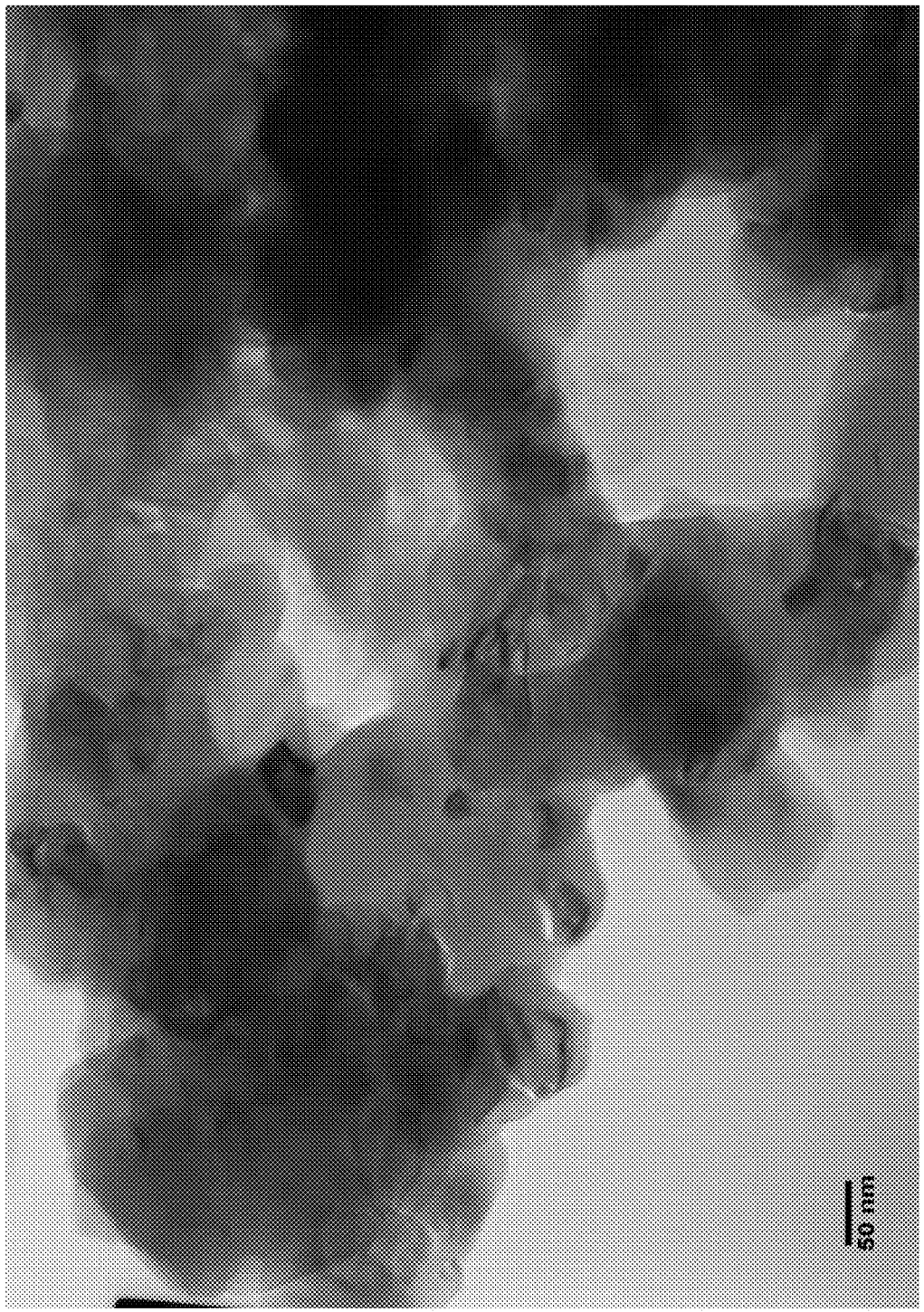
FIG. 28 depicts TEM imaging of $nMx_{13}$, where the surfaces of the core nanoparticles are passivated by 44% oleic acid as the nanoscale organic layer.

FIG. 28 depicts TEM imaging of $nMx_{13}$, where the surfaces of the core nanoparticles are passivated by 44% oleic acid as the nanoscale organic layer. FIG. 28 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 50 nm.

Figure 29:
FIG. 29 depicts TEM imaging $nMx_{16}$, where core metal nanosurfaces are passivated by a mixture of octadecanol/TEG as the nanoscale organic layer.

FIG. 29 depicts TEM imaging $nMx_{16}$, where core metal nanosurfaces are passivated by a mixture of octadecanol/ TEG as the nanoscale organic layer. FIG. 29 shows the core metals as dark rods having a 1-dimensional (nanowire) shape for both elemental Al and $Li_3AlH_6$ nanoparticles. The lower density of the (lower contrast) nanoscale organic layer surrounds the rods as a passivating agent, as shown by the lower contrast. The average nanoparticle size is 100 nm.

Figure 30:
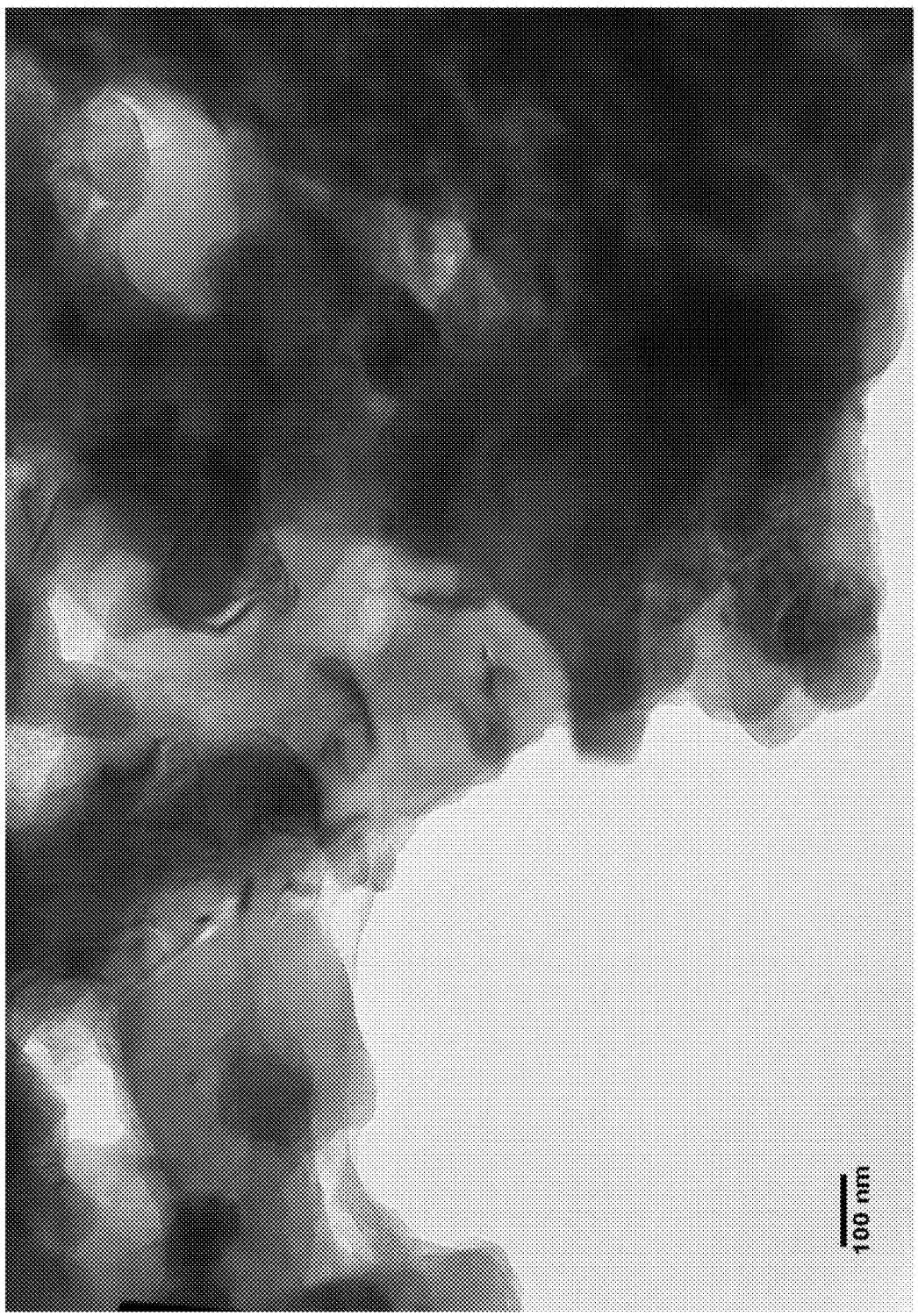
FIG. 30 depicts TEM imaging for $nMx_{19}$, where core metal nanosurfaces are passivated by PEG 600 as the nanoscale organic layer.

FIG. 30 depicts TEM imaging for $nMx_{19}$, where core metal nanosurfaces are passivated by PEG 600 as the nanoscale organic layer. FIG. 30 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 100 nm.

Figure 31:
FIG. 31 depicts TEM imaging for $nMx_{20}$, where core metal nanosurfaces are passivated by TEG as the nanoscale organic layer.

FIG. 31 depicts TEM imaging for $nMx_{20}$, where core metal nanosurfaces are passivated by TEG as the nanoscale organic layer. FIG. 31 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 100 nm.

nMx and its various uses as an explosive enhancer within an explosive train are further discussed below.

nMx as an Explosive Enhancer

The present invention is the first use of nMx as an explosive enhancer. It is an embodiment of the present invention to integrate the nano-enhanced explosive, being an admixture of any iteration of $nMx_{12}$-$nMx_{20}$ and a secondary high explosive, within in-line elements along a munition's explosive train. nMx acts as both fuel and oxidizer, or may react with an external oxidizer, rendering a release of self-sustained heat energy and hydrogen gas [$H_2(g)$] that fully participates in the detonation and explosion process of explosive materials. The nMx enhancer increases propagation speed of shockwaves through a chemical explosive and raises the temperature (Q) and pressure (V) of newly formed hot gases to create a more effective blast, where Explosive power=Q×V. It is important to note that the organics which passivte $nMx_{19}$ and $nMx_{20}$ are functionally equivalent and separate from the organics that passive $nMx_{12}$-$nMx_{18}$. However, $nMx_{12}$-$nMx_{20}$ may all impart energy to the detonation process when formulated with a secondary high explosive.

nMx Heats of Formation & Calculated Densities nMx is a highly energetic nanocomposite. It's ability to act as an explosive enhancer is based on the ability of the nanocomposite to lend energy to an explosive's detonation and explosion process. From Table 9, nMx composites have very high combustion enthalpies (in the range of −24 kJ/g to −38 kJ/g), significantly exceeding that of other aluminum-containing nanomaterials which typically have maximum theoretical combustion enthalpies of −30.9 kJ/g. All nMx materials have very high burn rates in oxygen. The gravimetric heat of combustion for nMx materials varies from ~−28 kJ/g ($nMx_{20}$) to −39 kJ/g ($nMx_{12}$). Metallized combustibles are typically in the range of from about −25 kJ/g to about −31 kJ/g.

TABLE 9

Measured & Theoretical ΔH° values for the family of nMx nanocomposites.

| nMx Iteration | Measured ΔH° | Theoretical ΔH° | Nanoscale Organic Layer |
|---|---|---|---|
| $nMx_{11}$ | −24 kJ/g | −40 kJ/g | epoxydecene + alkadiene |
| $nMx_{12}$ | −38 kJ/g | −39 kJ/g | octadecanol |
| $nMx_{13}$ | −35 kJ/g | −37 kJ/g | oleic acid |
| $nMx_{16}$ | −29 kJ/g | −34 kJ/g | Octadecanol/tetraethylene glycol |
| $nMx_{19}$ | −31 kJ/g | −31 kJ/g | PEG (Mn = 6000 (55% by weight of PEG mixture) and 600 (20% by weight of PEG mixture) |
| $nMx_{20}$ | −30 kJ/g | −30 kJ/g | Tetraethylene glycol |

Table 10 reports calculated densities for $nMx_{12}$, $nMx_{19}$, and $nMx_{20}$. These densities consider both $Li_3AlH_6$ and elemental Al nanoparticles and some measure of the organic passivation layer. However, these densities will change based on the faction of organic layer used to passivate both core metals

TABLE 10

The calculated densities for $nMx_{12}$, $nMx_{19}$, and $nMx_{20}$.

| nMx Iteration | Calculated Density (g/cm³) |
|---|---|
| $nMx_{12}$ | 1.76 g/cm³ |
| $nMx_{19}$ | 1.76 g/cm³ |
| $nMx_{20}$ | 1.50 g/cm³ |

Making the Nano-Enhanced Explosive

The nano-enhanced explosive of can be pressed, mixed, or formulated by well-known methods in the art of explosives. It is an embodiment of the present invention wherein $nMx_{12}$-$nMx_{20}$ are in powder form for mixing with a secondary high explosive by traditional means, a non-limiting example being a slurry cast for any one of $nMx_{12}$-$nMx_{20}$ with a secondary high explosive in an appropriate solvent. Other similar methods to slurry casting may include without limitation: spray drying, emulsions, and extrusions.

One can also make the nano-enhanced explosive by directly pressing a mixture of nMx and a secondary high explosive, or optionally an epoxide binder (or another appropriate binder), into a pellet. Other pressing methods may include without limitation: unidirectional pressing, double action pressing, or incremental pressing.

Melt casting is also another method known within the art for formulating a nano-enhanced explosive. Here, a secondary high explosive is slowly heated to its melting point and powders of nMx are then slowly added thereto and carefully mixed by an appropriate machine. The resulting melt is optionally loaded and transferred into a detonation mold for use within an explosive train. Other melt methods may include without limitation: cast/cure, normal casting, vibration/sedimentation casting, squeeze or pressure casting.

The listed methods for making the nano-enhanced explosive are non-limiting, but all include $nMx_{12}$-$nMx_{20}$ as a nano-enhancer being admixed with a secondary high explosive in concentrations ranges from about 0.5% up to about 50% by total weight of the formulation and the secondary high explosive being from about 25% to 99.5% by total weight of the formulation.

It is a preferred embodiment of the present invention wherein any of $nMx_{12}$-$nMx_{20}$ is admixed with at least one secondary high explosive including but not limited to: 5-nitro triazol-3-one (NTO); 2,4,6-trinitrotoluene (TNT); tetranitro-dibenzo-1,3a,4,4a-tetraazapentalene (TACOT); cyclotetramethylene-tetranitramine; tetrahexamine tetranitramine; 1,3,5,7-tetranitro-1,3,5,7-tetrazocane (HMX); 2,2',4,4',6,6'-hexanitrostilbene (HNS); 1,3-diamino-2,4,6-trinitrobenzene (DATB); 1,3,5-triamino-2,4,6-trinitrobenzene (TATB); 1,3,5-trinitrobenzene (TNB); 3,5-dinitro-2,6-bis-picrylamino pyridine (PYX); 2,4-dinitrotoluene; 2,6-dinitrotoluene; nitroglycerine (NG); picrate (NQ); 2,4,6-trinitrophenol; ethylene glycol dinitrate (EGDN); ethylenedinitramine (EDNA); diethylene glycol dinitrate (DEGDN); Semtex; Pentolite; trimethylol ethyl trinitrate (TMETN); 1,3,5,-trinitrobenzene (TNB); tetryl, hexahydro-1,3,5-trinitro-1,3,5-triazine (RDX); T4 1,3,5-trinitro-1,3,5-triazacyclohexane; cyclotrimethylenetrinitramine; pentaerythritol tetranitrate (PETN); triethylene glycol dinitrate (TEGDN); 2,2,2-trinitroethyl-4,4,4-trinitrobutyrate (TNETB); methylamine nitrate; nitrocellulose; N3,N3,N'3,N'3,N7,N7,N'7,N'7-octafluoro-1,5-dinitro-1,5 diazocane-3,3,7,7-tetraamine (HNFX); CL-20 (HNIW); Hexanitrohexaazaisowurtzitane, nitroguanidine; hexanitrostilbene, 2,2-dinitroethene-1,1-diamin (FOX-7); dinitrourea, and picric acid; AFX 757; CHEMCORE (26% TNT/37% AP/37% AL); PBXN-111 (20% RDX/43% AP/25% AL12% wax binder); PWX MOD 19 (25% RDX/30% AP/33% AL/12% wax binder); PBXN-110 (88% HMX/12% HTPB binder); nitramine explosive; ammonium nitrate; potassium nitrate; barium nitrate; lead nitrate; potassium perchlorate; ammonium perchlorate; NQ (nitroguanidine); Cyclonite; octahydro-1,3,5,7-tetranitro-1,3,5,7-tetrazocane; Composition B (RDX-cyclotrimethylenetrinitramine and TNT-2,4,6-trinitrotoluene); Tritonal (TNT and aluminum powder); cyclotols (RDX and TNT in ratios of 75:25 to 60:40); Amatol (ammonium nitrate and TNT); Kalatol (potassium nitrate and TNT); Baratol (barium nitrate and TNT); Pentolite (PETN-pentaerythritol tetranitrate and TNT); and Baronal (barium nitrate, aluminum and TNT). The secondary high explosive may also include without limitation a plastic or putty explosive, which is hand malleable, such as composition 4, or C4, which includes approximately 91% 1,3,5-trinitroperhydro-1,3,5-triazine; 6% plasticizer (e.g. diethylhexyl or dioctyl sebacate) and 2% plastic binder (e.g. polyisobutylene) by weight, or in contrast a polymer bonded explosive such as LX-14 (96% 1,3,5,7-tetranitro-1,3,5,7-tetrazocane and 4% polymer binders (e.g. estane & 5702-F1).

It is a preferred embodiment of the present invention wherein optional additives are mixed with the nano-enhanced explosive to improve the adhesive strength and flexibility of the formulation. Non-limiting additives may include: processing aids, binders, surfactants, thickeners, defoaming agents, energetic polymers, inert polymers, fluoropolymers, thermal stabilizers, plasticizers, and the like.

Although we see evidence that the nanocomposite's nanoscale organic layer acts as an initial binder for the nano-enhanced explosive, it is a preferred embodiment of the present invention wherein an optional binder may be added to the formulation from about 0.5% to about 20% by total weight of the same. The optional binder may include without limitation: waxes; PVP; polyethylene glycol [PEG]; hydroxypropylmethyl cellulose; ESTANE; HYTEMP; methylcellulose; cellulose acetate; cellulose ethers; CAB (cellulose acetate butyrate); ethylene vinyl acetate; ethylene vinyl alcohol; polystyrene plastic; silicone rubber; polyether; epoxides; nitrocellulose; polyurethane rubber; carboxy or hydroxyl-terminated polybutadiene [HTPB—rubber]; polyfluorocarbons; Viton fluoropolymer elastomeror; bis 2,2-dinitropropyl acetate [BDNPA]; bis 2,2-dinitropropyl formal [BDNPA/f]; polyesters; polyfluorocarbons; polyvinyl alcohol; polyvinyl alcohol/polyvinyl ester copolymers; polyacrylates; casein; polyvinyl alcohol/polyvinyl pyrrolidone copolymers; polyvinyl; pyrrolidone; substituted polyvinyl pyrrolidone; styrene-maleic anhydride copolymers; styrene-acrylic copolymers; epichlorohydrin-based polymers; or oxetane-based polymers; PBAN (butadiene-acrylonitrile-acrylic acid terpolymer); PPG (polypropylene glycol); polymethacrylates; and any combination thereof.

It is a preferred embodiment of the present invention wherein an optional oxidizer maybe added to the nano-enhanced explosive from about 1.0% to about 50% by total weight of the formulation. The optional oxidizer may include without limitation: ammonium perchlorate; ammonium nitrate; lithium nitrate; barium chlorate; barium nitrate; cesium nitrate; calcium nitrate; copper nitrate; hexanitroethane; potassium chlorate; potassium nitrate; sodium nitrate; rubidium nitrate; sulfur; chromium trichloride; molybdenum disulfide; iron trifluoride; potassium perchlorate; ammonium dinitramide (ADN); sodium nitrate (SN); potassium nitrate; ammonium nitrate; 2,4,6-trinitro-1,3,5-benzenetriamine (TATB); dinitrotoluene (DNT); DNAN; or any combination thereof.

It is a preferred embodiment of the present invention wherein an optional plasticizer may be added to the nano-enhanced explosive from about 0.5% to about 5.0% by total weight of the formulation. The optional plasticizer may include without limitation: DOA (dioctyladipate or (2-ethylhexyl)adipate); IDP (isodecylperlargonate); DOP (dioctylphthalate); DOM (dioctylmaleate); DBP (dibutylphthalate); oleyl nitrile; bis-dinitropropyl acetyl and bis-dinitropropyl formal (BDNPA/F); dioctyl sebecate (DOS); glycidyl azide polymer (GAP); or any combination thereof.

Pellet Pressing of Nano-Enhanced Explosive

For pellet pressing, the non-limiting example follows. An 8:1 ratio of a mixture of a dry secondary explosive is admixed with either $nMx_{12}$-$nMx_{20}$ in a container. However, the concentration of either enhancer with the secondary high explosive can be from about 0.5%/wt to about 99.5%/wt of the total dry mixture. Gently agitate the two ingredients until there is a uniformed distribution of all ingredients in the mixture.

After which, a binder may be added to the uniformed mixture. It is a preferred embodiment of the present invention wherein the binder is Polyethylene glycol (PEG) and is added to the mixture in an amount that makes up roughly 0.5%/wt to 20%/wt of the total mixture of the two ingredients. It is an embodiment of the present invention where the binder may include without limitation waxes, PVP, polyethylene glycol [PEG], hydroxypropylmethyl cellulose, methylcellulose, cellulose acetate, cellulose ethers, ethylene vinyl acetate, polystyrene plastic, silicone rubber, polyether, epoxides, nitrocellulose, polyurethane rubber, carboxy or hydroxyl-terminated polybutadiene [rubber], polyfluorocarbons, Viton fluoropolymer elastomeror, bis 2,2-dinitropropyl acetate [BDNPA], bis 2,2-dinitropropyl formal [BDNPA/f], or any combinations, copolymers, or varying molecular weights thereof.

After adding the binder, the total blend is placed in a mold having a desired shape for the resulting enhanced explosive.

The blend is compressed in the mold to cure the mixture, where dwell times are very short, being from about a few seconds up to about 5 minutes. Pellet presses are machines that are readily known and used within the arts and are capable of compression forces that range of from about 2,000 to about 40,000 pounds per square inch gauge to cure and shape explosive mixtures, pharmaceuticals, or any differing dry materials that need to be blended and shaped into a uniformed composite. Use of the enhanced explosive, meaning further processing or detonation, is not dependent on curing time.

Also note that, the dry admixture, being the enhancer, secondary high explosive, and the optional binder, may be subjected to an extruder, where the dry mixture is mixed using an auger or Archimedes screw, placed in a hopper, and subjected to pressure for pellet pressing. nMx composites may also be admixed with pyrotechnics. In contrast to secondary high explosives, a pyrotechnic is a combustible material that produces a special effect when burned, e.g. fireworks. This class of advanced fuel produces heat, light, smoke and sound. The fuels are typically metals including aluminum, chromium, magnesium, manganese, and the like. Oxidizers include chlorates, chromates, nitrates, oxides and perchlorates. Binders may include waxes, manmade vinyls, a variety of polymers, and the like. The addition of nMx to pyrotechnics enhances the physical properties of the same.

Slurry Casting of Nano-Enhanced Explosive

The enhanced secondary high explosive can also be made via slurry casting. Here, a dispersion is created by placing any of $nMx_{12}$-$nMx_{20}$, a secondary high explosive, and a binder into a solvent bath. The solvent of the present invention may include, without limitation, ethyl ether, trichloroethane, trichlorofloromethane, benzene, toluene, xylene, naphthalene, THF, or any combinations thereof.

The dispersion is gently mixed for a time and solvent evaporated, where the resulting dry composite has all ingredients from the original dispersion. The dried composite may optionally be subjected to the same molding or casting process as described above for pellet pressing the same or used as is for explosive applications.

Melt Casting Nano-Enhanced Explosive

It is an embodiment of the present invention where the nano-enhanced explosive can be made via traditional melt casting. Here, a secondary high explosive is slowly heated to its melting point and powders of nMx is then slowly added and admixed thereto and carefully mixed by an appropriate mixer. The combination can cool until solid. After which, a binder may be added to the uniformed mixture. It is a preferred embodiment of the present invention wherein the binder is polyethylene glycol (PEG) and is added to the mixture in an amount that makes up roughly 0.5%/wt to 20%/wt of the total mixture of the two ingredients. However, other embodiments of the present invention include binders including, without limitation: waxes; PVP; polyethylene glycol [PEG]; hydroxypropylmethyl cellulose; methylcellulose; cellulose acetate butyrate [CAB]; cellulose ethers; ethylene vinyl acetate; polystyrene plastic; silicone rubber; polyether; epoxides; nitrocellulose; polyurethane rubber; carboxy or hydroxyl-terminated polybutadiene [rubber]; polyfluorocarbons; Viton fluoropolymer elastomeror; bis 2,2-dinitropropyl acetate [BDNPA]; bis 2,2-dinitropropyl formal [BDNPA/f]; polybutadienes; both carboxy- and hydroxy-terminated; polyethylene glycol; polyethers; polyesters; polyfluorocarbons; epoxides; silicone rubbers; polyvinyl alcohol; polyvinyl alcohol/polyvinyl ester copolymers; polyacrylates; casein; polyvinyl alcohol/polyvinyl pyrrolidone copolymers; polyvinyl; pyrrolidone; substituted polyvinyl pyrrolidone; ethylene-vinyl alcohol/acetate terpolymers; polyurethanes; styrene-maleic anhydride copolymers; styrene-acrylic copolymers; epichlorohydrin-based polymers; or oxetane-based polymers; or any combination thereof.

3D Printing the Nano-Enhanced Explosive

3D Printing is an application used to make custom structures within industries including: architecture, industrial design, automotive industry, aerospace industry, the military, civil engineering, medical industries, biotech, and many other fields. Selective Laser Sintering (SLS®), Fused Deposition Modeling (FDM)™, the various forms of Stereolithography, and Continuous Liquid Interface Production are all forms of 3D Printing that include a computer associated with a 3D printer that scans a file format exported from a 3D modeling program that contains spatial points for creating unique shapes for in-line elements that can be integrated into an explosive train.

It is an embodiment of the present invention wherein any one of $nMx_{12}$-$nMx_{20}$, may be used to enhance a secondary high explosive, and then is associated with UV curable photopolymers, such as, without limitation, acrylates; monomers; oligomers; bismaleimides; thermosetting epoxies; urethanes; polyesters; silicones; and their combinations and blends for 3D printing in-line elements for an explosive train requiring custom shapes that are embedded with our nano-enhanced explosive.

It is an embodiment of the present invention wherein the nano-enhanced explosive is embedded in a bulk thermoplastic matrix, being a base material or feed stock for 3D printing in-line elements of an explosive train. The base material is compatible for 3D Printing, extrusion moulding, and injection moulding, where any of these processes shape, layer, or print the base material into a final construct that is endowed with nMx's unique burn characteristics and a secondary high explosive. The types of thermoplastics used may include without limitation thermoplastic polyurethane, styrene block-copolymers, thermoplastic silicone elastomer, aliphatic or semi-aromatic polyamides, thermoplastic vulcanisate, acrylonitrile butadiene styrene, polylactic acid, polyvinyl alcohol, polycarbonate, polylactic acid, acrylonitrile-butadiene-styrene (ABS), polylactic acid, polymethylmethacrylate, polyethylene, polypropylene, polystyrene, nylon, polycarbonate, polyvinyl chloride, Teflon, or any combination thereof.

It is an embodiment of the present invention where the base material imbedded with the nano-enhanced explosive is compatible with a 3D printer capable of fuse deposition modeling (FDM) to make custom in-line elements for an explosive train. Although the disclosed method uses FDM, the nano-explosive enhanced base material should be compatible with 3D printers that employ Selective Laser Sintering (SLS®), Stereolithography, Continuous Liquid Interface Production, powder bed printing, and/or Inkjet Head printing. Our explosive in a base material may be layered via other methods known within the arts, including but not limited to, extrusion deposition, binding of granular materials, lamination, or photo polymerixation.

The digital instructions for making in-line elements for an explosive train can be stored in memory or the processor of a computer, and the computer program for digitally rendering these custom explosive parts are of the type typically used for rapid prototyping or manufacturing instructions, including but not limited to: 3DMLW (3D Markup Language for Web), Dassault Systemes graphic representation, Virtual Architecture CAD, Ashlar-Vellum Argon—3D Modeling, ArtCAM model, BRL-CAD Geometry, Solidedge Assembly, Pro/ENGINEER Assembly, Data Design System DDS-CAD, CopyCAD Curves, CopyCAD Model, CopyCAD Session, CadStd, CATIA V5 Drawing document, CATIA V5 Part document, CATIA V5 Assembly document, CATIA V5 Manufacturing document, AutoCAD and Open Design Alliance applications, Solidedge Draft, MicroStation design file, Delcam Geometry, Delcam Machining Triangles, ASCII Drawing Interchange file format—AutoCAD, VariCAD drawing file, Wilcom—Wilcom ES Designer Embroidery, Agtek format, EXCELLON, FeatureCAM, FormZ, BRL-CAD, GERBER, T-FLEX CAD, GRAITEC, Auto CAD, Solidworks, Autodesk Inventor, Fusion 3D, Rhino 3D, Alias, Pro-Engineer Sketchup, and the like.

The computer of the present invention includes one or more devices having one or more processors capable of communicating with the other components of the system. The computer typically receives many inputs and outputs for communicating information externally to a 3D printing system. Non-limiting examples of inputs and outputs may include: a keyboard, a mouse, a trackball, a joystick, a touchpad, and/or a microphone, a CRT monitor, and/or an LCD display panel.

Communication may either be a wireless frequency signal or a direct wired communication signal that sends instructions to a 3D printer for printing an nMx fuel grain. The processor can execute computer programs, e.g. 3D modeling programs, with instructions for printing an nMx fuel grain stored in a computer-readable medium or memory such as a random-access memory ("RAM"), read only memory ("ROM"), and/or a removable storage device. The computer should have a basic operating system, such as MS Windows, Linux, Mac OS, or the like. The fuel grain instructions may comprise code from any computer-programming language, including, C, C++, C#, Visual Basic, Java, Python, Perl, and JavaScript.

Suitable processors may comprise a microprocessor, an ASIC, and state machine. Example processors can be those provided by Intel Corporation, AMD Corporation, and Motorola Corporation. Such processors comprise, or may be in communication with media, for example computer-readable media, which stores instructions that, when executed by the processor, cause the processor to perform the elements described herein.

Within a 3D modeling program, points and line segments in a Cartesian plane, e.g. an [x, y, z,] Cartesian system, are used as predetermined spatial instructions or can be drawn free hand to create virtually solid models of in-line elements of an explosive train. The construct will have weight, density, and a center of gravity in either case. The custom shaped explosive part imbedded with the present invention in its final form will be tangible and can be readily used in an explosive train as either a fuse, initiator, booster, or as the main charge.

Any generic program should be capable of sweeping, extruding, revolving, lofting, slicing, sculpting of a surface, or converting connected points forming 2D parametric contours and straight lines into any imaginable 3D shape. Fused Deposition Modeling (FDM)TM includes a computer associated with a 3D printer that slices a file format exported from a 3D modeling program. The sliced program creates a tool path for heated nozzles. The data is then sent to another part of the printer, which then manufactures the solid fuel grain layer by layer on a build platform.

nMx's Compatibility with Thermoplastics

It is an aspect of the present invention wherein the nano-enhanced explosive may either be introduced into a thermoplastic polymer either in a solvent based reaction or during the hot melt delivery of the thermoplastic to a printing platform during the layering process as executed by a 3D printer. Either process creates a base material that has explosive properties suitable for creating custom shapes for in-line elements of an explosive train.

To ensure that the nano-enhanced explosive is well suited for 3D-Printing, nMx's compatibility with an ABS polymer has been produced. The formulation consists of 20% m/m nMx in 80% m/m ABS. A non-limiting example of the reaction is as follows. Once the nMx particles are synthesized and acquired as above, a Schlenk line connected to a vacuum and an Argon gas line is used to produce an Acrylonitrile-Butadiene-Styrene (ABS) polymer embedded with nMx powder. However, the use of this polymer is non-limiting and may be replaced by any suitable polymer to form an nMx based matrices. The nMx powder is a defined as a nanocomposite being $Li_3AlH_6$ nanoparticles, elemental Al nanoparticles, an amount of Ti metal, and a nanoscale organic layer.

A vacuum trap is connected to the Schlenk line to trap any solvent removed from the reaction mixture dispersion. The Schlenk line is connected to two bubblers on either side to indicate Argon gas flow in and out of the Schlenk line. A needle valve is used to control the flow of Argon gas within the apparatus, and the Ar gas is provided by a compressed tank installed with a regulator. Vacuum hoses connected to all the ports on the Schlenk line and the connections within the general setup. To contain any dispersions and reaction mixtures, air-free glass flasks are used. These flasks contain a stopcock valve to expose its contents to either vacuum or Argon gas. Luer lock syringes are used to transfer and mix any dispersions.

4 g of ABS is dissolved in ~30 mL of distilled THF within an air-free flask. A magnetic stirrer is included, and the stirring is used to agitate and dissolve the ABS. Eventually, the ABS is fully dissolved in ~30 minutes. In another air-free flask, 1 g of the organic polymer capped nMx powder is dissolved in 60 mL of distilled THF for the 20% nMx formulation. The organic polymer capped nMx powder is not very dispersible, but agitation is able to suspend the powder. A stirrer is included into the flask to stir and agitate the suspension.

With a Luer lock syringe, the ABS solution is drawn and injected into the organic polymer capped nMx dispersion while stirring. The combined dispersion of ABS and organic polymer capped nMx powder is left to stir for ~30 minutes. Then, it was vacuumed at room temperature to remove the THF solvent. Stirring is still present while vacuuming to agitate and improve the efficiency of the removal. After the solvent is removed, a plastic sheet or film of ABS with embedded organic polymer capped nMx is produced. It is a dark black or gray sheet that sticks to the glass. It can be removed with a spatula. The nMx powder is uniformly distributed in the thermoplastic, where ratios for the resulting composition of matter [$Li_3AlH_6$:Al:Ti:NSOL]:ABS exist from about 3:1 to about 1:100.

The resulting mixture of the nanocomposite and the ABS thermoplastic polymer as a base material suitable for 3D printing opens the path to incorporating secondary high explosives into these thermoplastics to create custom in-line elements for an explosive train. Alternatively, the base material may be layered when melted beads of the thermoplastic polymer meet nano-enhanced explosive in a dual heated nozzle configuration for Fused Deposition Modeling™. Alternatively, the base material maybe formed as a bead containing nMx, the thermoplastic polymer, the secondary high explosive, and other additives and then used as base polymer or feed stock for a 3D printer for printing in-line elements of an explosive train.

Additive manufacturing of the nano-enhanced secondary high explosive may include, without limitation, the nano-enhanced explosive being added to a liquid photopolymer resin and agitated from about 0.5 hours to about 24 hours at room temperature with a magnetic stirrer to ensure uniform distribution of the enhanced explosive throughout the photopolymer's volume. The mixture may then be loaded into an SLA 3D printer. Under UV light, the photopolymer may solidify through a photopolymerization reaction to form the desired 3D object defined by computer instructions creating a construct that has a structure and weight having the nMx enhanced explosive within the UV cured matrix.

A typical method for making a UV curable nano-enhanced secondary explosive includes admixing the nano-composite and the explosive, as detailed above in either the pellet pressing or the slurry casting methods, with a photopolymer resin in its near liquid or fluid state for use in stereolithography (SLA) or Digital Light Processing (DLP) technology. SLA uses a laser to trace out the cross-sections of the model, being 3D print instructions for a construct. Each layer is deposited in a continuous stream of a base UV curable resin. The laser essentially "draws" the layer to be cured at UV frequencies. With DLP, a UV projector sits beneath a photopolymer reservoir and selects image layer for which to cure, which is ideal for 2D imaging.

The UV cured materials, having the nano-enhanced explosive, are suited for making parts integral to bomb casings. Bomb casings are frequently made of metal or metal-alloy complexes, plastics (thermoplastic or thermoset), UV-curable materials, and adhesive resins (single or multi-ingredient). These casings react as they are projected away from the reaction epicenter, releasing their energy at a certain radius or stimuli away from the epicenter. One such method would involve mixing nano-enhanced explosive within a workable material (plastic or resin) prior to allowing the material to set or cure. The material casing would then harden with energy-laden explosive encased within. A detonation, shock wave, or combustion front would then release the energy in application from the bomb casing.

Burn Rates, Shockwaves, Blast, & Sensitivity

When secondary high explosives are enhanced, fundamental characteristics are measured to validate improvements thereof. These characteristics may include without limitation: measurements of shockwave (detonation) velocity, density, heat of formation, gas evolution for metal pushing, detonation pressure, sensitivity, explosive power (blast), and the like. Because nMx may act as both fuel and oxidizer, or react with and external oxidizer, a release of self-sustained heat energy and $H_2(g)$ fully participates in the detonation and explosion process of an explosive material. We submit for your approval evidence of the full participation of nMx in the detonation process of a secondary high explosive. However, we are currently testing our nano-enhanced explosive for Gurney constants and sensitivity data, which we will possibly address in subsequent patent filings.

Shockwave Velocity

Figures 32A, 32B:
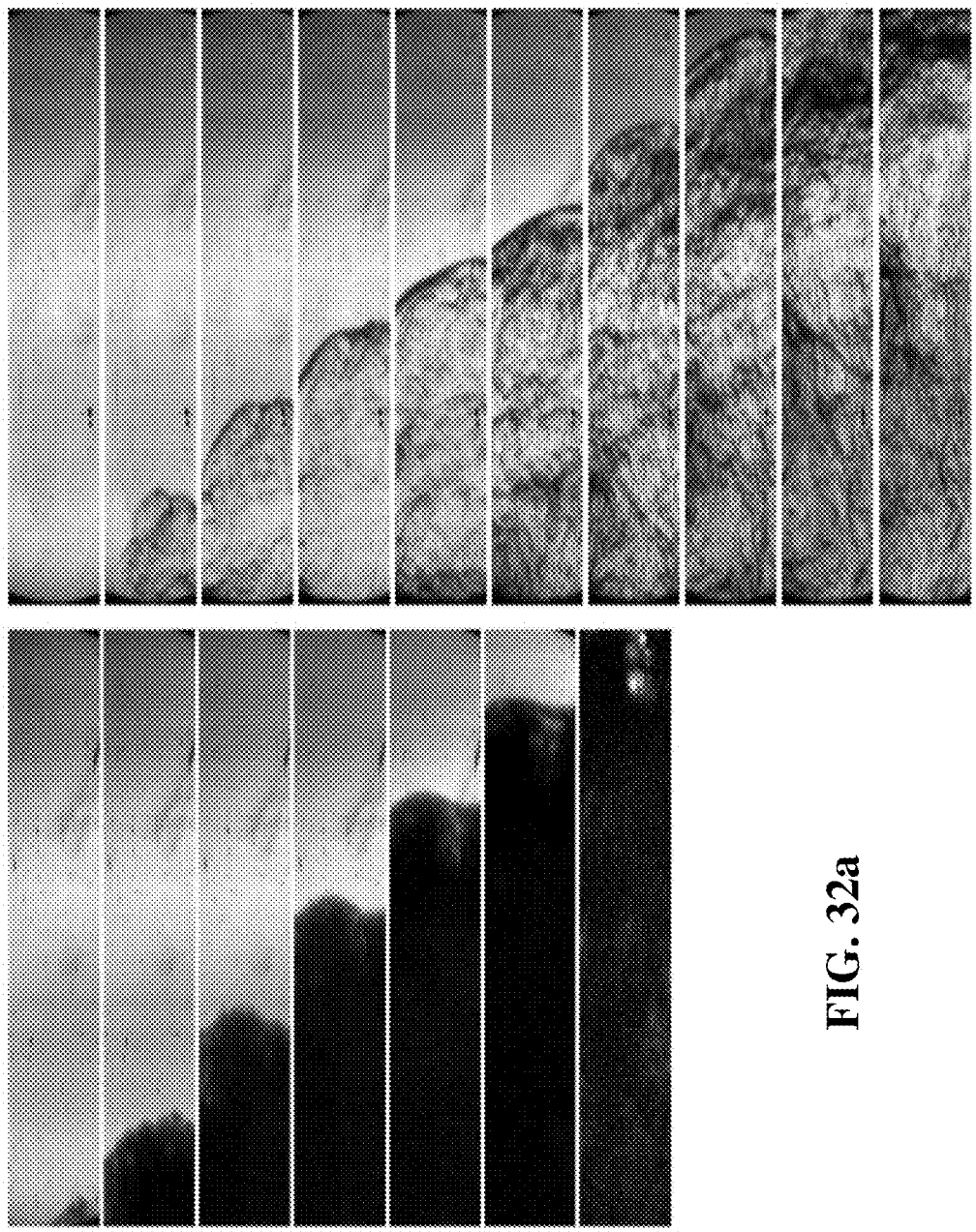
FIG. 32a and FIG. 32b display a relative comparison of shockwave velocities of secondary high explosive PETN with and without $nMx_{20}$.

FIG. 32a and FIG. 32b display a relative comparison of shockwave velocities of secondary high explosive PETN with and without $nMx_{20}$ [standard] respectively. Schlieren photography is a well-known technique in the art to capture images that show the flow of fluids via changes in the air. The shockwave images are generated from roughly 3 g pellets for each of the nano-enhanced and standard explosive. The Schlieren imaging equipment was set at 80K Frames/sec for each of FIGS. 32a and 32b. Each pellet is initiated with RP-2 detonators in a Tunnel for High-speed Optical Research (THOR). Pressure gauges in THOR record time-resolved pressure and provide a secondary measurement of shock wave speed.

FIG. 32a [right] displays shockwave propagation through an enhanced admixture of $nMx_{20}$ and the explosive PETN. FIG. 32b [left] displays a shockwave propagating only through explosive PETN. The enhanced explosive of FIG. 32a gives an increased shock velocity relative to the PETN of FIG. 32b.

Shadow interfereometry results show the difference in arrival times of shockwaves at the detection window between the initial blast of the nano-enhanced explosive and the standard PETN. When extrapolated, the data give a 20% increase in PETN detonation velocity. Based on this data, nMx added to PETN formulations increase the performance of PETN based explosives for various explosive applications.

Linear Burn Rates of nMx

U.S. Pat. No. 3,590,739 to Per-Anders discloses the use of a PETN detonation cord. Per-Anders' cord includes a tube with an outer flexible material. At either ends of the tube are detonation caps, one electrical and the other ignitable. The inner walls of the tube include an explosive material, PETN, and the center of the tube has a hollow or shaped passage way for detonation wave propagation. There are inserts for the hollow tube that can take may shapes and be coated with an explosive material. It is an embodiment of the present invention wherein the nano-enhanced explosive can be integrated at various points within the explosive train, specifically as a fuse for detonating a main charge. And, as such, U.S. Pat. No. 3,590,739 to Per-Anders is herein incorporated by reference for the use of the nano-enhanced explosive with a detonation cord or fuse.

FIG. 3 depicts a detonation cord i having a fuse that includes a packed nano-enhanced explosive, nMx+PETN j, as the ignitable material. The linear burn rates for nMx in Table 11 indicate that any heat energy added to the PETN blasts within the fuse happen after the initial small-scale explosions of the PETN, which has a detonation velocity of 8,400 msec.

Table 11 presents linear burn rates taken at atmospheric pressure for pure nMx powders and Novacentrix 80 nm commercial grade aluminum powder in mm/sec. This data indicates that nMx displays an extremely high linear burn rate as compared to the state of the art, being Novacentrix 80 nm aluminum powder. Note that, $nMx_{12}$ HC and $nMx_{20}$ HC [High Core] designate a balance between the nanoscale organic layer and the core metal nanoparticles of ⅓ and ⅔ by weight respectively. Reducing a portion of the nanoscale organic layer allows the combustion reaction to access the cores quicker for faster burn rates. This ambient burn shows that the nMx HC powders display significantly better burn rates against the standard aluminum powders. It is an embodiment of the present invention to tune the fraction of the nanoscale organic layer about the surfaces of both core metal nanoparticles to be about 5.0% to about 75% by weight to modify the burn rate characteristics of an nMx composite. The compared shockwave velocity data shown in FIGS. 32a & 32b is evidence that nMx participates in the detonation process for PETN, a common secondary high explosive for detonation cords, and, as such, is easily integrated into fuses for explosive trains.

TABLE 11

Linear burn rates in atmospheric pressure for pure nMx powders and commercial comparison powders.

| Burning Material | Burn Rate (mm/sec) |
| --- | --- |
| Novacentrix 80 nm Aluminum Powder | 5 |
| $nMx_{12}$ | 4 |
| $nMx_{16}$ | 6 |
| $nMx_{20}$ | 110 |
| $nMx_{12}$ HC | 14 |
| $nMx_{20}$ HC | 100 |

Log Blast Enhancement Vs. Fraction Metal Added

Figure 33:
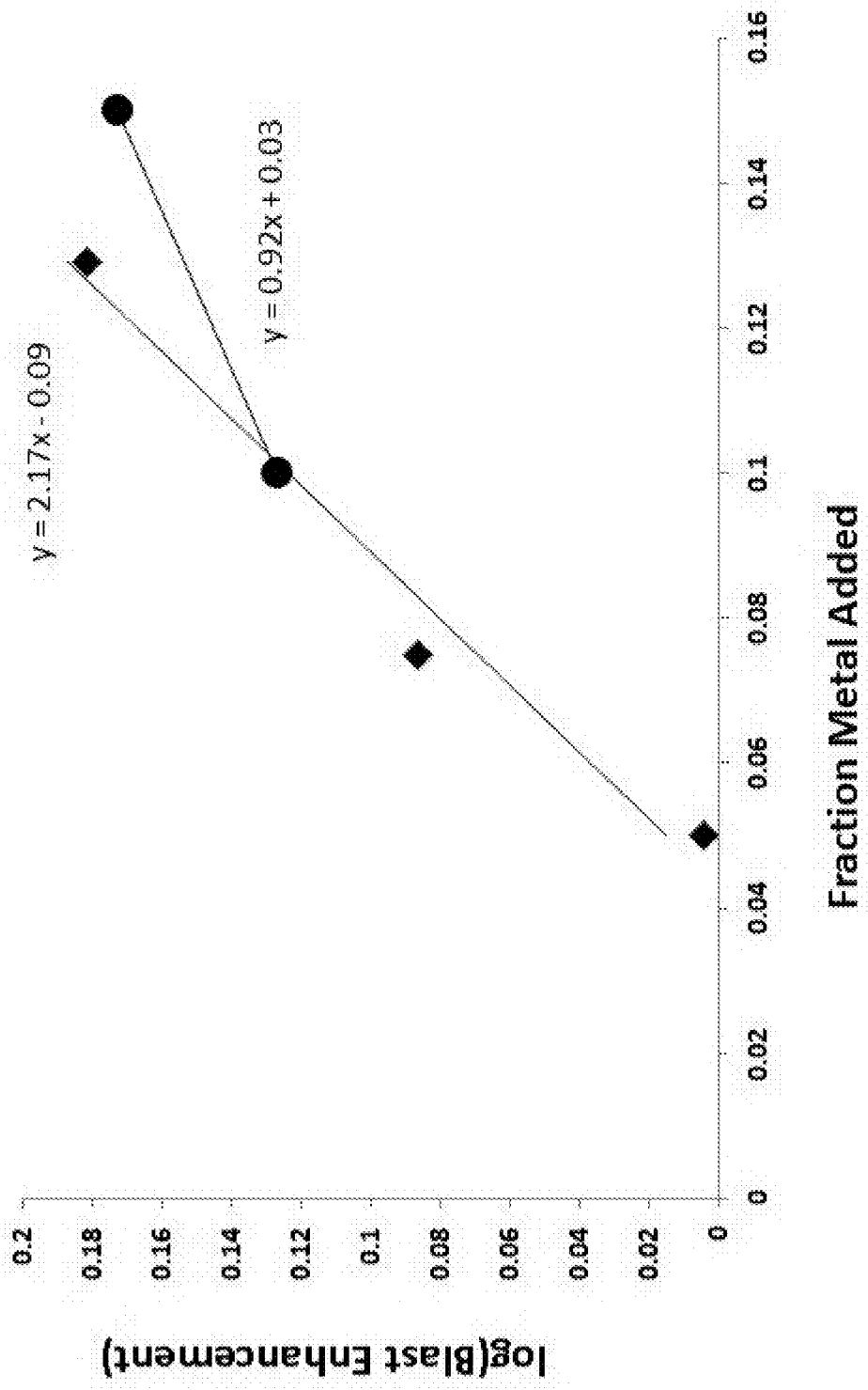
FIG. 33 depicts blasting data for the present invention, wherein the y-axis presents log of enhancement of blast as a function of the amount of metal added to HMX.

Because nMx may act as both fuel and oxidizer, or can react with and external oxidizer, a release of self-sustained heat energy and $H_2(g)$ fully participates in the detonation and explosion process of an explosive material. FIG. 33 depicts a graph of experimental blast energies for both a nano-enhanced explosive (♦) and an H5-Al enhanced explosive (●). HMX is used as the secondary high explosive for all data points on FIG. 33. For each (♦) data point, $nMx_{16}$ was used as the nano-enhancer. The x-axis denotes the fraction of core metal for either H5-Al or $nMx_{16}$ pellet pressed with an amount of HMX. The y-axis denotes the log of the blast enhancement being: blast enhancement=blast of metal enhanced explosive÷blast of pure HMX. Zero on the y-axis represents a pure HMX blast, i.e. neither enhancer is mixed with the secondary high explosive.

The log blast data of FIG. 33 was generated by measuring blasts from five nano-enhanced explosive pellets (nMx+ HMX), where the pellets were made by the above pellet pressing method. From FIG. 34, five nano-enhanced pressed pellets 40 are stacked one on the other and taped together by masking tape, or one can easily use Cyanoacrylate glue to stack the pellets 40. The nano-enhanced pellets 40 are placed on a polymer stand 41, a non-limiting example being LDPE, that can accommodate an RP-81 detonator 42 having a small (e.g. 0.03) countersink to better center the explosives 40. The RP-81 detonator 42 is well known within the art and is initiated by an electrical pulse 43.

Figure 34:
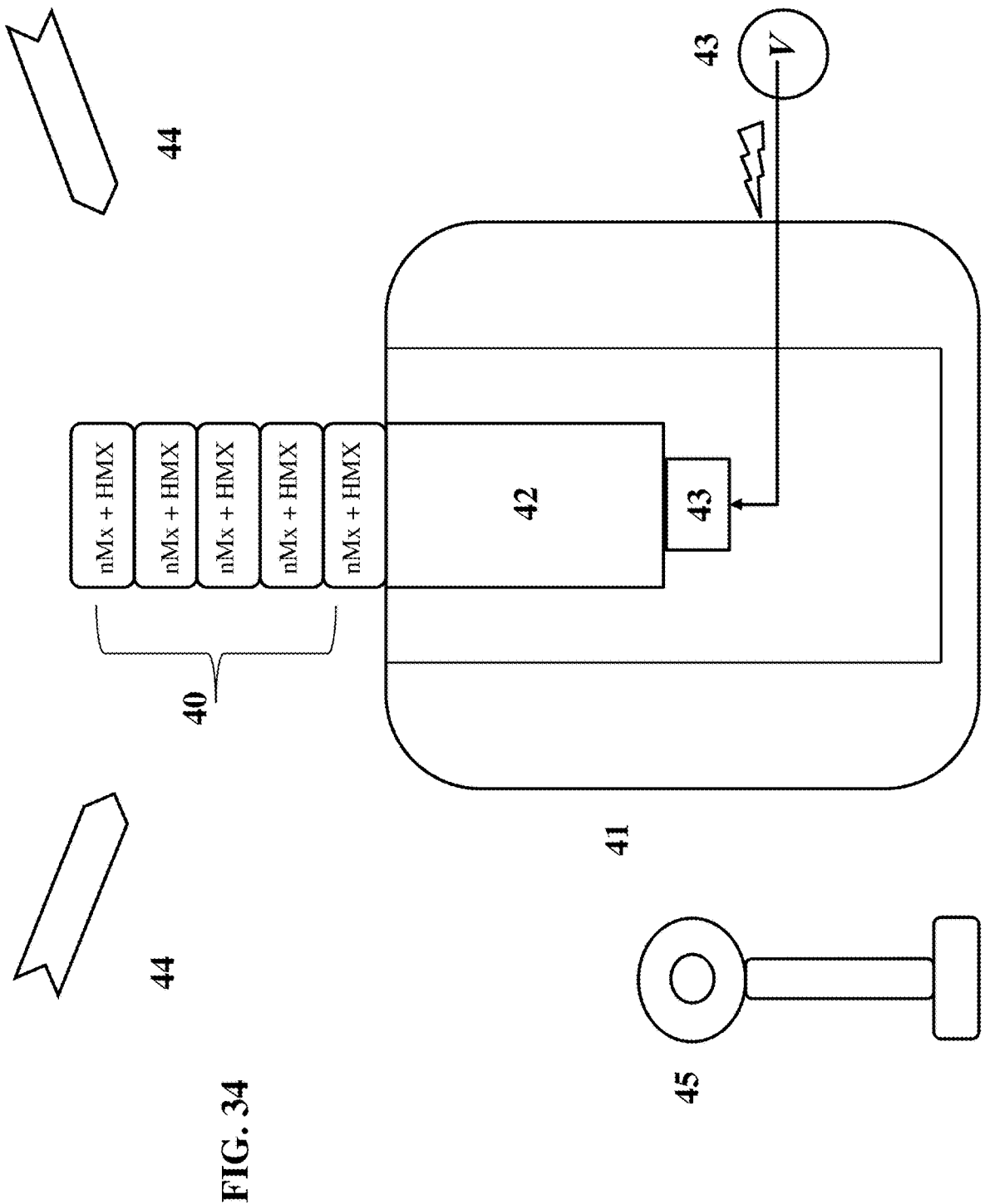
FIG. 34 is a schematic of our set up to measure the log blast of nano-enhanced HMX.

FIG. 34 shows two pencil probes 44, which are also well known within the art, are angled from chamber corners. The probes 44 are designed to measure explosive shockwaves in air. Each probe 44, as sold by PCB Pizeotronics, typically contains quartzing sensing materials and micro-electronics to capture energy profiles of sonic level sound waves. The nominal distance is about 24" from the nano-enhanced explosives 40 to the tip of each probe's sensor 44. However, one could shift either pencil probe 44 by about 2" each way. So, for example, one pencil probe 44 could be at 22" and the other at 26" to get some scaling. Or, each pencil probe 44 can be at the same distance from the nano-enhanced explosives 40 to get two redundant measures from the same test. As a backup to the pencil probes 44, we also use a pair of floor mounted probes 45, being lollypop style mounted piezoresistive gauges. For simplicity only one floor mounted probe 45 is shown. Both floor probes 45 give short term and long-term data, though the blast is not as well resolved as the pencil probes.

Each pellet 40 is cylindrical in shape, having a diameter of about 1 cm and being about 2 cm long. Each pressed pellet 40 contain mixtures ranging from HMX[90%]:PEG [10%]:$nMx_{12}$[0%], HMX[85%]:PEG[10%]:$nMx_{12}$[5%], HMX[83%]:PEG[10%]:$nMx_{12}$[7%], HMX[77%]:PEG [10%]:$nMx_{12}$[13%], wherein each percentage reflects their portion of the total weight of the pressed pellet 40. Each (♦) data point [$nMx_{12}$ enhanced] and (●) data point [H5-Al enhanced] along the x-axis reflects the listed formulations and how much of the nanocomposite or H5-Al metal is added to HMX. The results of FIG. 33 show that (♦) data points go up faster, meaning one gets more blast from the amount of nMx added to HMX. Once we get to about 10% of nano-enhanced HMX, the nMx metal produces enhanced blasts that start to exceed the H5-Al (●) data points.

Use of a Nano-Enhanced Explosive in Explosive Trains

To reiterate, it is an embodiment of the present invention wherein different types of munitions, including but not limited to, rockets; guided and ballistic missiles; bombs, warheads; mortar rounds; artillery munitions; small arms ammunition; grenades; mines; torpedoes; depth charges; cluster munitions and dispensers; or demolition charges; may integrate the nano-enhanced explosive anywhere along their respective explosive trains.

FIG. 1 and FIG. 2 depict a three and a four-step explosive train respectively. These trains are known within the arts of commercial and military explosives. A confined shell a.) houses in-line elements being a fuse b.); an initiator c.); and a main charge d.) and h.), where FIG. 2 includes an additional booster material g.) that sends and amplify shockwaves through the main charge d.) and h.).

FIG. 3 depicts a fuse, or detonation cord, made of a hollow flexible tube packed with a small amount of a mixture of nMx and a secondary high explosive, which can be ignited by a spark to set off shock waves within an initiator charge and eventually to a main charge as denoted by the above shockwave propagation images of FIGS. 32a and 32b.

Figure 4:
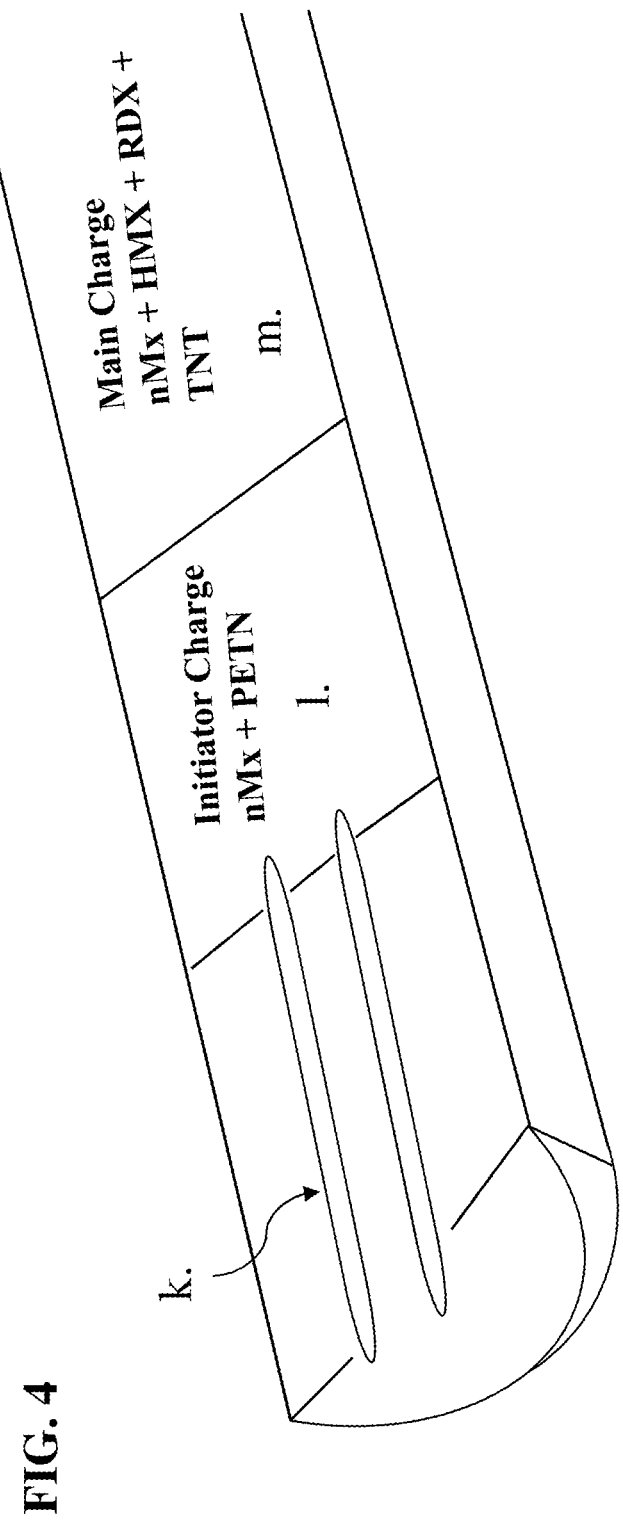
FIG. 4 depicts an electrical blasting cap within a three-step explosive train. Here, the fuse is replaced by electrical leads k that receive a signal that sends an impulse to our nano-enhanced explosive that acts as an initiator 1 for the main charge m, which is also a nano-enhanced explosive.

FIG. 4 depicts an explosive train having electrical leads, where each lead k.) receives a remote signal from a transmitter [not shown] that triggers impulses into an initiator l.), being a mixture of nMx and PETN, which kickstarts a shockwave within the main charge m.), where the main charge is a mixture of nMx and [HMX/RDX/TNT] in various weight percentages.

Because our nano-enhanced explosive can be used along many in-line elements of an explosive train, we incorporate by reference classic munitions that include explosive trains that are well suited and compatible with the present invention. However, these specific uses are not a limitation on the various modifications one can make to machines, devices, or methods that can take advantage of the nano-enhanced explosive, but any such are within the scope of this disclosure.

Historical Incorporation of the Nano-Enhanced Explosive

U.S. Pat. No. 1,178,092 to Mills discloses one of the first modern hand grenades for creating lethal fragments. It issued in 1916. Mills' explosive train within the grenade includes a pin, spring, and hammer, a cap made from an ignitable material, a timed fuse, venting means about the cap and fuse, and a detonation material, typically a mixture of TNT/Baratol and other fillers. It is an embodiment of the present invention wherein, the nano-enhanced explosive can be integrated at various points within the explosive train of a hand grenade, and, as such, U.S. Pat. No. 1,178,092 to Mills is herein incorporated by reference for the use of the nano-enhanced explosive within a hand grenade.

U.S. Pat. No. 2,007,026 to Robertson discloses a conical shaped artillery shell, a warhead. It issued in 1933. There is an explosive train within the shell that includes a plunger having a head connected to a shank followed by a conical firing pin. The firing pin is just above a tube that carries a cap of ignitable material that, when struck, ignites a fuse. A secondary high explosive fills the interior of the shell and is connected to the fuse. The warhead is loaded into a cartridge and exploded, which drives the shell from the gun. The force engages the plunger and ignites the cap to light the fuse. The heat and flames from the fuse work down to the explosive and sets it off. It is an embodiment of the present invention wherein the nano-enhanced explosive can be integrated at various points within the explosive train of an artillery shell, and, as such, U.S. Pat. No. 2,007,026 to Robertson is herein incorporated by reference for use of the nano-enhanced explosive within the same.

U.S. Pat. No. 2,466,752 to Uhl and Skinner disclose a classic rocket projectile that issued in 1949. This type of ordance was used with a recoilless rocket for anti-tank weaponry, e.g. an M1 bazooka and its progeny. Uhl and Skinner's rocket includes a conical head containing an explosive charge, a tubular body, and a nozzle. A tube containing a propellant charge, being a bundle of powder sticks, is connected to the rear of the head at a shank portion with a rear facing annular nozzle. An electrical firing squib (trigger) ignites the firing sticks. The hot gases and blast from the firing sticks propels the rocket forward. Although not shown, the explosive train of warhead includes at least a fuse, booster, the main charge, and a voided space. It is an embodiment of the present invention wherein the nano-enhanced explosive can be integrated at various points within the explosive train of an anti-tank warhead, and, as such, U.S. Pat. No. 2,466,752 to Uhl and Skinner is herein incorporated by reference for use of the nano-enhanced explosive within the same.

U.S. Pat. No. 3,176,613 to Godfrey, C. M., et al. discloses a shaped charge explosive. The shaped charge can be used for breaking rock, piercing armor, and the like. This explosive takes advantage of the Munroe effect by using a hemispherical liner made of metal. A high explosive is next to the curved surface of the explosive and is encased in curved shell. A detonator is in contact with the explosive material. At detonation, the curved metal liner is accelerated by the shockwave and folds in at a focal point to better direct the jet of the shockwave. It is an embodiment of the present invention wherein the nano-enhanced explosive can be integrated at various points within a shaped charge's explosive train, and, as such, U.S. Pat. No. 3,176,613 to Godfrey et al. is herein incorporated by reference for use within the same.

U.S. Pat. No. 3,216,354 to Bearce discloses a landmine and issued in 1952. The ordnance is camouflaged and covered by earth. The landmine has a two sequenced train using high explosives and is designed for armor piercing via a shaped charge. The first explosive sequence removes a good portion of the earth covering the landmine. When a weighted object depresses a rod, a firing pin strikes a primer charge that sets off an explosive to remove earth. The second explosive sequence is triggered by the initial clearing charge and delivers a concussive push to another striking pin, which sets off a delay train, followed by a booster charge, and finally the detonation of the main secondary high explosive, which now has a clear path to deliver the shaped charge to a vehicle rolling over it. It is an embodiment of the present invention wherein the nano-enhanced explosive can be integrated at various points within both explosive trains of a landmine, and, as such, U.S. Pat. No. 3,216,354 to Bearce is herein incorporated by reference for use within the same.

U.S. Pat. No. 3,877,376 to Kupelian discloses a warhead attached to an anti-aircraft missile. It issued in 1975. Kupelian's missile includes a warhead with an explosive train that includes an electric initiator that lights a fuse connected to a detonator to set off a main explosive charge, which is associated with small groupings of explosives about the outer wall of the warhead casing. Each small grouping of explosives is connected to a quadrant selector system via cables. The quadrant selector is a system that determines which groups of explosives are detonated based on radial positioning of a moving target via a proximity/target sensing device well known within the arts, e.g. radar or infra-red sensing devices. The detonation of the smaller groupings of explosives about the walls of the warhead weakens the casing prior to detonation of the main charge, exposing the fast-moving target to a distorted blast effect and more of the concussive force from the main explosive. It is an embodiment of the present invention wherein the nano-enhanced explosive can be integrated at various points within both explosive trains of a warhead attached to an anti-aircraft missile, and, as such, U.S. Pat. No. 3,877,376 to Kupelian is herein incorporated by reference for use within the same.

nMx Enhanced Explosive in Water Reactive Munitions

Munitions can also take advantage of nMx's water reactivity and subsequent $H_2(g)$ production. Although the passivation layer air stabilizes $nMx_{12}$-$nMx_{20}$, the nano-scale organic layer has some amount of porous behavior that allows water to contact and react with the core $Li_3AlH_6$ nanoparticles and elemental Al nanoparticles for a violent and rapid release of heat and $H_2(g)$.

The nMx/water reaction is stoichiometrically defined as follows:

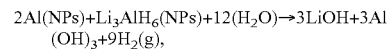

$$2Al(NPs)+Li_3AlH_6(NPs)+12(H_2O) \rightarrow 3LiOH+3Al(OH)_3+9H_2(g),$$

where the Al nanoparticles get oxidized to Al hydroxide and the $Li_3AlH_6$ nanoparticles are converted to Li hydroxide. The total reaction generates a fair amount of $H_2(g)$ for use within many applications. The nano-scaled reactions go to completion as the surface energetics of the nanoparticles guarantee a larger number of reactive atoms at the surface of each metal as compared to micron or bulk metal sizes of Al or $Li_3AlH_6$.

nMx $H_2$(g) evolution is measured as follows. A custom chemist's retort is made with two arms, fashioned like a Y shape, having one arm with nMx powder and the other arm having a small amount of distilled water, the common end of the retort is attached to gas bruet with a tube. The top end of the buret is attached to a leveling bulb. The buret contained a NaCl solution to indicated gas displacement and to ensure that $H_2$(g) doesn't get absorbed by water. The gas displacement results indicate that approximately 1.0 g of nMx, when reacted with water produces heat, flames, and approximately 1.5 L of $H_2$ gas.

U.S. patent application Ser. No. 14/259,859, filed by Jelliss et al., is within the chain of priority for this disclosure and describes iterations $nMx_{10}$ and $nMx_{11}$ as novel sources of $H_2$(g). It is an embodiment of the present invention to use nMx's water reactivity to produce heat and $H_2$(g) when an underwater munition is detonated to form concussive bubbles. The nano-enhanced explosive can be included in a warhead of a submersed munition to enhance the concussive force resulting from the detonation of the same. At detonation, the nMx composite of the nano-enhanced explosive is freed into an aqueous environment. Not to be bound by theory, but, in addition to the temperature increase imparted to the surrounding water by explosive gases, nMx's violent reaction with water transfers additional heat and creates very hot $H_2$(g) bubbles. These bubbles are carried to a target surface by the explosive's shock front for additional concussive forces against the target surface when a concussive bubble collapse.

Gaseous concussive bubbles are a byproduct of underwater explosions. When a warhead detonates, hot gases are released into the much colder and heavier water that, due to the temperature difference between the hot gases and the water and the hydostatic pressure of the water, creates bubbles that are additional carriers of shockwave energy from the explosive to the surfaces of a submerged target. One of the end results of an explosive bubble is an additional force, or punch, against the target surface in addition to the main effect of the propagating shockwave.

Prior references disclose ways of increasing the gas pressure of these bubbles through the addition of water reactive metals in or about the explosive train of an underwater munition. These references disclose warheads with explosive trains designed to deliver multiple concussive blasts to a target through this bubble phenomenon, where the base charge, being a secondary high explosive, releases traditional byproduct gases into the water along with gases formed by the chemical reaction of water reactive metals that promote highly pressurized bubble formation.

U.S. Pat. No. 4,188,884 to White et al. discloses the importance of an admixture of a secondary high explosive with a water reactive enhancer for a torpedo warhead. White et al. discloses an electrical fuse that imparts firing impulses to detonate a booster charge and a detonator charge, which are coupled to secondary high explosives. The secondary high explosives are surrounded by water reactive materials that, upon explosion, create large bubbles that have a huge punch-like affect upon a target surface.

U.S. Pat. No. 3,109,373 to Saffer discloses a torpedo that contains a warhead capable of delivering sequenced explosions to a hull of a targeted surface or submarine vessel. Saffer's torpedo uses a sensing device that detonates a primary charge when the nose of the torpedo is close to the target. When the nose casing is fragmented, hot gases form a glob like bubble between the damaged nose and the target surface. As the torpedo moves forward, the shaped charge is then detonated and travels through the expanding bubble giving an additional concussive blow to the targeted surface.

Figure 5A:
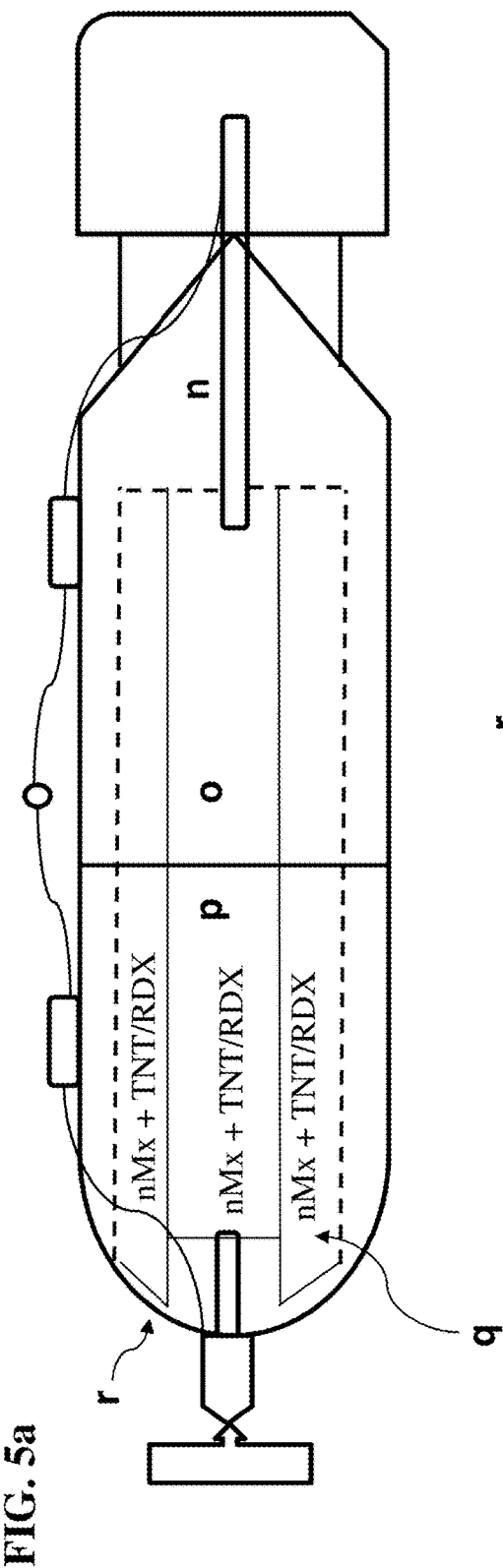
FIG. 5a depicts the nano-enhanced explosive p, q within an explosive train for a warhead r of an underwater munition, a classic torpedo with a guiding system.
Figure 5B:
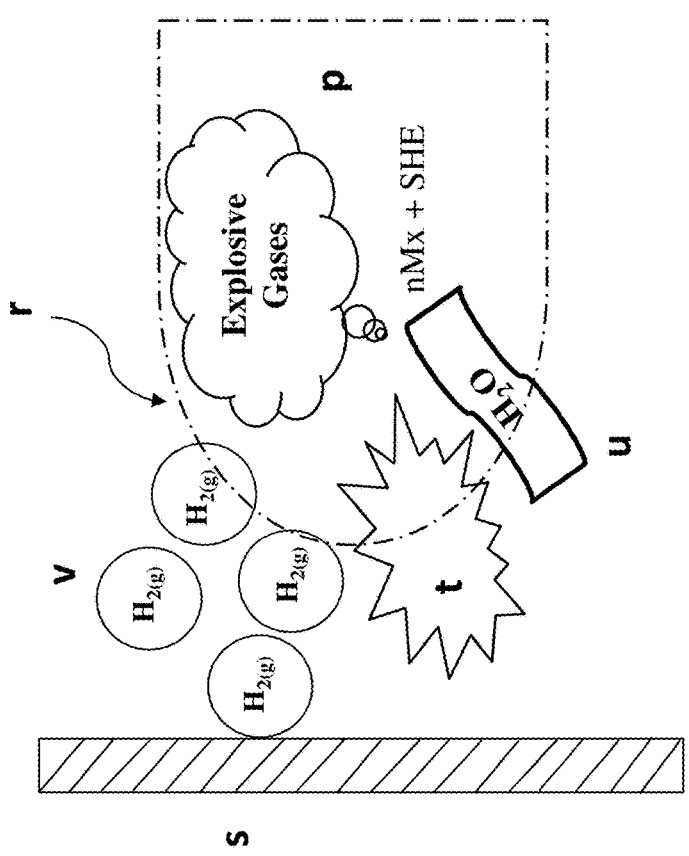
FIG. 5b depicts what happens upon detonation of the main charge p when the warhead r is near a submerged targeted surface s.
Figure 6:
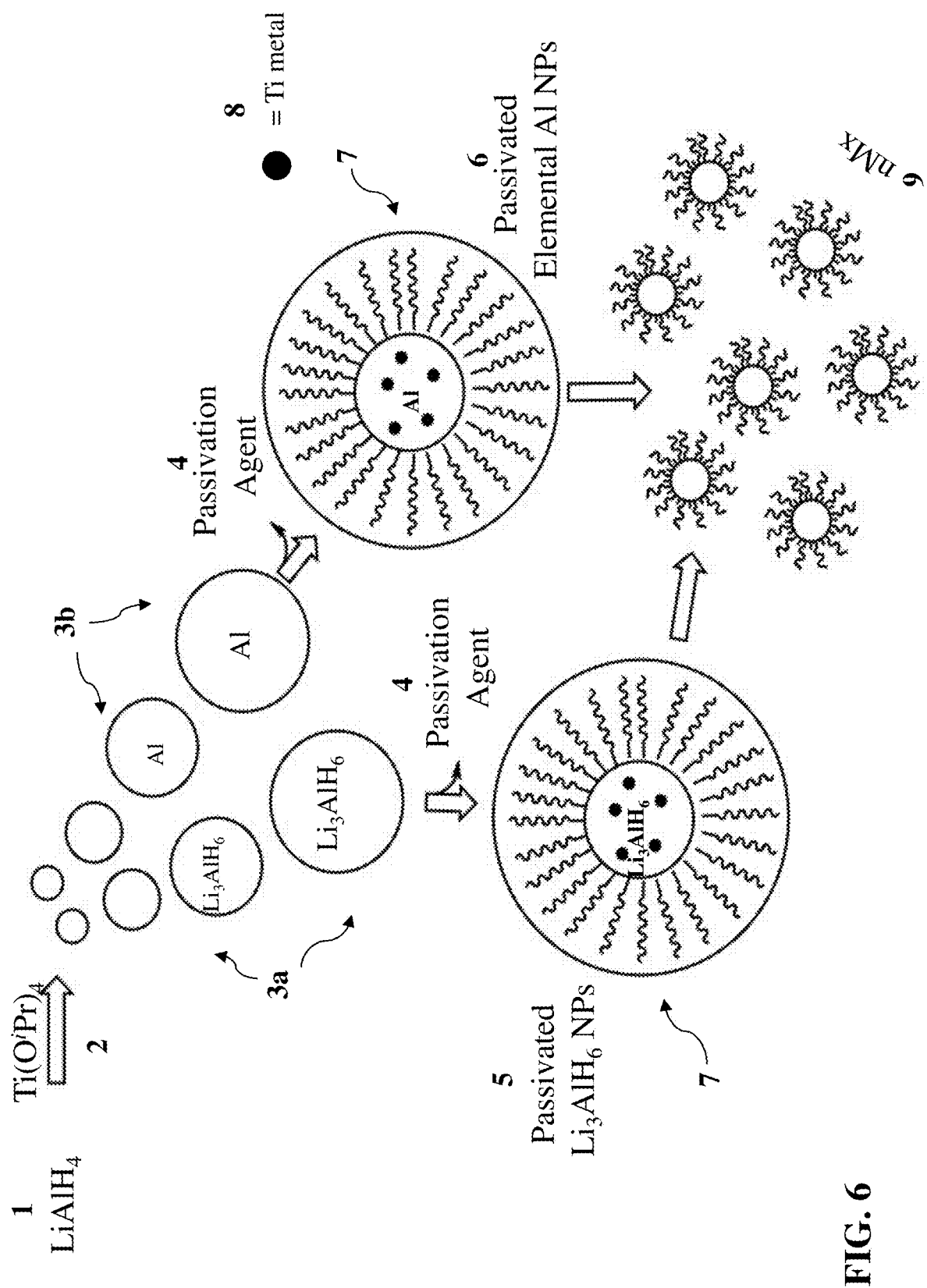
FIG. 6 depicts a bottom up synthesis for the nMx nanocomposite 9. Ti alkoxides 2 react to decompose $LiAlH_4$ 1 at 100° C. The alkoxide 2 acts as a nanoparticle initiator, where the decomposition of $LiAlH_4$ 1 creates molecular seeds of $Li_3AlH_6$ 3a and elemental Al 3b metals by which the nanoparticles grow. A passivation agent 4 is added to the reaction. A monolayer passivation scheme 7 is detailed using hydrophobic capping agents 4 with a reactive head group. The reaction is stopped when the passivated nanoparticles 5, 6 are roughly from about 8.5 nm to 100 nm in diameter, where Ti 8 remnants associate with both the $Li_3AlH_6$ nanoparticles and the elemental Al nanoparticles in the final nMx nanocomposite 9.
Figure 7:
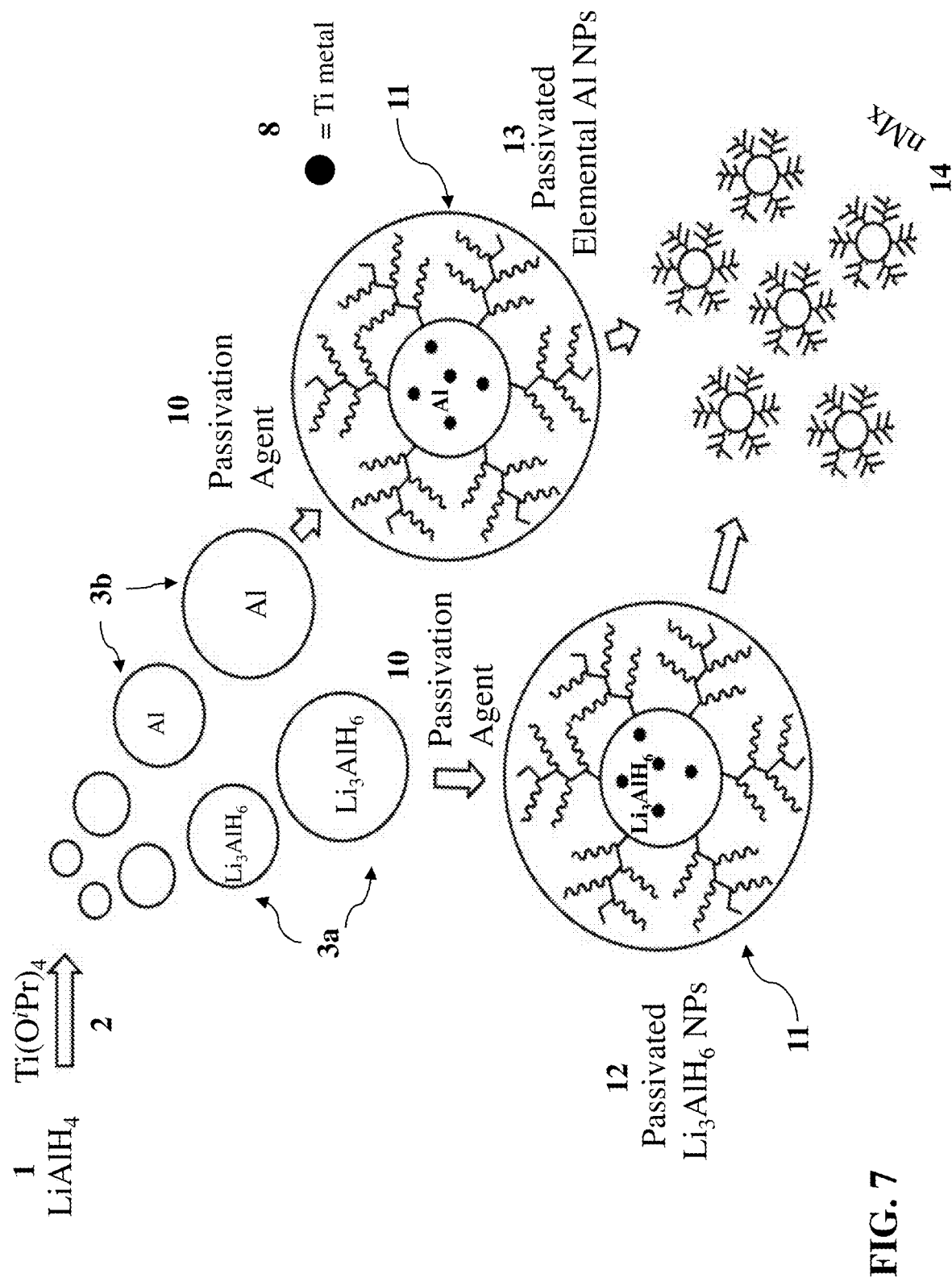
FIG. 7 depicts a bottom up synthesis for the nMx nanocomposite 14. Ti alkoxides 2 react to decompose $LiAlH_4$ 1 at 100° C. The alkoxide 2 acts as a nanoparticle initiator, where the decomposition of $LiAlH_4$ 1 creates molecular seeds of $Li_3AlH_6$ 3a and elemental Al 3b metals by which the nanoparticles grow. A passivation agent 10 is added to the reaction. Here, passivation occurs through polymerization of the passivation agent 10 about the surfaces of the $Li_3AlH_6$ nanoparticles 3a and elemental Al nanoparticles 3b using hydrophobic capping agents 10 with a polymerizable head group. The reaction is stopped when the passivated nanoparticles 12, 13 are roughly from about 8.5 nm to 100 nm in diameter, where Ti 8 remnants associate with both the $Li_3AlH_6$ nanoparticles and the elemental Al nanoparticles in the final nMx nanocomposite 14.

Like both White and Saffer, FIG. 5a depicts the nano-enhanced explosive p, q within an explosive train for a warhead r of an underwater munition, a classic torpedo with a guiding system. Here the nano-enhanced explosive is the main charge p while other amounts of the nano-enhanced explosive q rest just above and below the same p. This use of the formulation takes advantage of nMx's ability to liberate large amounts of $H_2$(g) when in contact with water. In this embodiment an electrical fuse n sends an impulse to an initiator o that is in contact with the main charge p, being a formulation of nMx/TNT/RDX. Just above and below the main charge p located in the warhead r rests additional amounts of the nano-enhanced explosive q. FIG. 5b depicts what happens upon detonation of the main charge p when the warhead r is guided near a submerged targeted surface s. The explosion t ruptures the shell of the warhead r exposing unexploded amounts of the formulation to incoming water u with the bonus of forming hydrogen filled bubbles v that ride the shock front from the main charge's p explosion t to render additional concussive impacts from the $H_2$ filled bubbles v upon the targeted surface s.

The foregoing words describe embodiments for a nano-composite having two distinct nanoparticles that render unique burning characterizes to enhance a secondary high explosive. A bottom up synthesis creates nanoparticles that are carefully sized and passivated at the controlled first reaction step of $LiAlH_4$ decomposition. The nanocomposite is air stable being $Li_3AlH_6$ nanoparticles, elemental Al nanoparticles, an amount of Ti metal, and a nanoscale organic layer, which protects and preserves the high energy densities of the nanoparticles isolated from the precisely controlled reaction. All nano-enhanced explosives, methods for making the same, and/or uses of the present invention disclosed and claimed herein can be made and executed without undue experimentation. However, these words are not a limitation on the scope of the present invention but are written to detail certain embodiments thereof. Changes made by one of ordinary skill in the art to our invention does not alter and take away from the scope and spirit of our invention and are meant to be captured herein. Thus, the scope of the present invention may be defined by the following claims.

REFERENCES

[1] T. Himanshu, et al. (2008) Increased Hot-Plate Ignition Probability for Nanoparticle-Laden Diesel Fuel. *Nano Lett*, 8(5), pp 1410-1416.

[2] Agrawal, Jai P., *High Energy Materials: Propellants, Explosives, and Pyrotechnics*. Weinheim: Wiley VCH Verlag GmbH & Co. KgaA. 2010.

[3] Ehrlich, et al. (1966) The Chemistry of Alane. XI. A New Complex Lithium Aluminum Hydride, $Li_3AlH_6$. *Journal of the American Chemical Society*, 88:4, pp. 858-860.

[4] Dvorak, J. J., et al. Process for Preparing Alkali Metal Aluminum Hexahydrides. U.S. Pat. No. 3,357,806. Issued Dec. 12, 1967.

[5] Dilts, et al. (1971) A Study of the Decomposition of Complex Metal Hydrides. *Inorganic Chemistry*, vol. 11 no. 6, pp. 11230-1236.

[6] Fasolino, L. G. Department of Navy—Office of Naval Research. (1963) *Heat of Formation of $Li_3AlH_6$*. Washington, D.C.

[7] Chen, et al. (2001) Reversible Hydrogen Storage via Titanium-Catalyzed LiAlH$_4$ and Li$_3$AlH$_6$. *J. Phys. Chem. B*, vol. 105, pp. 11214-11220.

[8] Mahendiran, C. et al. (2009) Sonoelectrochemical Synthesis of Metallic Aluminum Nanoparticles. *Eur. J. Inorg. Chem.* 2050-2053.

[9] Pecharsky, V.; Balema, V.; "Method of production of pure hydrogen near room temperature from aluminum-based hydride materials," U.S. Pat. Pub. No. 2003/0026757.

[10] Choi, J. Y. et al. (2011) Reaction Mechanisms in the Li$_3$AlH$_6$/LiBH$_4$ and Al/LiBH$_4$ Systems for Reversible Hydrogen Storage. Part 1: H Capacity and Role of Al. *The Journal of Physical Chemistry C*, 115, pp. 6040-6047.

[11] Yang, J. et al., Method of Enhancing Thermal Conductivity in Hydrogen Storage Systems," U.S. Pat. App. No. 20110165061.

[12] Buzea, C., Pacheco-Blandino, I. I., et al. (2007) Nanomaterials and nanoparticles: Sources and toxicity. *Biointerphases*, vol. 2(issue 4), pp. MR17-MR172.

[13] Roduner, E. (2006) Size Matters: Why Nanomaterials are Different. *Chem. Soc. Rev.*, 35 583-592).

[14] Bureau of Land Management Protection and Response Group. 2005. Military Munitions and Explosives of Concern: A Handbook for Federal Land Managers, with Emphasis on Unexploded Ordnance, *BLM Handbook H*-1703-2. Washington, D.C. *. 96 pages. *Release number 1-1697.

[15] Anderson, S. L.; et al. "Production of Nanoparticles Using Homogenous Milling and Associated Products." U.S. Pat. Appl. Pub. (2015) US 2015/0086416.

[16] Balema et al. (2000) Rapid solid-state transformation of tetrhedral [AlH$_4$]—into octahedral [AlH$_6$]—in lithium aluminhydride. *Chemical Communications—The Royal Society of Chemistry*, pp. 1665-1666.

[17] Balema et al. (2001) Titanium catalyzed solid-state transformation in LiAlH$_4$ during high-energy ball milling *Journal of Alloys and Compounds*, vol. 329, pp. 108-114.

[18] Jouet, et al., *Chem. Mater.* 17:2987-2996, 2005.

[19] Foley, et al., *Chem. Mater.* 17:4086-4091, 2005.

[20] Jelliss, P. A.; Buckner, S. W.; Chung, S. W.; Thomas, B. J.; "Passivated metal nanoparticles having an epoxide-based oligomer coating", U.S. patent application Ser. No. 13/178,398.

[21] Thomas et al., "Synthesis of aluminum nanoparticles capped with copolymerizable epoxides," *J. Nanopart. Res.*, 15:1729, 2013.

[22] U.S. Pat. No. 6,251,349 "Method of Fabrication of Complex Alkali Metal Hydrides" Zaluska, A., et al. Jun. 26, 2006 citing J Mayet, S. Kovacevic, and J. Tranchant, *Bull. SOC. Chim. Fr.*, vol. 2 pg. 504, (1973).

[23] Jelliss, P. A.; Buckner, S. W.; Thomas, B. J.; "Novel Hydrogen-Evolving Polymer-Capped Aluminum Nanoparticles, Composites, and Methods of Synthesis Using Lithium Aluminum Hydride", U.S. application Ser. No. 14/259,859.

[24] Pyrz W. D., et al., (2008) Particle Size Determination Using TEM: A Discussion of Image Acquisition and Analysis for the Novice Microscopist, *Langmuir*, 24, pp. 11350-11360.

[25] Bastide, et al., *Stud. Inorg. Chem.*, 3:785-788, 1983.

[26] Varin, et al. (2010) Decomposition behavior of unmilled and ball milled lithium alanate (LiAlH$_4$) including long-term storage and moisture effects *Journal of Alloys and Compounds* 504 89-101.

We claim:

1. A nano-enhanced explosive comprising a formulation of:
   a.) 0.5% to 75% of a nanocomposite by total weight of the formulation, wherein the nanocomposite is air stable and includes Li$_3$AlH$_6$ nanoparticles, elemental Al nanoparticles, amount of Ti metal, and a nanoscale organic layer; and
   b.) 25% to 99.5% of a secondary high explosive by total weight of the formulation.

2. The nano-enhanced explosive of claim 1, wherein the nanoscale organic layer acts as a binder for the nano-enhanced explosive.

3. The nano-enhanced explosive of claim 2, wherein the nanoscale organic layer is a fatty acid, a fatty alcohol, or an alkadiene, consisting of: 1,7-octadiene, 1,9-decadiene, myrcene, or 1,13-tetradecadiene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, fatty alcohols being tert-butyl alcohol, tert-amyl alcohol, 3-methyl-3-pentanol, ethchlorvynol, 1-octanol (capryl alcohol), pelargonic alcohol (1-nonanol), 1-decanol (decyl alcohol, capric alcohol), undecyl alcohol (1-undecanol, undecanol, hendecanol), lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol, cluytyl alcohol, or 1-octacosanol, 1-nonacosanol, myricyl alcohol, melissyl alcohol, or 1-triacontanol, 1-dotriacontanol (lacceryl alcohol), geddyl alcohol (1-tetratriacontanol), cetearyl alcohol, carboxylic (fatty) acids being butyric acid [CH$_3$(CH$_2$)$_2$COOH], valeric acid [CH$_3$(CH$_2$)$_3$COOH], caproic acid [CH$_3$(CH$_2$)$_4$COOH], enanthic acid [CH$_3$(CH$_2$)$_5$COOH], caprylic acid [CH$_3$(CH$_2$)$_6$COOH], pelargonic acid [CH$_3$(CH$_2$)$_7$COOH], capric acid [CH$_3$(CH$_2$)$_8$ COOH], undecylic acid [CH$_3$(CH$_2$)$_9$COOH], lauric acid [CH$_3$(CH$_2$)$_{10}$COOH], tridecylic acid [CH$_3$(CH$_2$)$_{11}$COOH], myristic acid [CH$_3$(CH$_2$)$_{12}$COOH], pentadecylic acid [CH$_3$(CH$_2$)$_{13}$COOH], palmitic acid [CH$_3$(CH$_2$)$_{14}$COOH], margaric acid [CH$_3$(CH$_2$)$_{15}$COOH], stearic acid [CH$_3$(CH$_2$)$_{16}$COOH], nonadecylic acid [CH$_3$(CH$_2$)$_{17}$COOH], arachidic acid [CH$_3$(CH$_2$)$_{18}$COOH], or any combination thereof.

4. The nano-enhanced explosive of claim 2, wherein the nanoscale organic layer includes glycols, having various molecular weights, being PEG, PEO, tetraethylene glycol, triethylene glycol, or any combination thereof in mixture with a fatty acid, a fatty alcohol, or an alkadiene.

5. The nano-enhanced explosive of claim 1, wherein the formulation for the nano-enhanced explosive includes additives being: processing aids, binders, surfactants, thickeners, defoaming agents, energetic polymers, inert polymers, fluoropolymers, thermal stabilizers, plasticizers, and any combination thereof.

6. The nano-enhanced explosive of claim 1, wherein a binder is added to the formulation of the nano-enhanced explosive from 0.5% to 20% by total weight of the formulation and includes: waxes; PVP; polyethylene glycol [PEG]; hydroxypropylmethyl cellulose; ESTANE; HYTEMP; methylcellulose; cellulose acetate; cellulose ethers; CAB (cellulose acetate butyrate); ethylene vinyl acetate; ethylene vinyl alcohol; polystyrene plastic; silicone rubber; polyether; epoxides; nitrocellulose; polyurethane rubber; carboxy or hydroxyl-terminated polybutadiene [HTPB—rubber]; polyfluorocarbons; Viton fluoropolymer elastomeror; bis 2,2-dinitropropyl acetate [BDNPA]; bis 2,2-dinitropropyl formal [BDNPA/f]; polyesters; polyfluorocarbons; polyvinyl alcohol; polyvinyl alcohol/polyvinyl ester copolymers; polyacrylates; casein; polyvinyl alcohol/polyvinyl pyrrolidone copolymers; polyvinyl; pyrrolidone; substituted polyvinyl pyrrolidone; styrene-maleic anhydride copolymers; styrene-acrylic copolymers; epichlorohydrin-based polymers; or oxetane-based polymers; PBAN (butadiene-acrylonitrile-acrylic acid terpolymer); PPG (polypropylene glycol); polymethacrylates; and any combination thereof.

7. The nano-enhanced explosive of claim 1, wherein a plasticizer is added to the formulation from 0.5% to 5.0% by total weight and includes: DOA (dioctyladipate or (2-ethylhexyl)adipate); IDP (isodecylperlargonate); DOP (dioctylphthalate); DOM (dioctylmaleate); DBP (dibutylphthalate); oleyl nitrile; bis-dinitropropyl acetyl and bis-dinitropropyl formal (BDNPA/F); dioctyl sebecate (DOS); glycidyl azide polymer (GAP); or any combination thereof.

8. The nano-enhanced explosive of claim 1, wherein an oxidizer is added to the nano-enhanced explosive from 1.0% to 50% by total weight of the formulation and includes: ammonium perchlorate; ammonium nitrate; lithium nitrate; barium chlorate; barium nitrate; cesium nitrate; calcium nitrate; copper nitrate; hexanitroethane; potassium chlorate; potassium nitrate; sodium nitrate; rubidium nitrate; sulfur; chromium trichloride; molybdenum disulfide; iron trifluoride; potassium perchlorate; ammonium dinitramide (ADN); sodium nitrate (SN); potassium nitrate; ammonium nitrate; 2,4,6-trinitro-1,3,5-benzenetriamine (TATB); dinitrotoluene (DNT); DNAN; or any combination thereof.

9. The nano-enhanced explosive of claim 1, wherein the nanocomposite lends energy to an explosive process having measured energy densities from −24 kJ/g to −38 kJ/g.

10. The nano-enhanced explosive of claim 1, wherein the secondary high explosive includes: 5-nitro triazol-3-one (NTO); 2,4,6-trinitrotoluene (TNT); tetranitro-dibenzo-1,3a,4,4a-tetraazapentalene (TACOT); cyclotetramethylene-tetranitramine; tetrahexamine tetranitramine; 1,3,5,7-tetranitro-1,3,5,7-tetrazocane (HMX); 2,2',4,4',6,6'-hexanitrostilbene (HNS); 1,3-diamino-2,4,6-trinitrobenzene (DATB); 1,3,5-triamino-2,4,6-trinitrobenzene (TATB); 1,3,5-trinitrobenzene (TNB); 3,5-dinitro-2,6-bis-picrylamino pyridine (PYX); 2,4-dinitrotoluene; 2,6-dinitrotoluene; nitroglycerine (NG); picrate (NQ); 2,4,6-trinitrophenol; ethylene glycol dinitrate (EGDN); ethylenedinitramine (EDNA); diethylene glycol dinitrate (DEGDN); Semtex; Pentolite; trimethylol ethyl trinitrate (TMETN); 1,3,5,-trinitrobenzene (TNB); tetryl, hexahydro-1,3,5-trinitro-1,3,5-triazine (RDX); T4 1,3,5-trinitro-1,3,5-triazacyclohexane; cyclotrimethylenetrinitramine; pentaerythritol tetranitrate (PETN); triethylene glycol dinitrate (TEGDN); 2,2,2-trinitroethyl-4,4,4-trinitrobutyrate (TNETB); methylamine nitrate; nitrocellulose; N3,N3,N'3,N'3,N7,N7,N'7,N'7-octafluoro-1,5-dinitro-1,5 diazocane-3,3,7,7-tetraamine (HNFX); CL-20 (HNIW); Hexanitrohexaazaisowurtzitane, nitroguanidine; hexanitrostilbene, 2,2-dinitroethene-1,1-diamin (FOX-7); dinitrourea, and picric acid; AFX 757; CHEMCORE (26% TNT/37% AP/37% AL); PBXN-111 (20% RDX/43% AP/25% AL12% wax binder); PWX MOD 19 (25% RDX/30% AP/33% AL/12% wax binder); PBXN-110 (88% HMX/12% HTPB binder); nitramine explosive; ammonium nitrate; potassium nitrate; barium nitrate; lead nitrate; potassium perchlorate; ammonium perchlorate; NQ (nitroguanidine); Cyclonite; octahydro-1,3,5,7-tetranitro-1,3,5,7-tetrazocane; Composition B (RDX-cyclotrimethylenetrinitramine and TNT-2,4,6-trinitrotoluene); Tritonal (TNT and aluminum powder); cyclotols (RDX and TNT in ratios of 75:25 to 60:40); Amatol (ammonium nitrate and TNT); Kalatol (potassium nitrate and TNT); Baratol (barium nitrate and TNT); Pentolite (PETN-pentaerythritol tetranitrate and TNT); and Baronal (barium nitrate, aluminum and TNT). The secondary high explosive may also include without limitation a plastic or putty explosive, which is hand malleable, such as composition 4, or C4, which includes approximately 91% 1,3,5-trinitroperhydro-1,3,5-triazine; 6% plasticizer, (diethylhexyl or dioctyl sebacate) and 2% plastic binder by weight, a polymer bonded explosive such as LX-14 (96% 1,3,5,7-tetranitro-1,3,5,7-tetrazocane and 4% polymer binders; or any combination thereof.

11. The nano-enhanced explosive of claim 1, wherein the $Li_3AlH_6$ nanoparticles have a diameter from 15 nm to 100 nm and the elemental Al nanoparticles have a diameter from 7 nm to 100 nm.

12. The nano-enhanced explosive of claim 1, wherein the nanoscale organic layer about the surfaces of both core metal nanoparticles are fractionally tuned from 5.0% to 75% by weight to modify the burn rate characteristics of the nanocomposite.

13. The nano-enhanced explosive of claim 1, wherein the nanoscale organic layer for both $Li_3AlH_6$ nanoparticles and elemental Al nanoparticles imparts air stability to the nanocomposite for safe handling in ambient conditions and wherein the nanoscale layer contains an oxygen atom mass from 5% to 34%.

14. The nano-enhanced explosive of claim 1, wherein the formulation is used as in-line elements of an explosive train being a fuse, initiator, booster, or a main charge for munitions consisting of hand grenades; landmines; water reactive munitions; artillery shells, depth charges; an anti-tank warhead; anti-aircraft missile warhead; or shaped charges.

15. The nano-enhanced explosive of claim 1 wherein any one of $nMx_{12}$-$nMx_{20}$, may be used to enhance a secondary high explosive, and then is associated with UV curable photopolymers being acrylates; monomers; oligomers; bis-maleimides; thermosetting epoxies; urethanes; polyesters; silicones; and their combinations and blends or thermoplastic polyurethane, styrene block-copolymers, thermoplastic silicone elastomer, aliphatic or semi-aromatic polyamides, thermoplastic vulcanisate, acrylonitile butadiene styrene, polylactic acid, polyvinyl alcohol, polycarbonate, polylactic acid, acrylonitrile-butadiene-styrene (ABS), polylactic acid, polymethylmethacrylate, polyethylene, polypropylene, polystyrene, nylon, polycarbonate, polyvinyl chloride, Teflon, or any combination thereof for 3D printing in-line elements of an explosive train requiring custom shapes embedded with the nano-enhanced explosive.

* * * * *